(12) United States Patent
Gobara et al.

(10) Patent No.: US 7,929,538 B2
(45) Date of Patent: Apr. 19, 2011

(54) INFORMATION PROCESSING SYSTEM, TUNNEL COMMUNICATION DEVICE, TUNNEL COMMUNICATION METHOD, PROXY RESPONSE DEVICE, AND PROXY RESPONSE METHOD

(75) Inventors: Kunio Gobara, Osaka (JP); Hajime Maekawa, Osaka (JP); Kenichi Matsumoto, Osaka (JP); Masanobu Koyama, Osaka (JP)

(73) Assignee: Panasonic Corporation, Osaka (JP)

( * ) Notice: Subject to any disclaimer, the term of this patent is extended or adjusted under 35 U.S.C. 154(b) by 480 days.

(21) Appl. No.: 12/088,418

(22) PCT Filed: Mar. 31, 2006

(86) PCT No.: PCT/JP2006/306796
§ 371 (c)(1),
(2), (4) Date: Mar. 27, 2008

(87) PCT Pub. No.: WO2007/037028
PCT Pub. Date: Apr. 5, 2007

(65) Prior Publication Data
US 2009/0232138 A1 Sep. 17, 2009

(30) Foreign Application Priority Data
Sep. 29, 2005 (JP) ................................. 2005-284324

(51) Int. Cl.
*H04L 12/56* (2006.01)
(52) U.S. Cl. ......................... 370/392; 370/389; 709/228
(58) Field of Classification Search .................. 370/328, 370/389, 392, 401; 709/230, 249, 245, 246
See application file for complete search history.

(56) References Cited

U.S. PATENT DOCUMENTS

| 7,149,522 | B2 * | 12/2006 | Koskelainen | ............... 455/435.1 |
| 7,188,191 | B1 * | 3/2007 | Hovell et al. | ................. 709/245 |
| 7,231,452 | B2 * | 6/2007 | Ananda et al. | ................ 709/230 |
| 7,734,668 | B2 * | 6/2010 | Aoki et al. | ..................... 707/827 |
| 2003/0041101 | A1 * | 2/2003 | Hansche et al. | .............. 709/203 |
| 2003/0214955 | A1 * | 11/2003 | Kim | |
| 2004/0093434 | A1 * | 5/2004 | Hovell et al. | ................. 709/249 |

(Continued)

FOREIGN PATENT DOCUMENTS

JP       11-168475 A      6/1999

(Continued)

OTHER PUBLICATIONS

International Search Report for PCT/JP2006/306796; May 25, 2006.
Charlie Scott, Paul Wolfe, Mike Erwin; "Virtual Private Networks, Second Edition"; O'Reilly; Dec. 1998; pp. 1-9 and 11-22.

*Primary Examiner* — William Trost, IV
*Assistant Examiner* — Emmanuel Maglo
(74) *Attorney, Agent, or Firm* — Pearne & Gordon LLP

(57) ABSTRACT

Provided is an information processing system and the like that can make a communication between plural information processing devices belonging to different LANs. A first tunnel communication device includes a first address correlating information memory unit that stores information for correlating an address in a first LAN with an address in a second LAN, a first address translating unit that translates an address of a packet on the basis of the correlating information, a first P2P communication setup unit that sets up a P2P communication with a device as a destination, and a first tunnel communication unit that makes a tunnel communication through a path of a P2P communication. The packet transmitted from a first information processing device is translated in address, is encapsulated, and is then transmitted through the path of the P2P communication. The packet transmitted from the device as a destination is decapsulated, is translated in address, and is then transmitted to the first information processing device.

38 Claims, 32 Drawing Sheets

U.S. PATENT DOCUMENTS

| | | | |
|---|---|---|---|
| 2004/0205279 A1* | 10/2004 | Ohnishi | 710/305 |
| 2004/0218611 A1* | 11/2004 | Kim | |
| 2004/0264465 A1* | 12/2004 | Dunk | 370/392 |
| 2005/0009542 A1* | 1/2005 | Oprescu-Surcobe et al. | 455/466 |
| 2006/0015745 A1* | 1/2006 | Sukigara et al. | 713/182 |
| 2007/0079346 A1* | 4/2007 | Yanagi et al. | 725/112 |
| 2007/0157303 A1* | 7/2007 | Pankratov | 726/11 |
| 2010/0172302 A1* | 7/2010 | Dunk | 370/328 |

FOREIGN PATENT DOCUMENTS

| | | | |
|---|---|---|---|
| JP | 11-168476 | * | 6/1999 |
| JP | 2004-007671 | | 1/2004 |
| JP | 2004-180003 | | 6/2004 |
| JP | 2004-229299 | * | 8/2004 |
| JP | 2004-253975 | | 9/2004 |
| JP | 2005-252997 | | 9/2005 |
| JP | 2005-260715 | | 9/2005 |

* cited by examiner

FIG. 7

| TRANSMISSION FROM FIRST TO SECOND \ TRANSMISSION FROM SECOND TO FIRST | TRANSLATION OF DESTINATION: SECOND / TRANSLATION OF SOURCE: SECOND | TRANSLATION OF DESTINATION: FIRST / TRANSLATION OF SOURCE: SECOND | TRANSLATION OF DESTINATION: SECOND / TRANSLATION OF SOURCE: FIRST | TRANSLATION OF DESTINATION: FIRST / TRANSLATION OF SOURCE: FIRST |
|---|---|---|---|---|
| TRANSLATION OF DESTINATION: FIRST / TRANSLATION OF SOURCE: FIRST | (A) FIRST EMBODIMENT SPECIFIC EXAMPLE 1 | (G) | (H) | (E) SECOND EMBODIMENT |
| TRANSLATION OF DESTINATION: SECOND / TRANSLATION OF SOURCE: FIRST | (L) | (B) FIRST EMBODIMENT SPECIFIC EXAMPLE 3 | (I) | (J) |
| TRANSLATION OF DESTINATION: FIRST / TRANSLATION OF SOURCE: SECOND | (M) | (N) | (C) FIRST EMBODIMENT SPECIFIC EXAMPLE 4 | (K) |
| TRANSLATION OF DESTINATION: SECOND / TRANSLATION OF SOURCE: SECOND | (F) | (O) | (P) | (D) FIRST EMBODIMENT SPECIFIC EXAMPLE 2 |

|  | ADDRESS IN LAN 200 | ADDRESS IN LAN 300 |
|---|---|---|
| FIRST INFORMATION PROCESSING DEVICE | 192.168.0.10 | 192.168.1.20 |
| SECOND INFORMATION PROCESSING DEVICE | 192.168.0.20 | 192.168.1.10 |

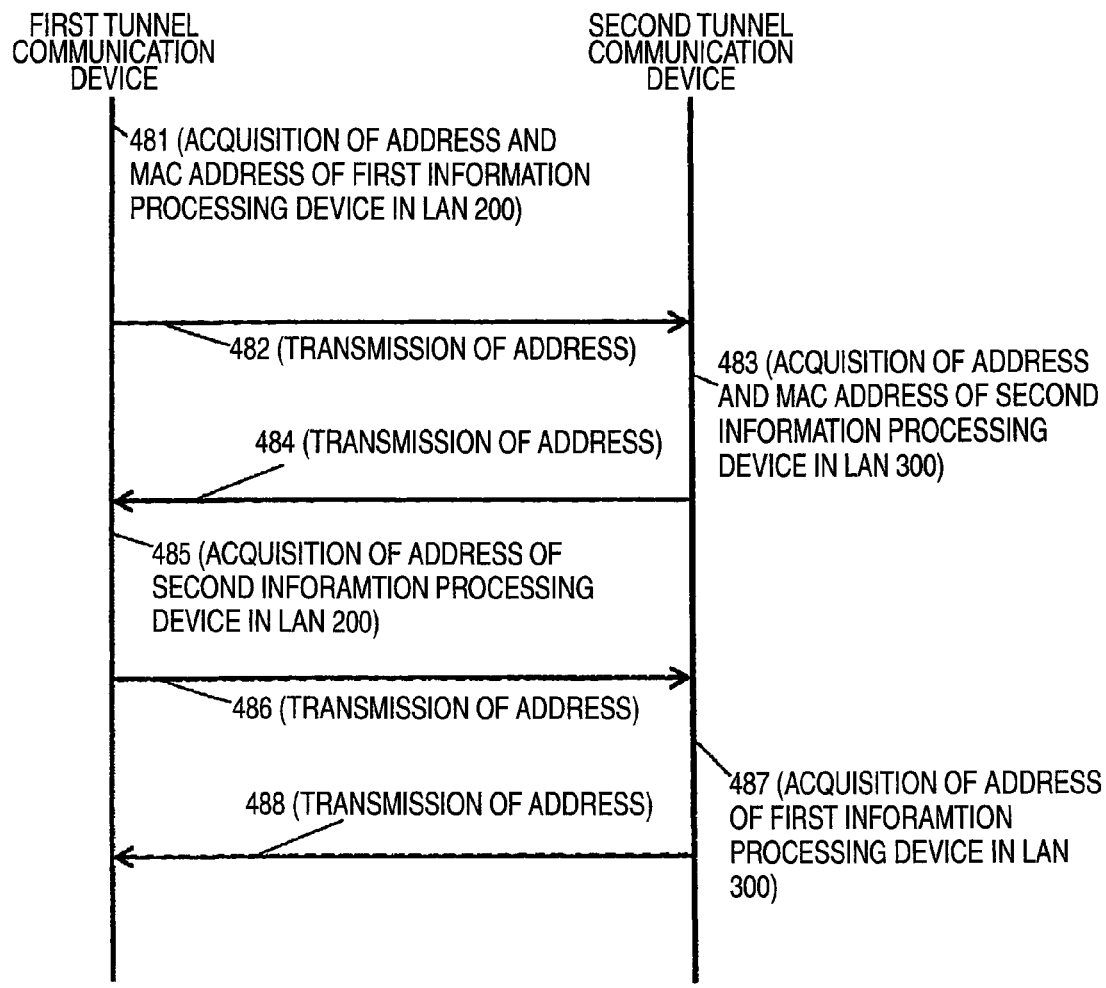

|  | ADDRESS IN LAN 200 | IDENTIFICATION INFORAMTION |
|---|---|---|
| FIRST INFORMATION PROCESSING DEVICE | 192.168.0.10 | AAA |
| SECOND INFORMATION PROCESSING DEVICE | 192.168.0.20 | XXX |

|  | IDENTIFICATION INFORAMTION | ADDRESS IN LAN 300 |
|---|---|---|
| FIRST INFORMATION PROCESSING DEVICE | AAA | 192.168.1.20 |
| SECOND INFORMATION PROCESSING DEVICE | XXX | 192.168.1.10 |

INFORMATION PROCESSING SYSTEM, TUNNEL COMMUNICATION DEVICE, TUNNEL COMMUNICATION METHOD, PROXY RESPONSE DEVICE, AND PROXY RESPONSE METHOD

TECHNICAL FIELD

The present invention relates to an information processing system, a tunnel communication device, a tunnel communication method, a proxy response device, and a proxy response method, for encapsulating a packet to make a tunnel communication.

BACKGROUND ART

Conventionally, information processing systems use a technology of a virtual private network (hereinafter, referred to as "VPN"). Plural points connected to a communication line such as Internet could communicate with each other as if they are connected to each other through an exclusive line, by using the technology. This configuration is disclosed in Charlie Scott's Document ("Virtual Private Networks, Second Edition" written by Charlie Scott, Paul Wolfe, and Mike Erwin, O'REILLY, December of 1998, P1~9 and P11 to 22).

However, a complex setup for a device serving as a connection point such as a router is required to connect plural local area networks. A user should make such a setup. Therefore, if the user cannot set up a network well, it is not easy to make a communication between plural points.

DISCLOSURE OF THE INVENTION

The invention provides an information processing system for making a communication between plural information processing devices belonging to different local area networks without a user making a complex setup.

An information processing system according to an aspect of the invention includes a first tunnel communication device, one or more first information processing device, a second tunnel communication device, and one or more second information processing device. The first tunnel communication device is connected to a first LAN. The first information processing device is connected to the first LAN. The second tunnel communication device is connected to a second LAN connected to the first LAN through a communication line. The second information processing device is connected to the second LAN.

The first tunnel communication device includes a first address correlating information memory unit, a first address translating unit, a first peer-to-peer (hereinafter, referred to as "P2P") communication setup unit, and a first tunnel communication unit. The first address correlating information memory unit stores first address correlating information which is information for correlating an address in the first LAN with an address in the second LAN. The first address translating unit translates an address of a packet on the basis of the first address correlating information.

The first P2P communication setup unit sets up a P2P communication with the second tunnel communication device. The first tunnel communication unit makes a tunnel communication through a path of the P2P communication set up by the first P2P communication setup unit. A packet transmitted from the first information processing device to the second information processing device is encapsulated by the first tunnel communication device and is transmitted through the path of the P2P communication. An encapsulated packet transmitted from the second tunnel communication device through the path of the P2P communication is decapsulated by the first tunnel communication device and is transmitted to the first information processing device. At least one of the packet transmitted from the first information processing device to the second information processing device and the packet transmitted from the second tunnel communication device through the path of the P2P communication is translated in address by the first address translating unit.

The second tunnel communication device includes a second address correlating information memory unit, a second address translating unit, a second P2P communication setup unit, and a second tunnel communication unit. The second address correlating information memory unit stores second address correlating information which is information for correlating an address in the second LAN with an address in the first LAN. The second address translating unit translates an address of a packet on the basis of the second address correlating information. The second P2P communication setup unit sets up a P2P communication with the first tunnel communication device. The second tunnel communication unit makes a tunnel communication through a path of the P2P communication set up by the second P2P communication setup unit.

A packet transmitted from the second information processing device to the first information processing device is encapsulated by the second tunnel communication device and is transmitted through the path of the P2P communication. An encapsulated packet transmitted from the first tunnel communication device through the path of the P2P communication is decapsulated by the second tunnel communication device and is transmitted to the second information processing device. At least one of the packet transmitted from the second information processing device to the first information processing device and the packet transmitted from the first tunnel communication device through the path of the P2P communication is translated in address by the second address translating unit.

According to this configuration, without a user's making a complex setup, the first information processing device and the second information processing device belonging to different networks can communicate with each other as if they belong to the same network. Accordingly, the first information processing device and the second information processing device can perform processes such as sharing of a file which can be performed when they belong to the same network, even when they practically belong to different networks.

In the information processing system, the first address correlating information may include information for correlating an address of the first information processing device in the first LAN with an address of the first information processing device in the second LAN. The first address correlating information may include information for correlating an address of the second information processing device in the first LAN with an address of the second information processing device in the second LAN.

The second address correlating information may include information for correlating an address of the first information processing device in the first LAN with an address of the first information processing device in the second LAN. The second address correlating information may include information for correlating an address of the second information processing device in the first LAN with an address of the second information processing device in the second LAN. According to this configuration, the first address correlating information and the second address correlating information are equal to each other.

In the information processing system, the first address translating unit may translate addresses of a source and a destination of a packet transmitted from the first information processing device to the second information processing device on the basis of the first address correlating information. The second address translating unit may translate addresses of a source and a destination of a packet transmitted from the second information processing device to the first information processing device on the basis of the second address correlating information.

According to this configuration, when a packet is transmitted from one device to the other device, only one address translating operation is performed. Accordingly, it is possible to reduce the time for translating an address, compared with a case where two address translating operations are performed. Since only one address translating operation is performed, it is possible to reduce a process load for translating an address, compared with a case where two address translating operations are performed.

In the information processing system, the first address translating unit may translate addresses of a source and a destination of a packet transmitted from the second information processing device to the first information processing device on the basis of the first address correlating information. The second address translating unit may translate addresses of a source and a destination of a packet transmitted from the first information processing device to the second information processing device on the basis of the second address correlating information.

According to this configuration, when a packet is transmitted from one device to the other device, only one address translating operation is performed. Accordingly, it is possible to reduce the time for translating an address, compared with a case where two address translating operations are performed. Since only one address translating operation is performed, it is possible to reduce a process load for translating an address, compared with a case where two address translating operations are performed.

The information processing system may further include a first address assignor and a second address assignor. The first address assignor is connected to the first LAN and assigns an address to a device connected to the first LAN. The second address assignor is connected to the second LAN and assigns an address to a device connected to the second LAN.

The first tunnel communication device may include a first address acquiring unit, a first address receiving unit, a first device address acquiring unit, a storage unit, and a first address transmitting unit. The first address acquiring unit acquires an address of the second information processing device in the first LAN from the first address assignor. The first address receiving unit receives an address of the second information processing device in the second LAN and an address of the first information processing device in the second LAN. The first device address acquiring unit acquires an address of the first information processing device in the first LAN. The first storage unit stores the first address correlating information in the first address correlating information memory unit on the basis of the address acquired by the first address acquiring unit, the address received by the first address receiving unit, and the address acquired by the first device address acquiring unit.

The first address transmitting unit transmits the address of the second information processing device acquired by the first address acquiring unit and the address of the first information processing device acquired by the first device address acquiring unit to the second tunnel communication device. The second tunnel communication device may include a second address acquiring unit, a second address receiving unit, a second device address acquiring unit, a second storage unit, and a second address transmitting unit. The second address acquiring unit acquires an address of the first information processing device in the second LAN from the second address assignor. The second address receiving unit receives an address of the first information processing device in the first LAN and an address of the second information processing device in the first LAN.

The second device address acquiring unit acquires an address of the second information processing device in the second LAN. The second storage unit stores the second address correlating information in the second address correlating information memory unit on the basis of the address acquired by the second address acquiring unit, the address received by the second address receiving unit, and the address acquired by the second device address acquiring unit. The second address transmitting unit transmits the address of the first information processing device acquired by the second address acquiring unit and the address of the second information processing device acquired by the second device address acquiring unit to the first tunnel communication device. According to this configuration, it is possible to store the first address correlating information and the second address correlating information.

The information processing system may have the following configuration. The first device address acquiring unit acquires an address of the first information processing device in the first LAN and a physical address of the first information processing device. The second device address acquiring unit acquires an address of the second information processing device in the second LAN and a physical address of the second information processing device. The first address transmitting unit transmits the address of the second information processing device acquired by the first address acquiring unit, the address of the first information processing device acquired by the first device address acquiring unit, and the physical address of the first information processing device. The second address transmitting unit transmits the address of the first information processing device acquired by the second address acquiring unit, the address of the second information processing device acquired by the second device address acquiring unit, and the physical address of the second information processing device.

The first address receiving unit receives the address of the second information processing device in the second LAN, the address of the first information processing device in the second LAN, and the physical address of the second information processing device. The second address receiving unit receives the address of the first information processing device in the first LAN, the address of the second information processing device in the first LAN, and the physical address of the first information processing device. The first address acquiring unit acquires the address of the second information processing device in the first LAN by the use of the physical address of the second information processing device received by the first address receiving unit. The second address acquiring unit acquires the address of the first information processing device in the second LAN by the use of the physical address of the first information processing device received by the second address receiving unit.

According to this configuration, since an address is acquired using the actual physical address of the opposite information processing device, it is possible to avoid the overlap of a physical address in one LAN, thereby allowing the address acquiring unit to acquire a proper address.

The information processing system may have the following configuration. The first address correlating information includes information for correlating an address of the first information processing device in the first LAN with an address of the first information processing device in the second LAN. The second address correlating information includes information for correlating an address of the second information processing device in the first LAN with an address of the second information processing device in the second LAN. The first address translating unit translates a source address of a packet transmitted from the first information processing device to the second information processing device on the basis of the first address correlating information. The first address translating unit translates a destination address of a packet transmitted from the second information processing device to the first information processing device on the basis of the first address correlating information.

The second address translating unit translates a destination address of a packet transmitted from the first information processing device to the second information processing device on the basis of the second address correlating information. The second address translating unit translates a source address of a packet transmitted from the second information processing device to the first information processing device on the basis of the second address correlating information. According to this configuration, the address correlating information used in one LAN does not include the actual address of the device belonging to the other LAN. Accordingly, this configuration is useful for a case where the address in one LAN is not intended to be known to the other LAN.

The information processing system may further include a first address assignor and a second address assignor. The first address assignor is connected to the first LAN and assigns an address to a device connected to the first LAN. The second address assignor is connected to the second LAN and assigns an address to a device connected to the second LAN. The first tunnel communication device may further include a first address acquiring unit, a first address receiving unit, a first device address acquiring unit, a first storage unit, and a first address transmitting unit. The first address acquiring unit acquires an address of the second information processing device in the first LAN from the first address assignor. The first address receiving unit receives an address of the first information processing device in the second LAN.

The first device address acquiring unit acquires an address of the first information processing device in the first LAN. The first storage unit stores the first address correlating information in the first address correlating information memory unit on the basis of the address acquired by the first address acquiring unit and the address acquired by the first device address acquiring unit. The first address transmitting unit transmits the address of the second information processing device acquired by the first address acquiring unit to the second tunnel communication device. The second tunnel communication device may further include a second address acquiring unit, a second address receiving unit, a second device address acquiring unit, a second storage unit, and a second address transmitting unit. The second address acquiring unit acquires an address of the first information processing device in the second LAN from the second address assignor. The second address receiving unit receives an address of the second information processing device in the first LAN.

The second device address acquiring unit acquires an address of the second information processing device in the second LAN. The second storage unit stores the second address correlating information in the second address correlating information memory unit on the basis of the address received by the second address receiving unit and the address acquired by the second device address acquiring unit. The second address transmitting unit transmits the address of the first information processing device acquired by the second address acquiring unit to the first tunnel communication device. According to this configuration, it is possible to store the first address correlating information and the second address correlating information.

The information processing system may have the following configuration. The first device address acquiring unit acquires an address of the first information processing device in the first LAN and a physical address of the first information processing device. The second device address acquiring unit acquires an address of the second information processing device in the second LAN and a physical address of the second information processing device. The first address transmitting unit transmits the address of the second information processing device acquired by the first address acquiring unit and the physical address of the first information processing device. The second address transmitting unit transmits the address of the first information processing device acquired by the second address acquiring unit and the physical address of the second information processing device. The first address receiving unit receives the address of the first information processing device in the second LAN and the physical address of the second information processing device.

The second address receiving unit receives the address of the second information processing device in the first LAN and the physical address of the first information processing device. The first address acquiring unit acquires the address of the second information processing device in the first LAN by the use of the physical address of the second information processing device received by the first address receiving unit. The second address acquiring unit acquires the address of the first information processing device in the second LAN by the use of the physical address of the first information processing device received by the second address receiving unit. According to this configuration, since an address is acquired using the actual physical address of the opposite information processing device, it is possible to avoid the overlap of a physical address in one LAN, thereby allowing the address acquiring unit to acquire a proper address.

The information processing system may have the following configuration. The first address correlating information includes information for correlating an address of the second information processing device in the first LAN with an address of the second information processing device in the second LAN. The second address correlating information includes information for correlating an address of the first information processing device in the first LAN with an address of the first information processing device in the second LAN. The first address translating unit translates an destination address of a packet transmitted from the first information processing device to the second information processing device on the basis of the first address correlating information and translates an source address of a packet transmitted from the second information processing device to the first information processing device on the basis of the first address correlating information.

The second address translating unit translates a source address of a packet transmitted from the first information processing device to the second information processing device on the basis of the second address correlating information. The second address translating unit translates a destination address of a packet transmitted from the second information processing device to the first information processing device on the basis of the second address correlating information. According to this configuration, when a packet is transmitted from on information processing device to the other information processing device, both the first tunnel communication device and the second tunnel communication device perform the address translating operation.

The information processing system may further include a first address assignor and a second address assignor. The first address assignor that is connected to the first LAN and assigns an address to a device connected to the first LAN. The second address assignor is connected to the second LAN and assigns an address to a device connected to the second LAN. The first tunnel communication device may include a first address acquiring unit, a first address receiving unit, a first device address acquiring unit, a first storage unit, and a first address transmitting unit. The first address acquiring unit acquires an address of the second information processing device in the first LAN from the first address assignor. The first address receiving unit receives an address of the second information processing device in the second LAN.

The first device address acquiring unit acquires an address of the first information processing device in the first LAN. The first storage unit stores the first address correlating information in the first address correlating information memory unit on the basis of the address acquired by the first device address acquiring unit and the address received by the first address receiving unit. The first address transmitting unit transmits the address of the first information processing device acquired by the first device address acquiring unit to the second tunnel communication device. The second tunnel communication device may include a second address acquiring unit, a second address receiving unit, a second device address acquiring unit, a second storage unit, and a second address transmitting unit. The second address acquiring unit acquires an address of the first information processing device in the second LAN from the second address assignor.

The second address receiving unit receives an address of the first information processing device in the first LAN. The second device address acquiring unit acquires an address of the second information processing device in the second LAN. The second storage unit stores the second address correlating information in the second address correlating information memory unit on the basis of the address acquired by the second device address acquiring unit and the address received by the second address receiving unit. The second address transmitting unit transmits the address of the second information processing device acquired by the second address acquiring unit to the first tunnel communication device. According to this configuration, it is possible to store the first address correlating information and the second address correlating information.

The information processing system may have the following configuration. The first device address acquiring unit acquires an address of the first information processing device in the first LAN and a physical address of the first information processing device. The second device address acquiring unit acquires an address of the second information processing device in the second LAN and a physical address of the second information processing device. The first address transmitting unit transmits the address of the first information processing device acquired by the first device address acquiring unit and the physical address of the first information processing device. The second address transmitting unit transmits the address of the second information processing device acquired by the second device address acquiring unit and the physical address of the second information processing device. The first address receiving unit receives the address of the second information processing device in the second LAN and the physical address of the second information processing device.

The second address receiving unit receives the address of the first information processing device in the first LAN and the physical address of the first information processing device. The first address acquiring unit acquires the address of the second information processing device in the first LAN by the use of the physical address of the second information processing device received by the first address receiving unit. The second address acquiring unit acquires the address of the first information processing device in the second LAN by the use of the physical address of the first information processing device received by the second address receiving unit. According to this configuration, since an address is acquired using the actual physical address of the opposite information processing device, it is possible to avoid the overlap of a physical address in one LAN, thereby allowing the address acquiring unit to acquire a proper address.

The information processing system may have the following configuration. The first address correlating information includes information for correlating an address of the first information processing device in the first LAN with identification information of the first information processing device. The first address correlating information includes information for correlating an address of the second information processing device in the first LAN with identification information of the second information processing device. The second address correlating information includes information for correlating an address of the first information processing device in the second LAN with the identification information of the first information processing device. The second address correlating information includes information for correlating an address of the second information processing device in the second LAN with the identification information of the second information processing device.

The first address translating unit translates addresses of a destination and a source of a packet transmitted from the first information processing device to the second information processing device on the basis of the first address correlating information. The first address translating unit translates addresses of a destination of a source of a packet transmitted from the second information processing device to the first information processing device on the basis of the first address correlating information. The second address translating unit translates addresses of a destination and a source of a packet transmitted from the second information processing device to the first information processing device on the basis of the second address correlating information. The second address translating unit translates addresses of a destination of a source of a packet transmitted from the first information processing device to the second information processing device on the basis of the second address correlating information.

According to this configuration, the address correlating information used in one LAN does not include the actual address of the device belonging to the other LAN. Accordingly, this configuration is useful for a case where the address in one LAN is not intended to be known to the other LAN.

The information processing system may further include a first address assignor and a second address assignor. The first address assignor is connected to the first LAN and assigns an address to a device connected to the first LAN. The second address assignor is connected to the second LAN and assigns an address to a device connected to the second LAN. The first tunnel communication device may further include a first address acquiring unit, a first device address acquiring unit, and a first storage unit. The first address acquiring unit acquires an address of the second information processing device in the first LAN from the first address assignor. The first device address acquiring unit acquires an address of the first information processing device in the first LAN. The first storage unit stores the first address correlating information in the first address correlating information memory unit on the basis of the address acquired by the first address acquiring unit and the address acquired by the first device address acquiring unit.

The second tunnel communication device may include a second address acquiring unit, a second device address acquiring unit, and a second storage unit. The second address acquiring unit acquires an address of the first information processing device in the second LAN from the second address assignor. The second device address acquiring unit acquires an address of the second information processing device in the second LAN. The second storage unit stores the second address correlating information in the second address correlating information memory unit on the basis of the address acquired by the second address acquiring unit and the address acquired by the second device address acquiring unit. According to this configuration, it is possible to store the first address correlating information and the second address correlating information.

The information processing system may have the following configuration. The first tunnel communication device may include a first address transmitting unit and a first address receiving unit. The first address transmitting unit transmits identification information corresponding to the address of the first information processing device. The first address receiving unit receives identification information corresponding to the address of the second information processing device. The first storage unit stores the first address correlating information on the basis of the address acquired by the first address acquiring unit, the address acquired by the first device address acquiring unit, the identification information transmitted from the first address transmitting unit, and the identification information received by the first address receiving unit, The second tunnel communication device may include a second address transmitting unit and a second address receiving unit. The second address transmitting unit transmits identification information corresponding to the address of the second information processing device. The second address receiving unit receives identification information corresponding to the address of the first information processing device. The second storage unit stores the second address correlating information on the basis of the address acquired by the second address acquiring unit, the address acquired by the second device address acquiring unit, the identification information transmitted from the second address transmitting unit, and the identification information received by the second address receiving unit. According to this configuration, it is possible to store the address correlating information by the use of the identification information transmitted from the opposite party.

An information processing system according to the invention includes a first tunnel communication device, one or more first information processing devices, a second tunnel communication device, and one or more second information processing device. The first tunnel communication device is connected to a first LAN. The first information processing device is connected to the first LAN. The second tunnel communication device is connected to a second LAN connected to the first LAN through a communication line. The second information processing device is connected to the second LAN.

The first tunnel communication device includes an address correlating information memory unit, an address translating unit, a first P2P communication setup unit, and a first tunnel communication device. The address correlating information memory unit stores address correlating information which is information for correlating an address in the first LAN with an address in the second LAN. The address translating unit translates an address of a packet on the basis of the address correlating information stored in the address correlating information memory unit. The first P2P communication setup unit sets up a P2P communication with the second tunnel communication device. The first tunnel communication unit makes a tunnel communication through a path of the P2P communication set up by the first P2P communication setup unit.

A packet transmitted from the first information processing device to the second information processing device is encapsulated by the first tunnel communication device and is transmitted through the path of the P2P communication. An encapsulated packet transmitted from the second tunnel communication device through the path of the P2P communication is decapsulated by the first tunnel communication device and is transmitted to the first information processing device. The packet transmitted from the first information processing device to the second information processing device and the packet transmitted from the second tunnel communication device through the path of the P2P communication are translated in address by the address translating unit.

The second tunnel communication device includes a second P2P communication setup unit and a second tunnel communication unit. The second P2P communication setup unit sets up a P2P communication with the first tunnel communication device. The second tunnel communication unit makes a tunnel communication through a path of the P2P communication set up by the second P2P communication setup unit. A packet transmitted from the second information processing device to the first information processing device is encapsulated by the second tunnel communication device and is transmitted through the path of the P2P communication. An encapsulated packet transmitted from the first tunnel communication device through the path of the P2P communication is decapsulated by the second tunnel communication device and is transmitted to the second information processing device.

According to this configuration, without a user's making a complex setup, the first information processing device and the second information processing device belonging to different networks can communicate with each other as if they belong to the same network. Accordingly, the first information processing device and the second information processing device can perform processes such as sharing of a file which can be performed when they belong to the same network, even when they practically belong to different networks.

The information processing system may have the following configuration. The address correlating information includes information for correlating an address of the first information processing device in the first LAN with an address of the first information processing device in the second LAN. The address correlating information includes information for correlating an address of the second information processing device in the first LAN with an address of the second information processing device in the second LAN. The address translating unit translates addresses of a source and a destination of a packet transmitted from the first information processing device to the second information processing device on the basis of the address correlating information.

The address translating unit translates addresses of a source and a destination of a packet transmitted from the second information processing device to the first information processing device on the basis of the address correlating information. According to this configuration, when a packet is transmitted from one device to the other device, only one address translating operation is performed. Accordingly, it is possible to reduce the time for translating an address, compared with a case where two address translating operations are performed.

The information processing system may further include a first address assignor and a second address assignor. The first address assignor is connected to the first LAN and assigns an address to a device connected to the first LAN. The second address assignor is connected to the second LAN and assigns an address to a device connected to the second LAN.

The first tunnel communication device may include a first address acquiring unit, a first address receiving unit, a first device address acquiring unit, and a storage unit. The first address acquiring unit acquires an address of the second information processing device in the first LAN from the first address assignor. The first address receiving unit receives an address of the second information processing device in the second LAN and an address of the first information processing device in the second LAN. The first device address acquiring unit acquires an address of the first information processing device in the first LAN. The storage unit stores the first address correlating information in the first address correlating information memory unit on the basis of the address acquired by the first address acquiring unit, the address received by the first address receiving unit, and the address acquired by the first device address acquiring unit.

The second tunnel communication device may include a second address acquiring unit, a second device address acquiring unit, and a second address transmitting unit. The second address acquiring unit acquires an address of the first information processing device in the second LAN from the second address assignor. The second device address acquiring unit that acquires an address of the second information processing device in the second LAN. The second address transmitting unit that transmits the address of the first information processing device acquired by the second address acquiring unit and the address of the second information processing device acquired by the second device address acquiring unit to the first tunnel communication device. According to this configuration, it is possible to store the address correlating information.

The information processing system may have the following configuration. The first device address acquiring unit acquires an address of the first information processing device in the first LAN and a physical address of the first information processing device. The second device address acquiring unit acquires an address of the second information processing device in the second LAN and a physical address of the second information processing device. The first tunnel communication device further includes a first address transmitting unit that transmits a physical address of the first information processing device acquired by the first device address acquiring unit.

The second tunnel communication device further includes a second address receiving unit that receives the physical address of the first information processing device. The second address transmitting unit transmits the address of the first information processing device acquired by the second address acquiring unit, the address of the second information processing device acquired by the second device address acquiring unit, and the physical address of the second information processing device. The first address receiving unit receives the address of the second information processing device in the second LAN, the address of the first information processing device in the second LAN, and the physical address of the second information processing device.

The first address acquiring unit acquires the address of the second information processing device in the first LAN by the use of the physical address of the second information processing device received by the first address receiving unit. The second address acquiring unit acquires the address of the first information processing device in the second LAN by the use of the physical address of the first information processing device received by the second address receiving unit. According to this configuration, since an address is acquired using the actual physical address of the opposite information processing device, it is possible to avoid the overlap of a physical address in one LAN, thereby allowing the address acquiring unit to acquire a proper address.

The information processing system may have the following configuration. The first tunnel communication device may further include a first presence confirming information receiving unit and a first reply information transmitting unit. The first presence confirming information receiving unit receives presence confirming information which is information transmitted to confirm presence of a device. The first reply information transmitting unit transmits reply information which is information in response to the presence confirming information, instead of the second information processing device, when the first presence confirming information receiving unit receives the presence confirming information.

According to this configuration, it is possible to reply to the presence confirming information instead of the second information processing device. For example, when it is determined on the basis of the time from the transmission of the presence confirming information to the reply thereto whether the device is present in a predetermined building or in a predetermined network; it is possible to allow the second information processing device to act as if it belongs to the first LAN.

The information processing system may have the following configuration. The second tunnel communication device further includes a second presence confirming information receiving unit and a second reply information transmitting unit. The second presence confirming information receiving unit receives presence confirming information which is information transmitted to confirm presence of a device. The second reply information transmitting unit transmits reply information which is information in response to the presence confirming information, instead of the first information processing device, when the second presence confirming information receiving unit receives the presence confirming information.

According to this configuration, it is possible to reply to the presence confirming information instead of the first information processing device. For example, when it is determined on the basis of the time from the transmission of the presence confirming information to the reply thereto whether the device is present in a predetermined building or in a predetermined network, it is possible to allow the first information processing device to act as if it belongs to the second LAN.

In the information processing system, the first tunnel communication device may further include a first interface (hereinafter, referred to as "I/F") that is connected to the first LAN. The first tunnel communication device communicates with the first information processing device through the first interface, and the first tunnel communication unit makes a tunnel communication through the first interface. According to this configuration, by connecting the first tunnel communication device to the first LAN, it is possible to allow the first information processing device and the second information processing device to act as if they belong to the same network.

The information processing system may have the following configuration. The first tunnel communication device includes a first wide interface on a wide network side and a first local interface on a local network side. The first tunnel communication device communicates with the first information processing device through the first local interface. The first tunnel communication unit makes a tunnel communication through the first wide interface.

According to this configuration, the first information processing device is connected to the local side of the first tunnel communication device. Accordingly, it is possible to easily distinguish the packet transmitted from the first information processing device and the packet transmitted from the first tunnel communication device from each other. In this case, the first tunnel communication device can satisfactorily receive the packet transmitted from the first information processing device.

In the information processing system, the first tunnel communication device further includes a first communication restricting unit that restricts a communication so as not to transmit a packet transmitted from a device connected to the first LAN and connected to the first wide interface through the path of the P2P communication. According to this configuration, since a predetermined communication can be restricted by the first communication restricting unit, it is possible to enhance communication safety.

The information processing device may have the following configuration. The second tunnel communication device includes a second interface that is connected to the second LAN. The second tunnel communication device communicates with the second information processing device through the second interface. The second tunnel communication unit makes a tunnel communication through the second interface. According to this configuration, by connecting the first tunnel communication device to the first LAN, it is possible to allow the first information processing device and the second information processing device to act as if they belong to the same network.

The information processing system may have the following configuration. The second tunnel communication device includes a second wide interface on a wide network side and a second local interface on a local network side. The second tunnel communication device communicates with the second information processing device through the second local interface. The second tunnel communication unit makes a tunnel communication through the second wide interface.

According to this configuration, the second information processing device is connected to the local side of the second tunnel communication device. Accordingly, it is possible to easily distinguish the packet transmitted from the second information processing device and the packet transmitted from the second tunnel communication device from each other. In this case, the second tunnel communication device can satisfactorily receive the packet transmitted from the second information processing device.

The information processing system may have the following configuration. The second tunnel communication device further includes a second communication restricting unit that restricts a communication so as not to transmit a packet transmitted from a device connected to the second LAN and connected to the second wide interface through the path of the P2P communication. According to this configuration, since a predetermined communication can be restricted by the first communication restricting unit, it is possible to enhance communication safety.

A proxy response device according to the invention is a proxy response device that responses by proxy instead of an information processing device. The information processing device and the proxy response device are connected to different LANs, respectively. The proxy response device includes a presence confirming information receiving unit and a reply information transmitting unit. The presence confirming information receiving unit receives presence confirming information which is information transmitted to confirm presence of a device. The reply information transmitting unit transmits reply information in response to the presence confirming information instead of the information processing device when the presence confirming information receiving unit receives the presence confirming information.

Accordingly, it is possible to response by proxy instead of the information processing device. For example, when it is determined on the basis of the time from the transmission of the presence confirming information to the reply thereto whether the device is present in a predetermined building or in a predetermined network, it is possible to allow the information processing device to act as if it belongs to the network to which the proxy response device is connected.

BRIEF DESCRIPTION OF THE DRAWINGS

FIG. 7 is a diagram illustrating another address translating operation of the information processing system according to the first embodiment.

FIG. 21 is a diagram illustrating an address acquiring operation and an inter-device communicating operation of the information processing system according to the first embodiment.

FIG. 22 is a diagram illustrating an example of the address correlating information of the information processing system according to the first embodiment.

FIG. 23 is a diagram illustrating another example of the address correlating information of the information processing system according to the first embodiment.

DESCRIPTION OF REFERENCE NUMERALS AND SIGNS

Figure 1:
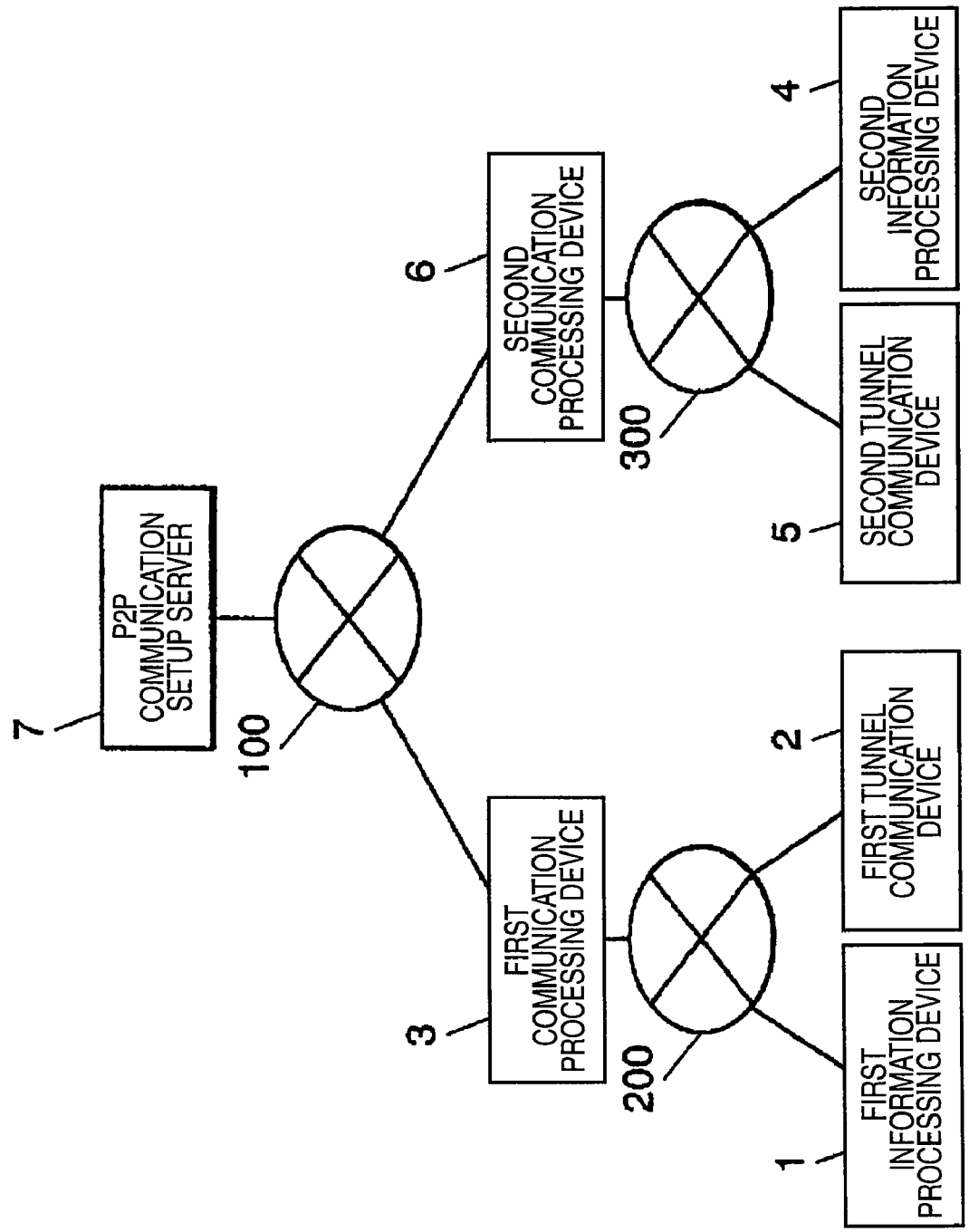
FIG. 1 is a block diagram illustrating a configuration of an information processing system according to a first embodiment of the invention.

1: FIRST INFORMATION PROCESSING DEVICE
2, 10: FIRST TUNNEL COMMUNICATION DEVICE
3: FIRST COMMUNICATION PROCESSING DEVICE
4: SECOND INFORMATION PROCESSING DEVICE
5, 8, 20: SECOND TUNNEL COMMUNICATION DEVICE
6: SECOND COMMUNICATION PROCESSING DEVICE
7: P2P COMMUNICATION SETUP SERVER
21: SECOND ADDRESS CORRELATING INFORMATION MEMORY UNIT
22: FIRST ADDRESS TRANSLATING UNIT
23: FIRST P2P COMMUNICATION SETUP UNIT
24: FIRST TUNNEL COMMUNICATION UNIT
25: FIRST ADDRESS ACQUIRING UNIT
26: FIRST DEVICE ADDRESS ACQUIRING UNIT
27: FIRST ADDRESS RECEIVING UNIT
28: FIRST ADDRESS TRANSMITTING UNIT
29: FIRST STORAGE UNIT
31: FIRST ADDRESS ASSINGNOR
32: FIRST PRESENCE CONFIRMING INFORMATION RECEIVING UNIT
33: FIRST REPLY INFORMATION TRANSMITTING UNIT
34: FIRST INTERFACE (FIRST I/F)
51: SECOND ADDRESS CORRELATING INFORMATION MEMORY UNIT
52: SECOND ADDRESS TRANSLATING UNIT
53: SECOND P2P COMMUNICATION SETUP UNIT
54: SECOND TUNNEL COMMUNICATION UNIT
55: SECOND ADDRESS ACQUIRING UNIT
56: SECOND DEVICE ADDRESS ACQUIRING UNIT
57: SECOND ADDRESS RECEIVING UNIT
58: SECOND ADDRESS TRANSMITTING UNIT
59: SECOND STORAGE UNIT
61: SECOND ADDRESS ASSIGNOR
62: SECOND PRESENCE CONFIRMING INFORMATION RECEIVING UNIT
63: SECOND REPLY INFORMATION TRANSMITTING UNIT

64: SECOND INTERFACE (SECOND I/F)
70: FIRST PROXY RESPONSE DEVICE
71: PRESENCE CONFIRMING INFORMATION RECEIVING UNIT
72: REPLY INFORMATION TRANSMITTING UNIT
80: SECOND PROXY RESPONSE DEVICE
101: FIRST WIDE INTERFACE (FIRST WIDE I/F)
102: FIRST LOCAL INTERFACE (FIRST LOCAL I/F)
103: FIRST COMMUNICATION RESTRICTING UNIT
200: FIRST LOCAL AREA NETWORK (FIRST LAN)
201: SECOND WIDE INTERFACE (SECOND WIDE I/F)
202: SECOND LOCAL INTERFACE (SECOND LOCAL I/F)
203: SECOND COMMUNICATION RESTRICTING UNIT
300: SECOND LOCAL AREA NETWORK (SECOND LAN)
301, 302, 303: CPU (COMPUTER)
305, 306, 307: RECORDING MEDIUM

BEST MODE FOR CARRYING OUT THE INVENTION

Hereinafter, embodiments of the invention will be described with the accompanying drawings. In the following embodiments, elements and steps denoted by like reference numerals are equal to each other or correspond to each other and description thereof may be omitted.

First Embodiment

Figure 2:
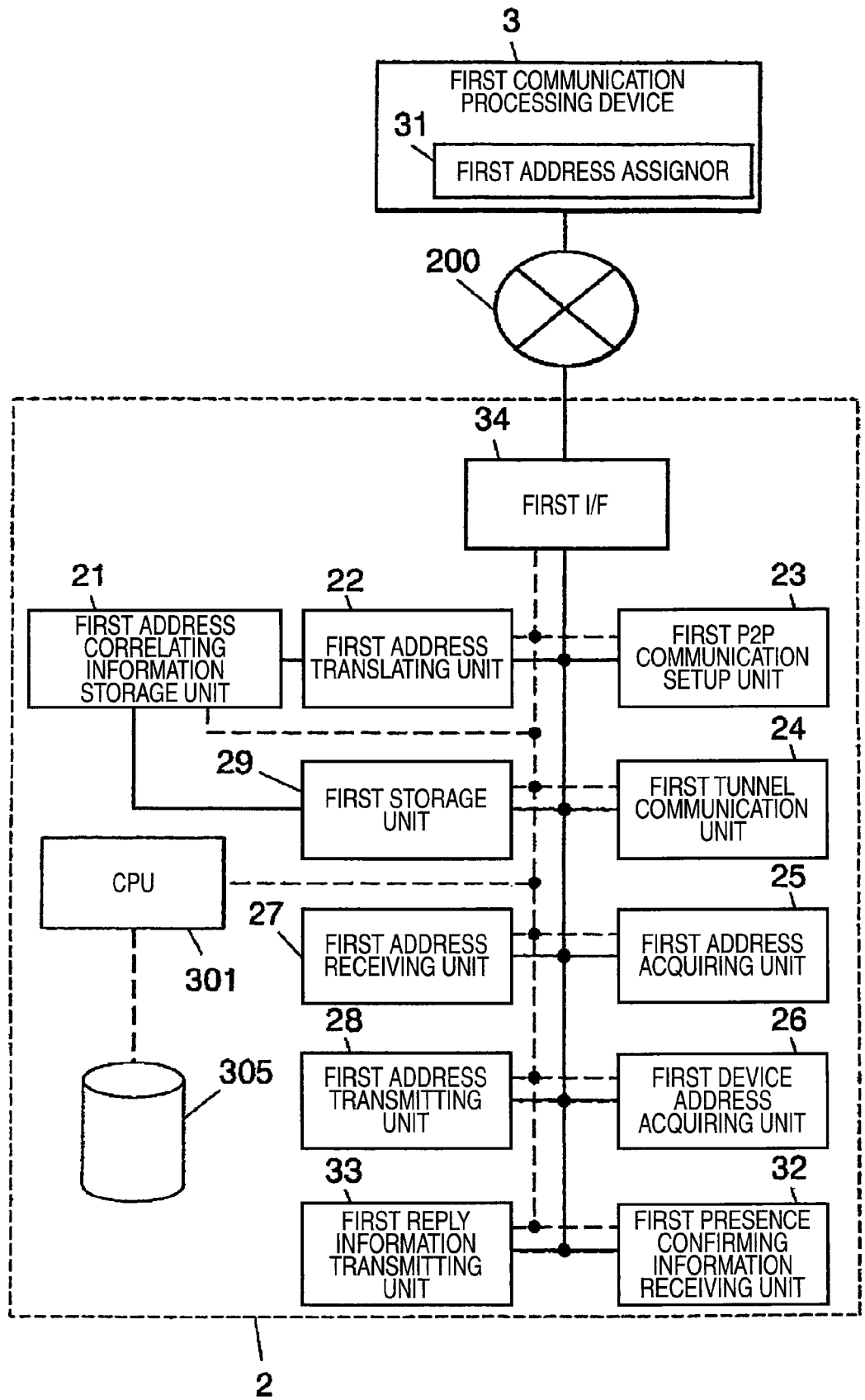
FIG. 2 is a diagram illustrating a part of the configuration of the information processing system, which includes a block diagram illustrating a first tunnel communication device according to the first embodiment.
Figure 3:
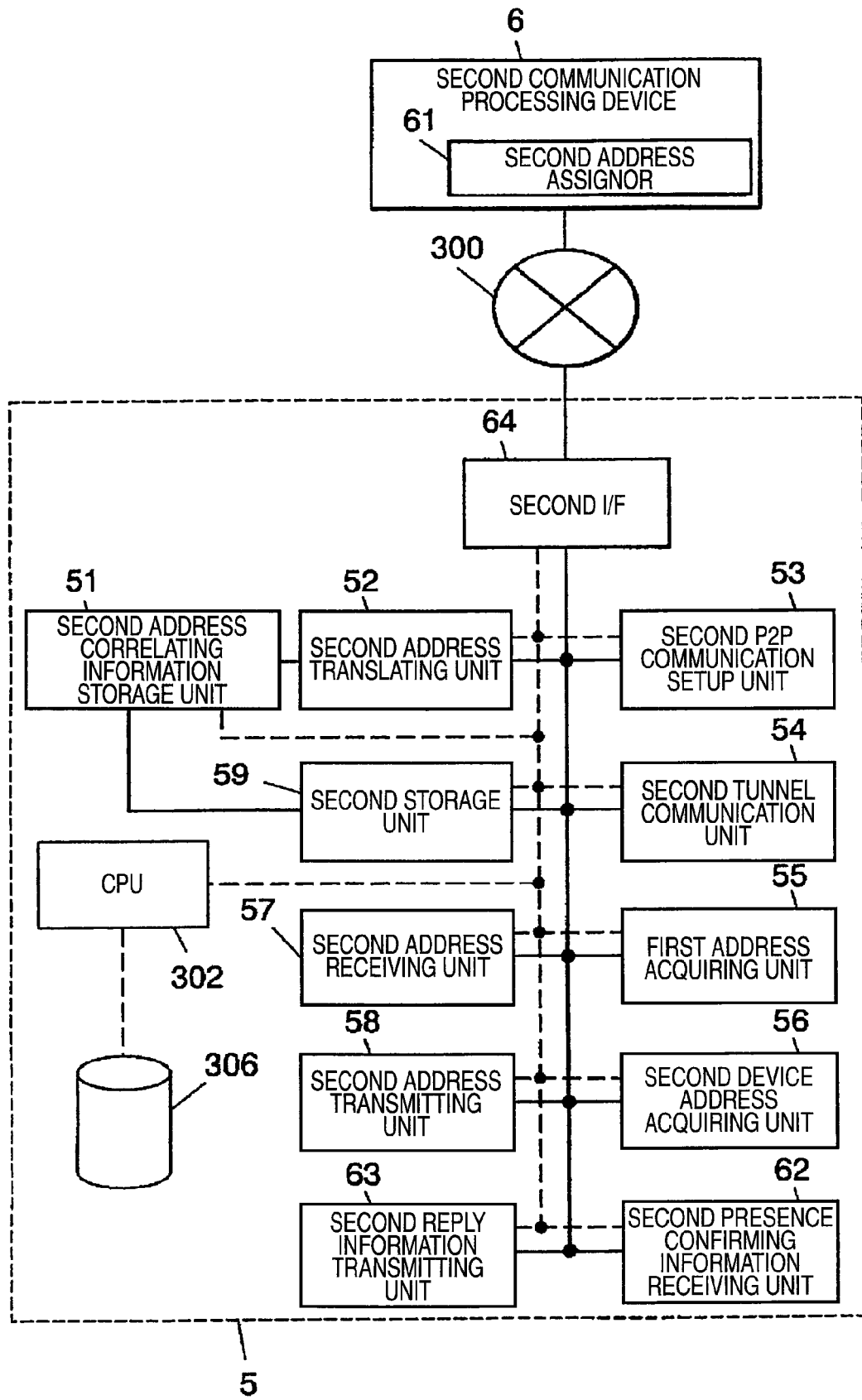
FIG. 3 is a diagram illustrating a part of the configuration of the information processing system, which includes a block diagram illustrating a second tunnel communication device according to the first embodiment.
Figure 4:
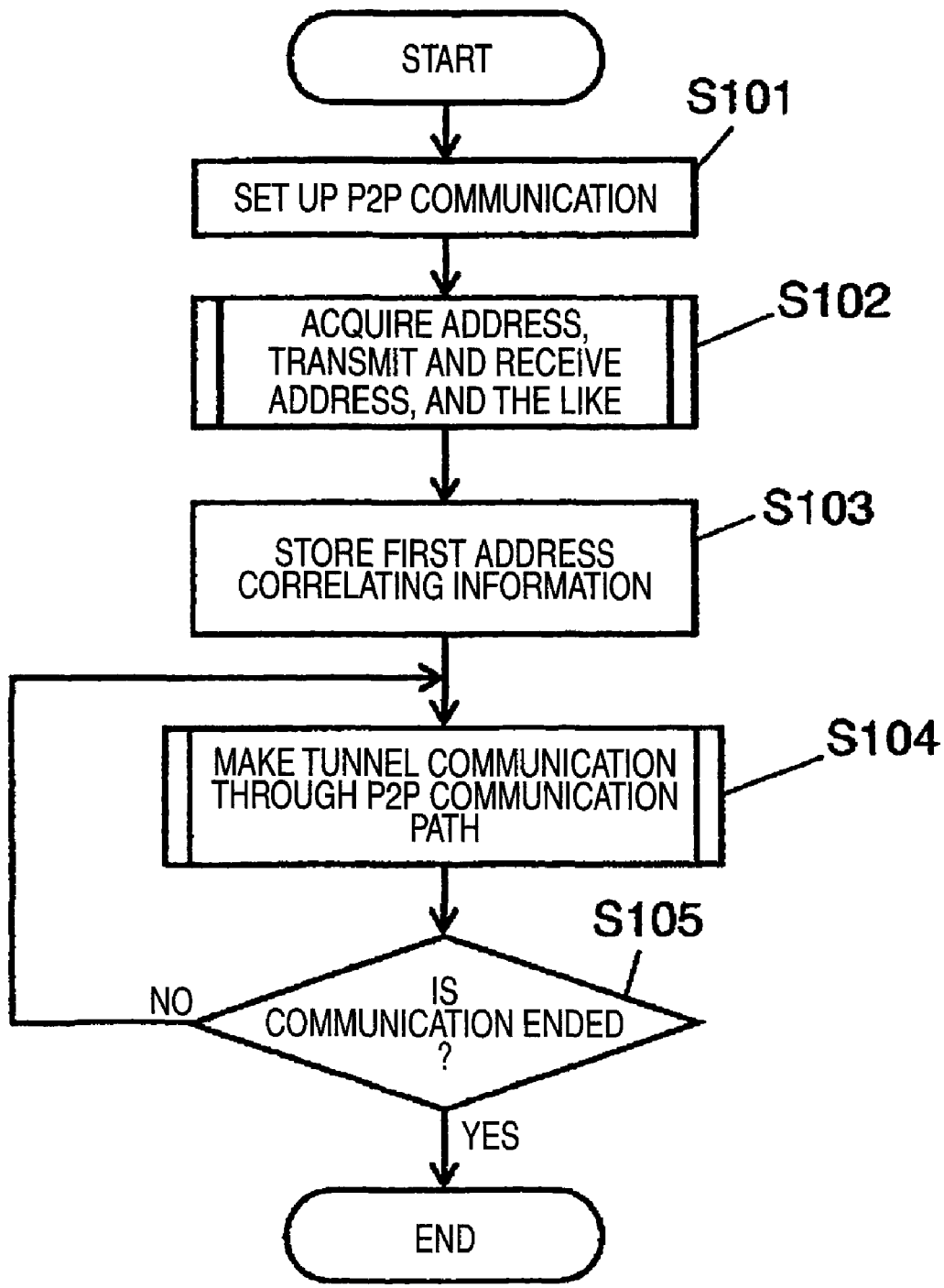
FIG. 4 is a flowchart illustrating an operation of the first tunnel communication device according to the first embodiment.
Figure 5:
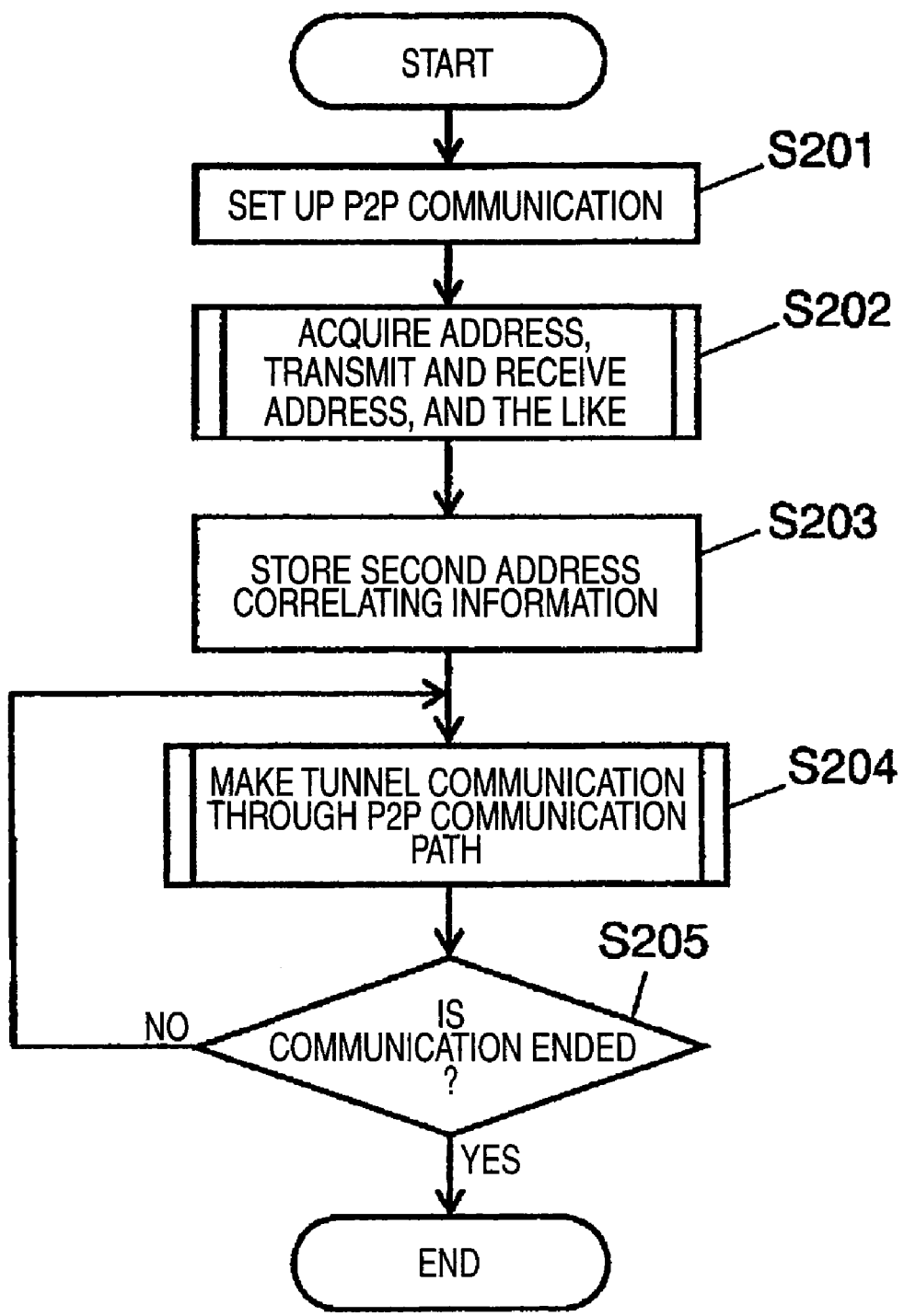
FIG. 5 is a flowchart illustrating an operation of the second tunnel communication device according to the first embodiment.
Figure 6:
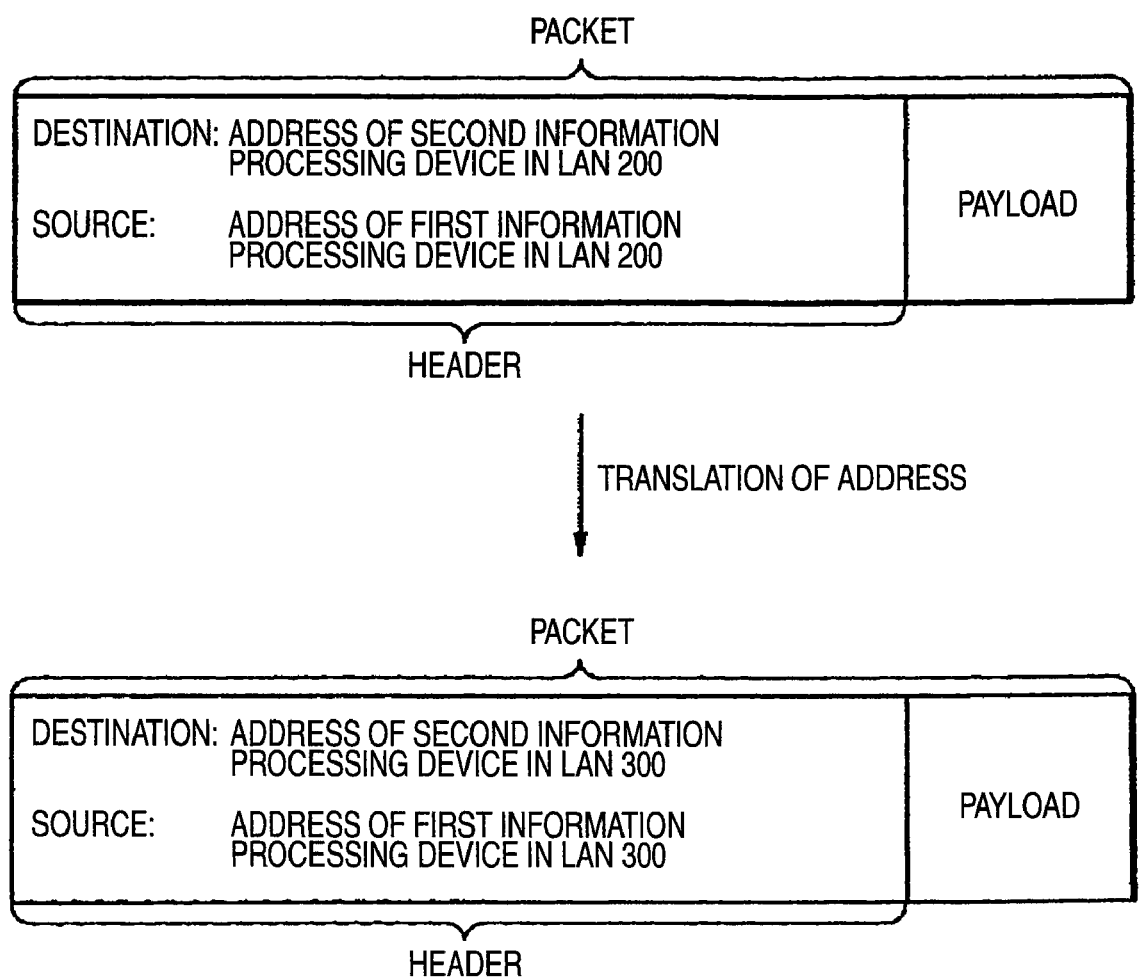
FIG. 6 is a diagram illustrating an address translating operation of the information processing system according to the first embodiment.

FIG. 1 is a block diagram illustrating a configuration of an information processing system according to a first embodiment of the invention. FIG. 2 is a diagram illustrating a part of the configuration of the information processing system, which includes a block diagram illustrating a first tunnel communication device according to the first embodiment. FIG. 3 is a diagram illustrating a part of the configuration of the information processing system, which includes a block diagram illustrating a second tunnel communication device according to the first embodiment. FIG. 4 is a flowchart illustrating an operation of the first tunnel communication device according to the first embodiment. FIG. 5 is a flowchart illustrating an operation of the second tunnel communication device according to the first embodiment. FIG. 6 is a diagram illustrating an address translating operation of the information processing system according to the first embodiment.

Figure 8:
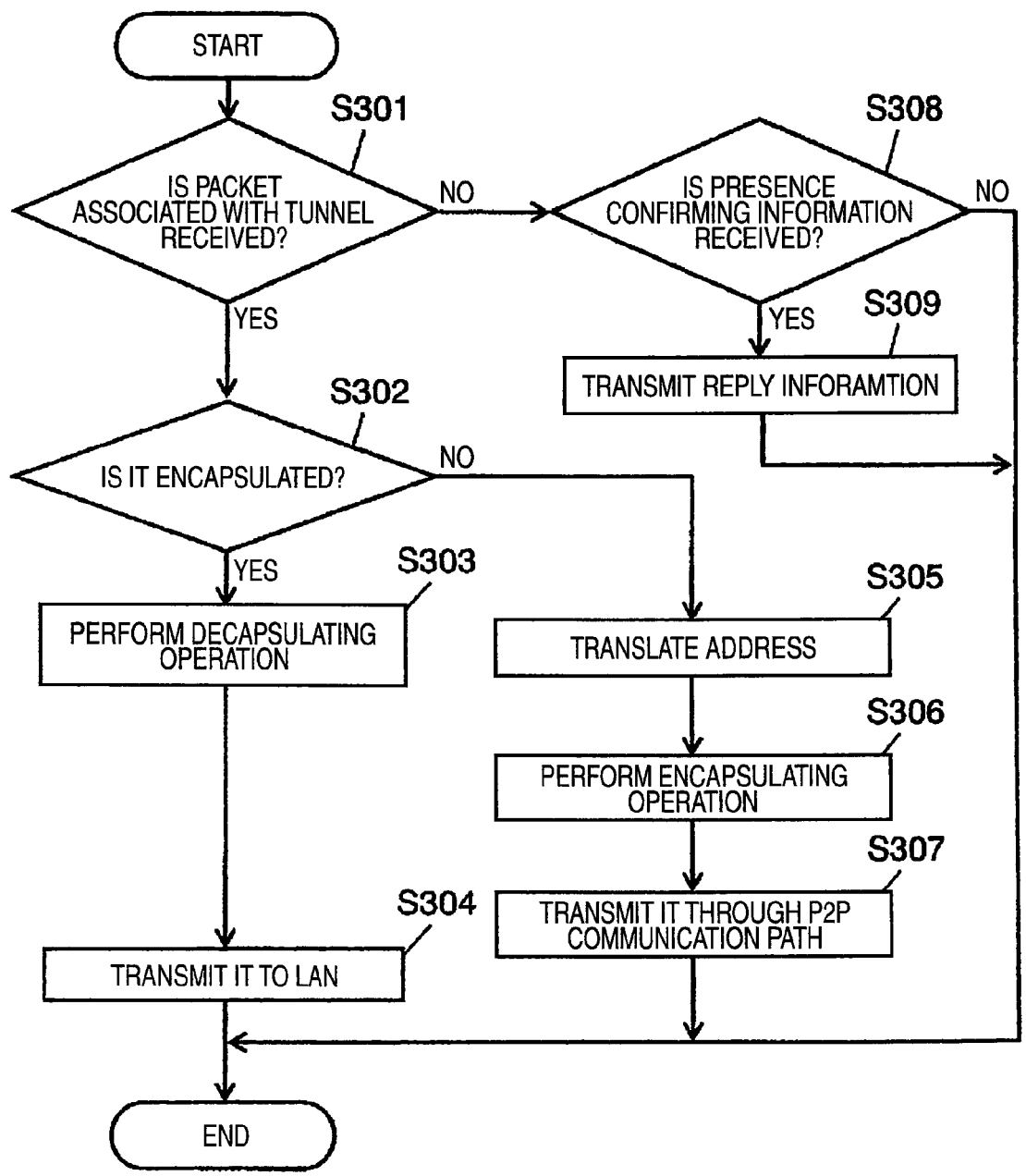
FIG. 8 is a flowchart illustrating an operation of the first tunnel communication device according to the first embodiment.
Figure 9:
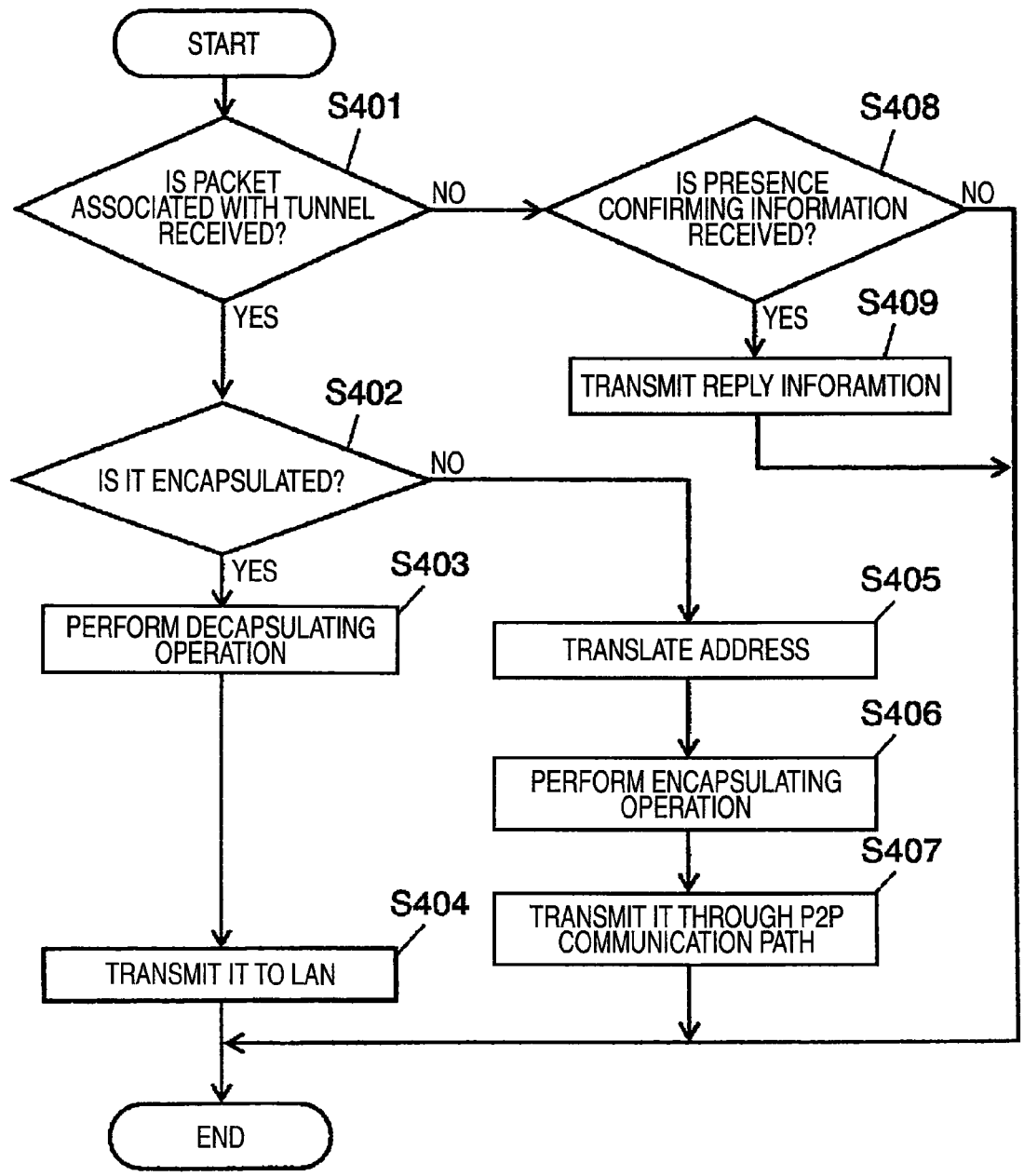
FIG. 9 is a flowchart illustrating an operation of the second tunnel communication device according to the first embodiment.
Figure 10:
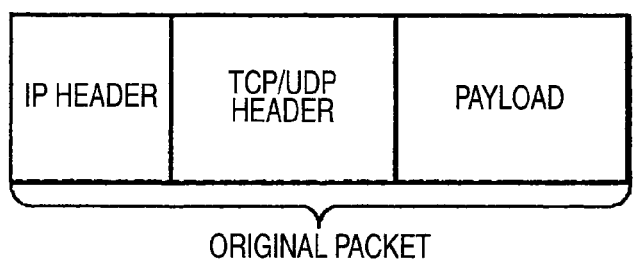
FIG. 10 is a diagram illustrating an encapsulating operation of the information processing system according to the first embodiment.
Figure 11:
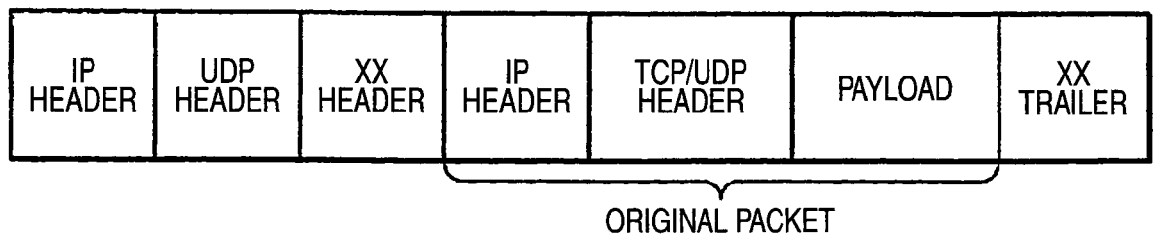
FIG. 11 is a diagram illustrating another encapsulating operation of the information processing system according to the first embodiment.
Figure 12:
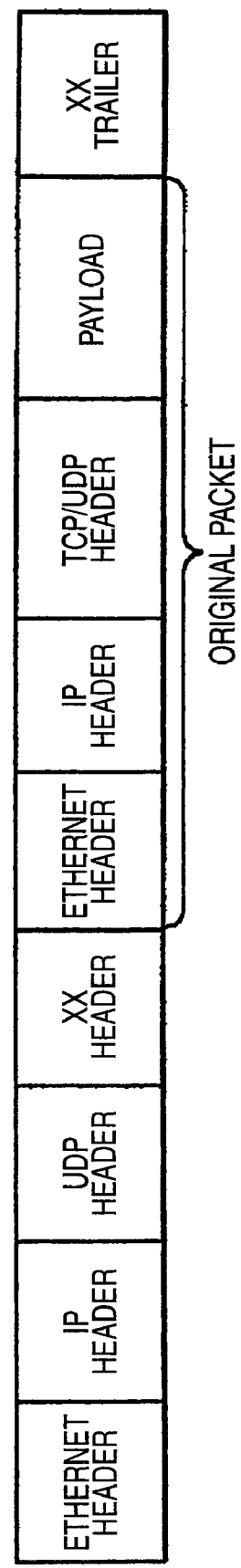
FIG. 12 is a diagram illustrating another encapsulating operation of the information processing system according to the first embodiment.
Figures 13, 14:
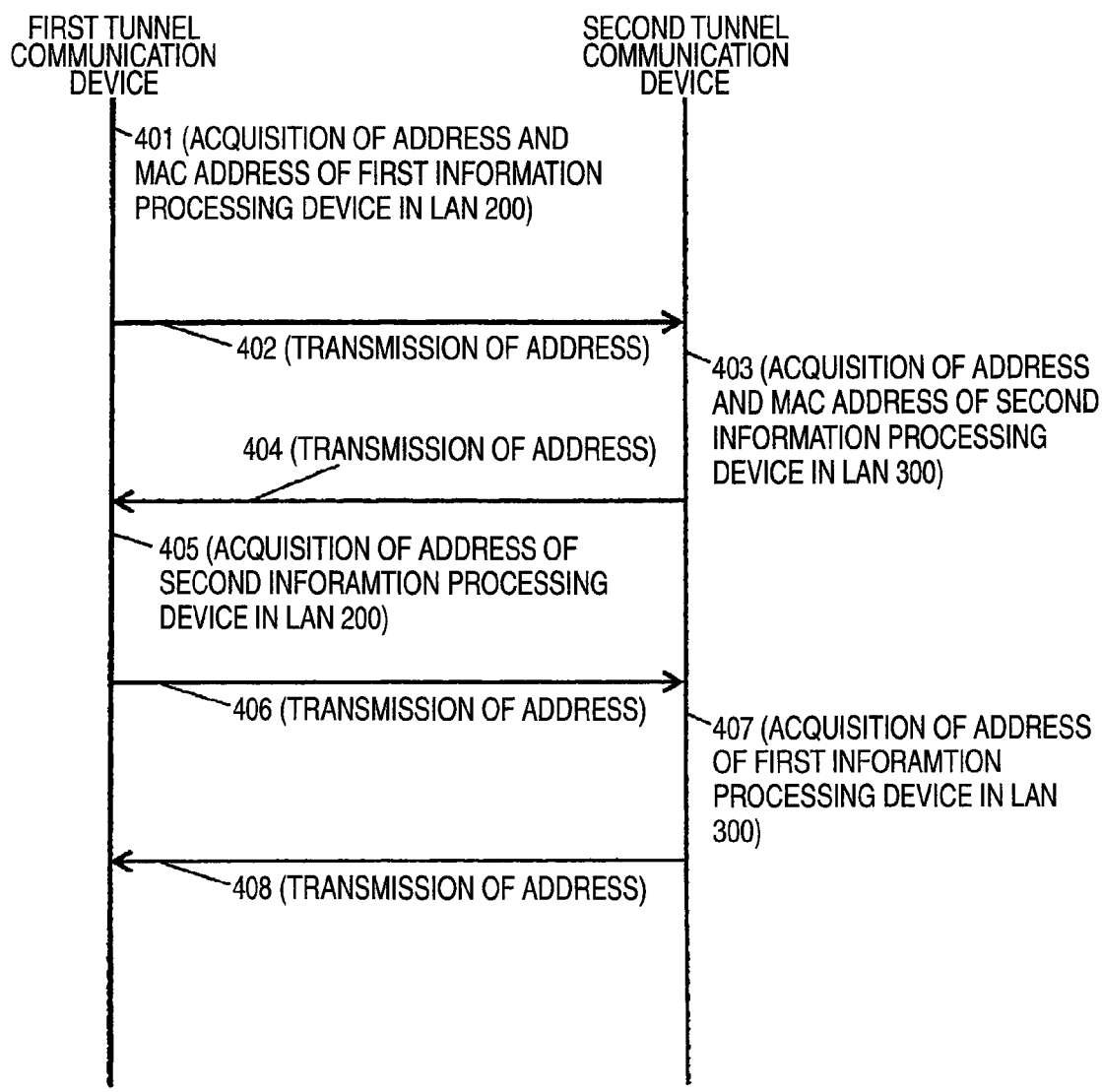
FIG. 13 is a diagram illustrating an address acquiring operation and an inter-device communicating operation of the information processing system according to the first embodiment.
FIG. 14 is a diagram illustrating an example of address correlating information of the information processing system according to the first embodiment.
Figure 15:
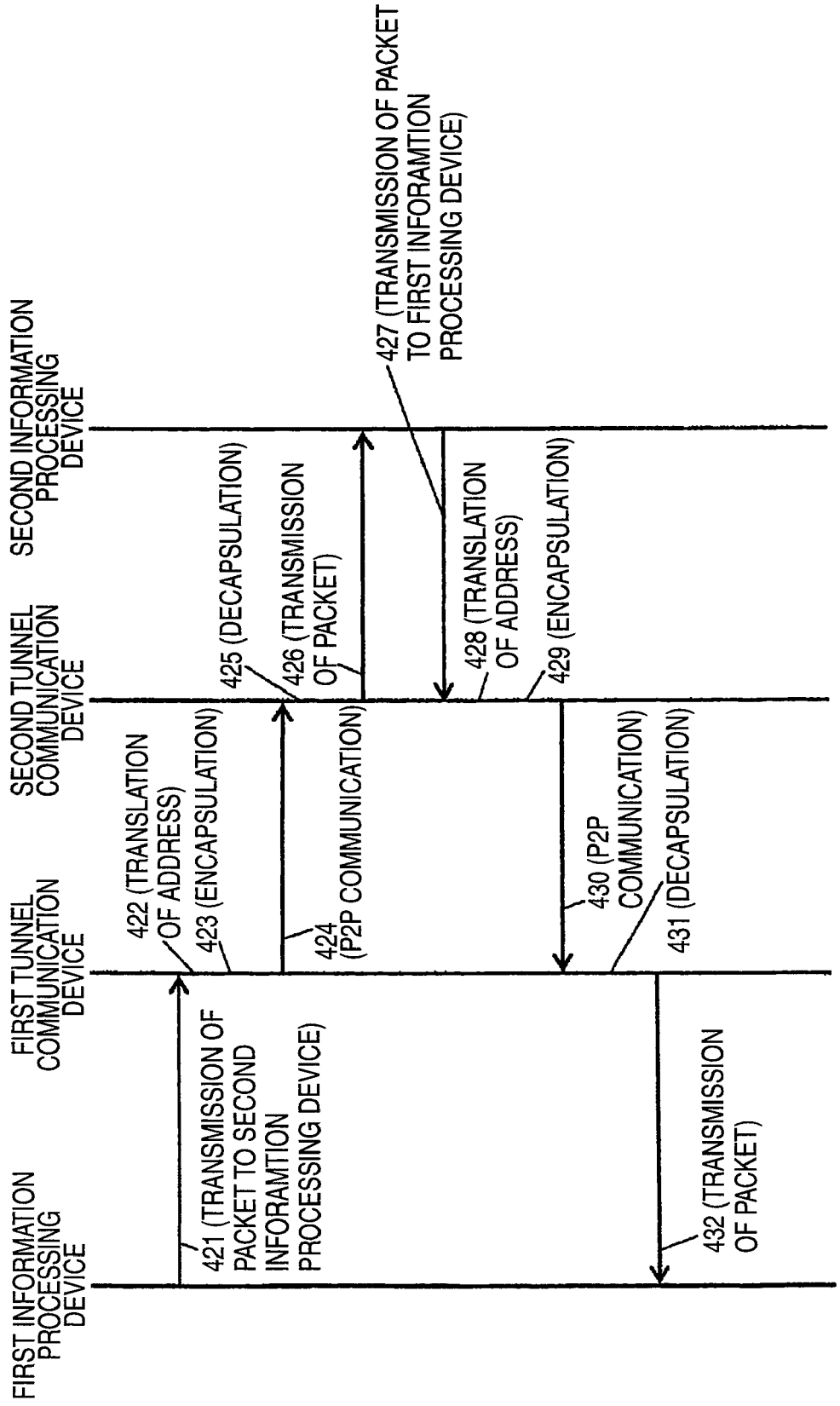
FIG. 15 is a diagram illustrating the inter-device communicating operation of the information processing system according to the first embodiment.
Figure 16:
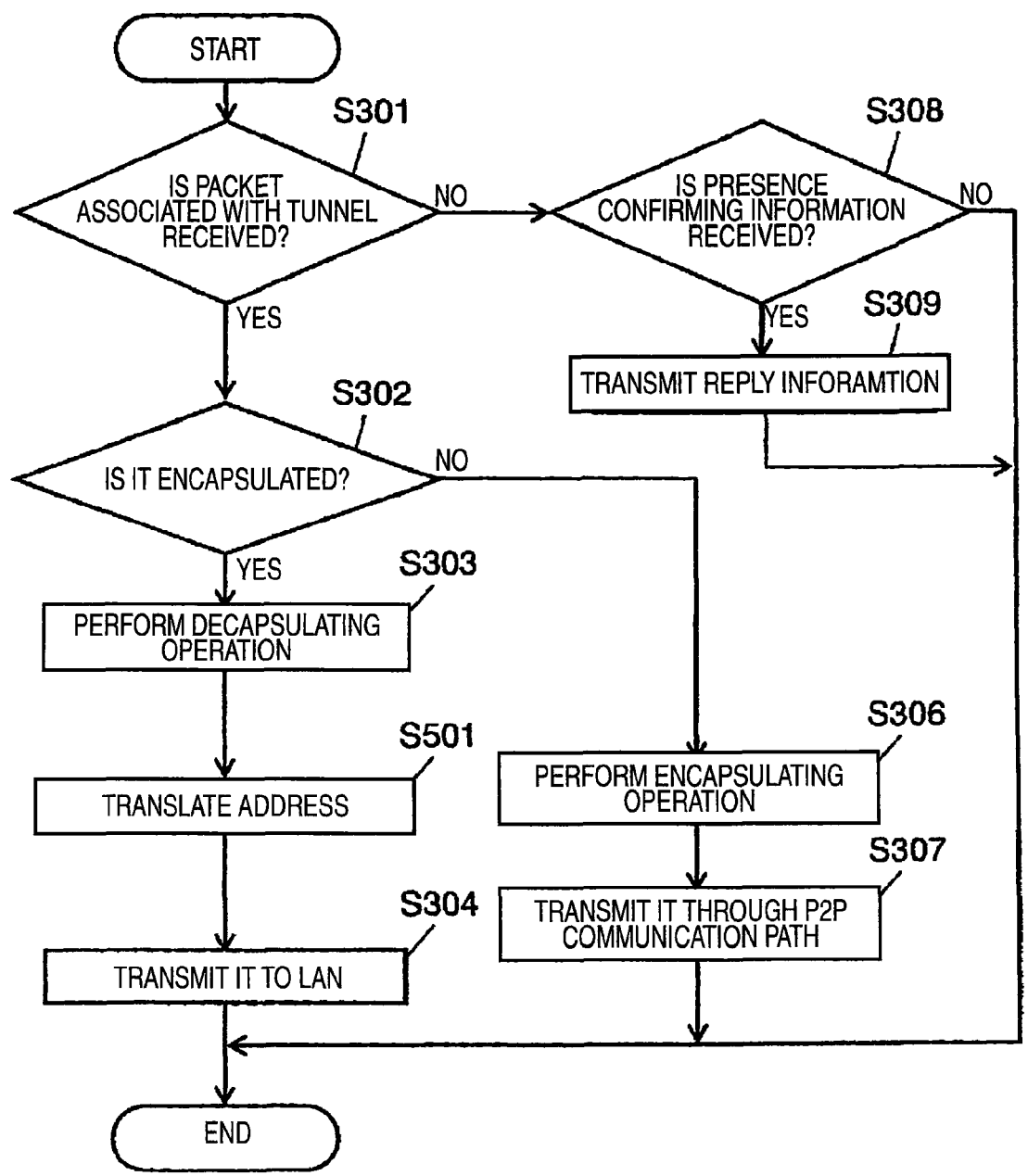
FIG. 16 is a flowchart illustrating another operation of the first tunnel communication device according to the first embodiment.
Figure 17:
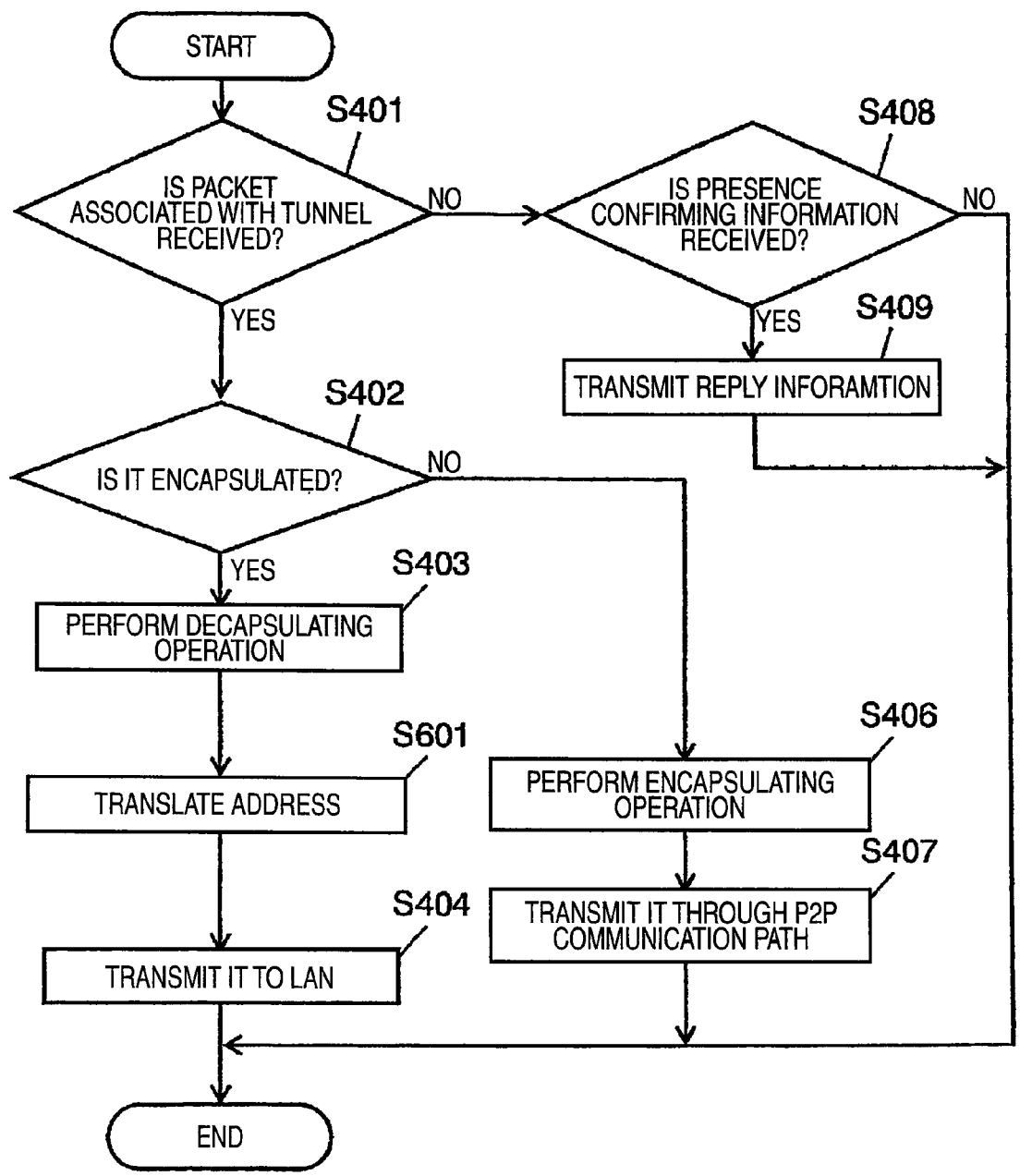
FIG. 17 is a flowchart illustrating another operation of the second tunnel communication device according to the first embodiment.
Figure 18:
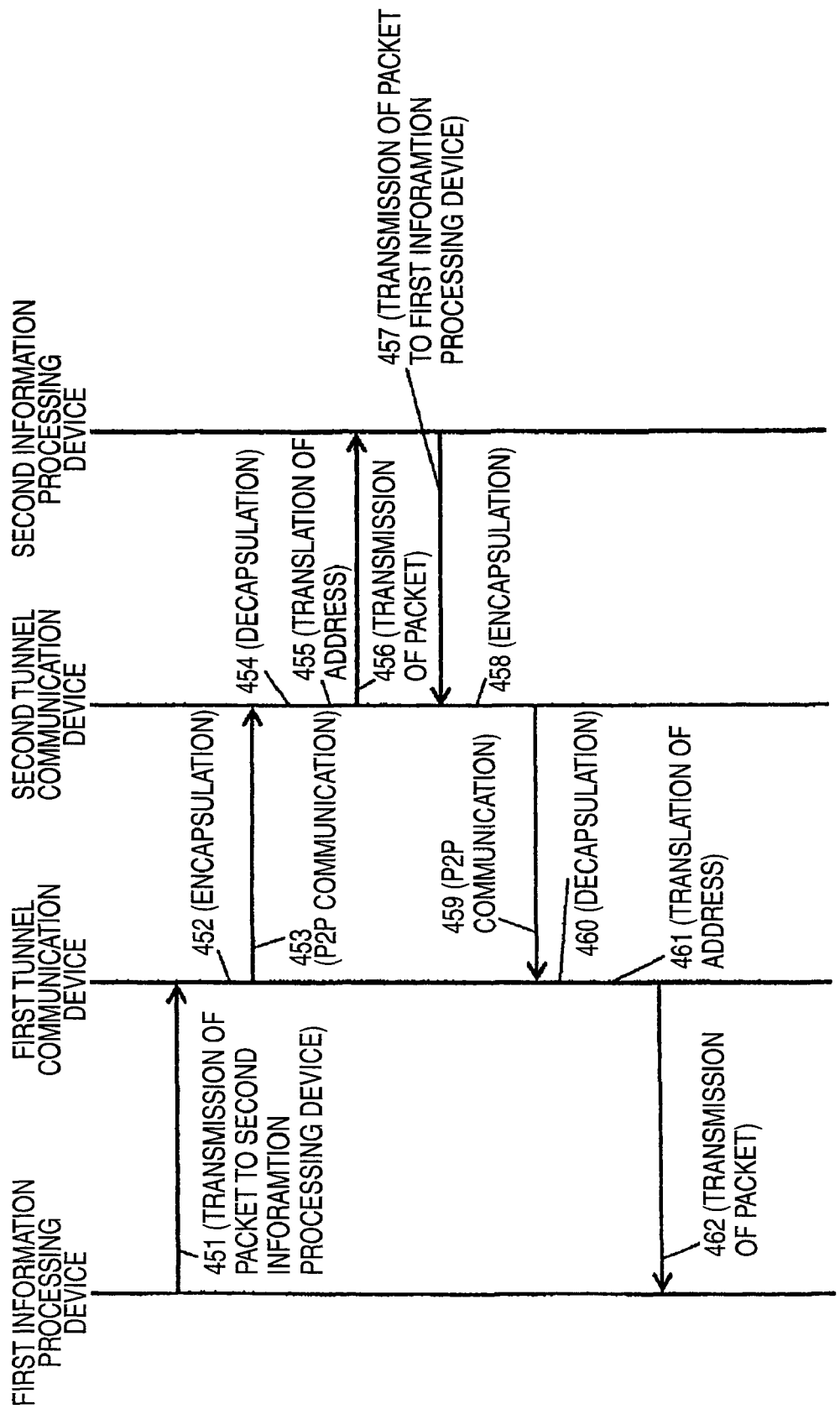
FIG. 18 is a diagram illustrating the inter-device communicating operation of the information processing system according to the first embodiment.

FIG. 7 is a diagram illustrating another address translating operation of the information processing system according to the first embodiment. FIG. 8 is a flowchart illustrating an operation of the first tunnel communication device according to the first embodiment. FIG. 9 is a flowchart illustrating an operation of the second tunnel communication device according to the first embodiment. FIG. 10 is a diagram illustrating an encapsulating operation of the information processing system according to the first embodiment. FIG. 11 is a diagram illustrating another encapsulating operation of the information processing system according to the first embodiment. FIG. 12 is a diagram illustrating another encapsulating operation of the information processing system according to the first embodiment. FIG. 13 is a diagram illustrating an address acquiring operation and an inter-device communicating operation of the information processing system according to the first embodiment. FIG. 14 is a diagram illustrating an example of address correlating information of the information processing system according to the first embodiment. FIG. 15 is a diagram illustrating the inter-device communicating operation of the information processing system according to the first embodiment. FIG. 16 is a flowchart illustrating another operation of the first tunnel communication device according to the first embodiment. FIG. 17 is a flowchart illustrating another operation of the second tunnel communication device according to the first embodiment. FIG. 18 is a diagram illustrating the inter-device communicating operation of the information processing system according to the first embodiment.

Figure 19:
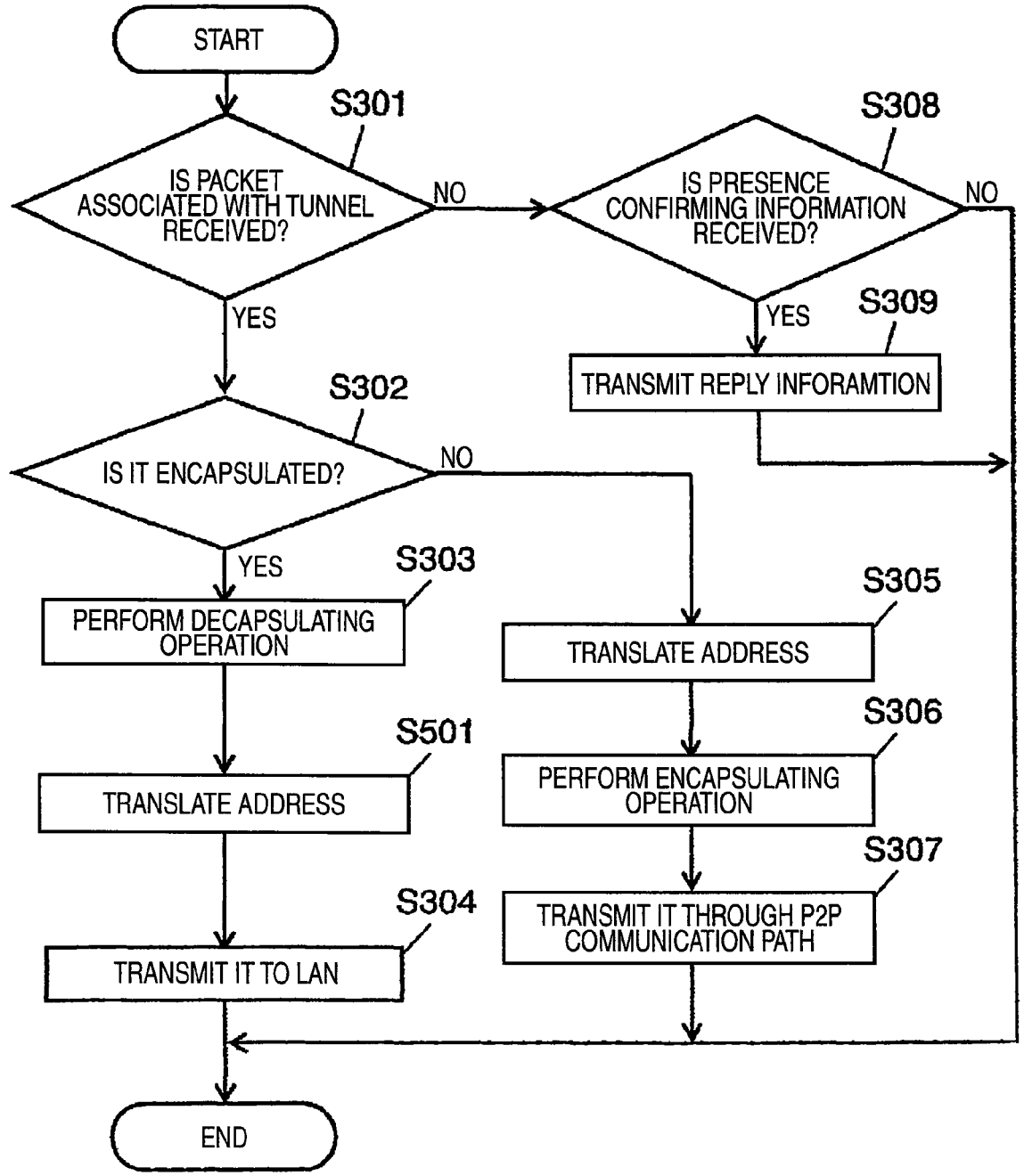
FIG. 19 is a flowchart illustrating another operation of the first tunnel communication device according to the first embodiment.
Figure 20:
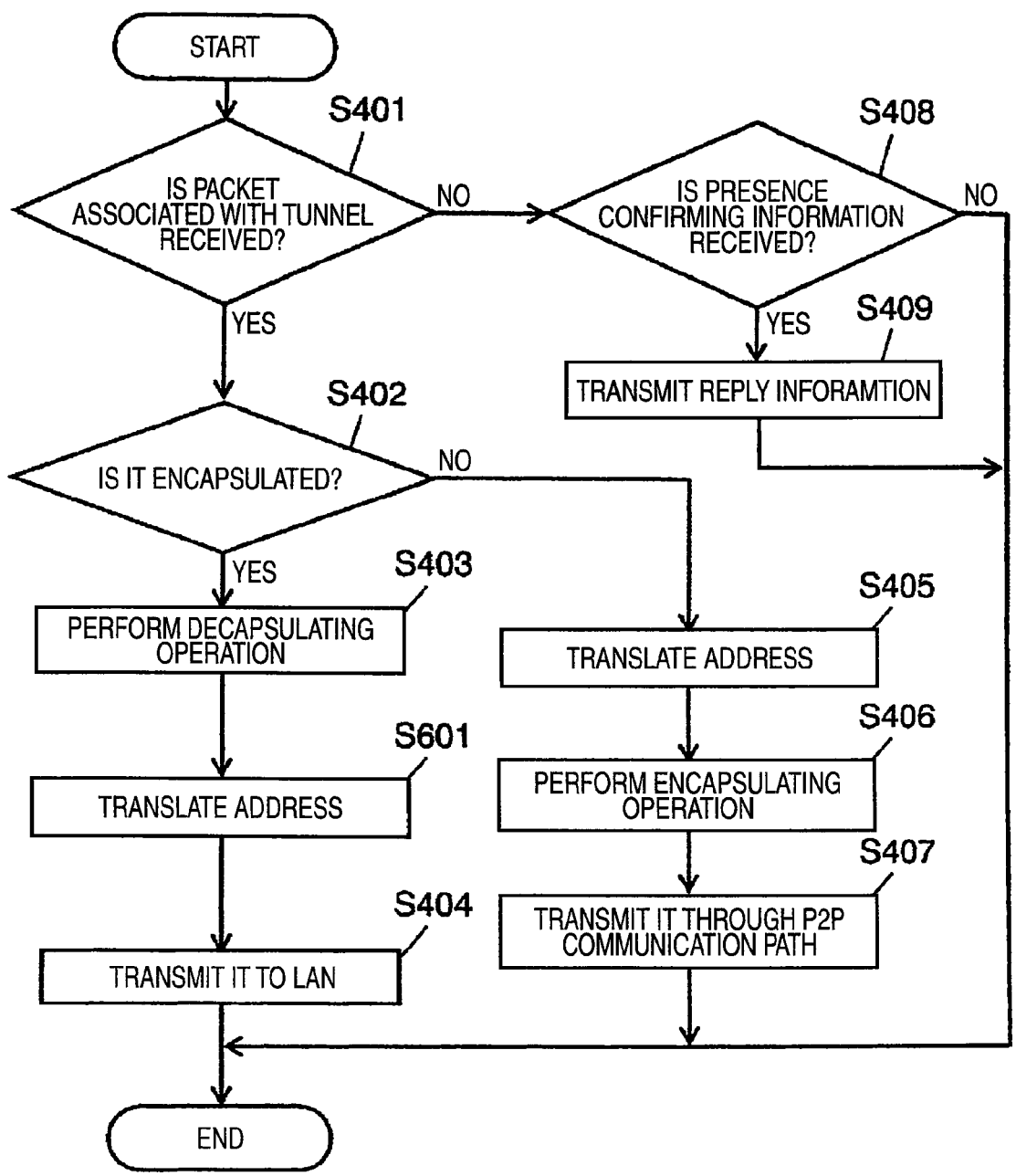
FIG. 20 is a flowchart illustrating another operation of the second tunnel communication device according to the first embodiment.
Figure 24:
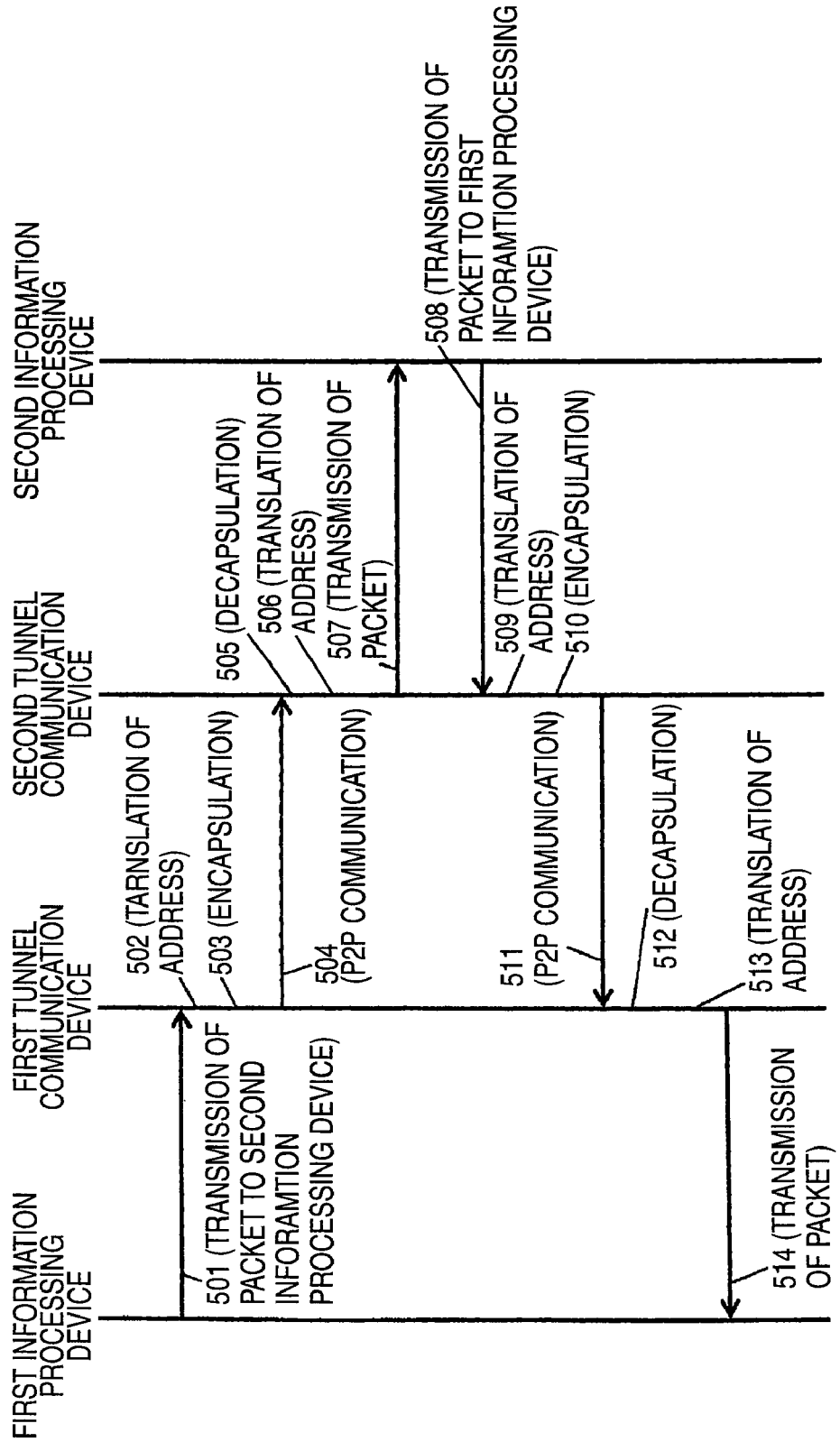
FIG. 24 is a diagram illustrating the inter-device communicating operation of the information processing system according to the first embodiment.
Figure 25:
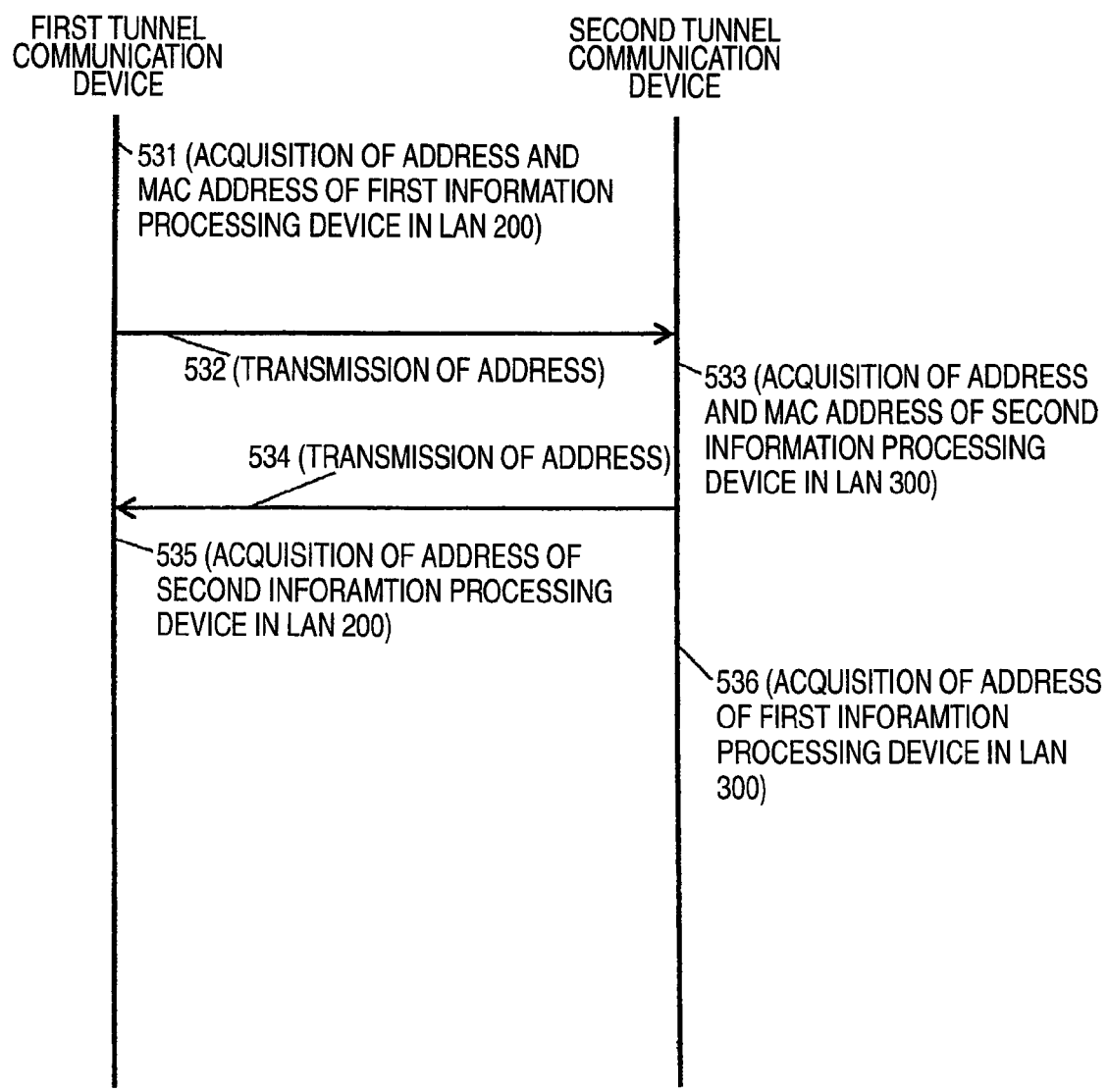
FIG. 25 is a diagram illustrating an address acquiring operation and an inter-device communicating operation of the information processing system according to the first embodiment.

FIG. 19 is a flowchart illustrating another operation of the first tunnel communication device according to the first embodiment. FIG. 20 is a flowchart illustrating another operation of the second tunnel communication device according to the first embodiment. FIG. 21 is a diagram illustrating an address acquiring operation and an inter-device communicating operation of the information processing system according to the first embodiment. FIG. 22 is a diagram illustrating an example of the address correlating information of the information processing system according to the first embodiment. FIG. 23 is a diagram illustrating another example of the address correlating information of the information processing system according to the first embodiment. FIG. 24 is a diagram illustrating the inter-device communicating operation of the information processing system according to the first embodiment. FIG. 25 is a diagram illustrating an address acquiring operation and an inter-device communicating operation of the information processing system according to the first embodiment.

In FIG. 1, an information processing system according to this embodiment includes a first information processing device 1, a first tunnel communication device 2, a first communication processing device 3, a second information processing device 4, a second tunnel communication device 5, a second communication processing device 6, and a P2P communication setup server 7. The first communication processing device 3, the second communication processing device 6, and the P2P communication setup server 7 are connected to each other through a wired or wireless communication line 100. Here, the communication line 100 may be Internet, Intranet, or a public switched telephone network.

The first information processing device 1, the first tunnel communication device 2, and the first communication processing device 3 are connected to a wired or wireless first LAN 200 and can communicated with each other. The second information processing device 4, the second tunnel communication device 5, and the second communication processing device 6 are connected to a wired or wireless second LAN 300 and can communicated with each other. The first LAN 200 and the second LAN 300 are connected to each other through the communication line 100.

For the purpose of convenient explanation, it is shown in FIG. 1 that a single first information processing device 1 is connected to the first LAN 200, but two or more first information processing devices 1 may be connected to the first LAN 200. Similarly, for the purpose of convenient explanation, it is shown in FIG. 1 that a single second information processing device 4 is connected to the second LAN 300, but two or more second information processing devices 4 may be connected to the second LAN 300.

The first information processing device 1 communicates with the second information processing device 4 through the first tunnel communication device 2, the first communication processing device 3, and the like. The first information processing device 1 may be a personal computer (hereinafter, referred to as "PC"), an electric home appliance such as an image recording device and a printer, or a game machine, and is not limited thereto so long as it is a communicable device. The first information processing device 1 can access a server connected to the communication line through a first LAN 200 through a communication line 100.

The first tunnel communication device 2 is connected to the first LAN 200, can communication with the first information processing device 1, and makes a tunnel communication with the second tunnel communication device 5. As shown in FIG. 2, the first tunnel communication device 2 includes a first address correlating information memory unit 21, an address translating unit 22, a first P2P communication setup unit 23, a first tunnel communication unit 24, first address acquiring unit 25, a first device address acquiring unit 26, a first address receiving unit 27, a first address transmitting unit 28, a first storage unit 29, a first presence confirming information receiving unit 32, a first reply information transmitting unit 33, a first I/F 34, a central processing unit (hereinafter, referred to as "CPU") 301 as a computer, and a recording medium 305.

The first address correlating information memory unit 21 stores first address correlating information. The first address correlating information is information for correlating an address in the first LAN 200 and an address in the second LAN 300. Details of the first address correlating information are described specifically. "Correlating an address in the first LAN 200 and an address in the second LAN 300" means that one address can be acquired from the other address. Accordingly, the first address correlating information may include both addresses, or may be information for correlating one address with the other address.

In the latter, the first address correlating information may be information for correlating one address with a pointer indicating a position where the other address is stored. In this embodiment, the former is described. One address and the other address may not be correlated with each other directly. For example, one address may be correlated with third information and the other address may be correlated with the third information. It does not matter how to store the first address correlating information in the first address correlating information memory unit 21. For example, the first address correlating information may be stored in the first address correlating information memory unit 21 by the use of a recording medium (not shown).

Alternatively, the first address correlating information transmitted through a communication line may be stored in the first address correlating information memory unit 21. Alternatively, the first address correlating information input through an input device (not shown) may be stored in the first address correlating information memory unit 21. In this embodiment, it is described that the first address correlating information is stored in the first address correlating information memory unit 21 by allowing a first storage unit 29 described later to store the first address correlating information. The first address correlating information memory unit 21 can be embodied by a predetermined recording medium such as a semiconductor memory, magnetic disc, and an optical disc.

The first address translating unit 22 translates an address of a packet on the basis of the first address correlating information stored in the first address correlating information memory unit. The address translation may be performed on a packet transmitted from the first information processing device 1 to the second information processing device 4, may be performed on a packet transmitted from the second tunnel communication device 5 through a path of a P2P communication to be described later, or may be performed on both packets.

At least one packet of the packet transmitted from the first information processing device 1 to the second information processing device 4 and the packet transmitted from the second tunnel communication device 5 through the path of the P2P communication is translated in address by the first address translating unit 22. The address translation may be performed before the packet to be translated in address is encapsulated or may be after the packet is encapsulated. In the latter, the address included in the payload of the encapsulated packet is translated.

The former is described in this embodiment. When the packet to be translated in address is encapsulated, the address translation may be performed after the packet is decapsulated or may be performed before the packet is decapsulated. In the latter, the address included in the payload of the encapsulated packet is translated.

The former is described in this embodiment. The address translation may be performed on only the header of the packet to be translated in address or may be performed on the payload along with the header. In the latter, in addition to the address (included in the header) for use in the communication, the address included in the payload is translated, because it is used in applications and the like.

The first P2P communication setup unit 23 sets up a P2P communication with the second tunnel communication device 5. Here, the P2P communication is not a communication type using a server such as a server relay communication, but a communication type of a direct communication between devices. The setup of the P2P communication means to set up a state in which the P2P communication with the opposite device can be performed. Specifically, the setup of the P2P communication is to know a destination address of a packet transmitted from the first tunnel communication device 2 so as to arrive at the opposite device (here, the second tunnel communication device 5).

In this embodiment, it is assumed that the first P2P communication setup unit 23 acquires an address and a port number of the second communication processing device 6 which can make a P2P communication with the second tunnel communication device 5. It is also assumed that the setup of the P2P communication is made by the P2P communication setup server 7. The first P2P communication setup unit 23 may be embodied by hardware or may be embodied by software such as a driver for driving a communication device such as a modem or a network card.

The methods of setting up a P2P communication using the communication processing device are disclosed, for example, in Japanese Unexamined Patent Application Publication No. 2004-180003, International Publication No. 2005/041500, International Publication No. 2005/046143, and a non-patent document (J. Rosenberg, J. Weinberger, C. Huitema, and R. Mahy, "STUN—Simple Traversal of User Datagram Protocol (UDP) Through Network Address Translators (NATs)", March, 2003, Network Working Group Request for Comments: 3489, <URL:http://www.ietf.org/rfc/rfc3489.txt>). The configurations thereof were known conventionally and thus detailed description thereof will be omitted.

The first tunnel communication unit 24 makes a tunnel communication through a path of the P2P communication set up by the first P2P communication setup unit 23. Here, the tunnel communication is to encapsulate a packet and to make a communication by the use of the encapsulated packet. The first tunnel communication unit 24 serves to encapsulate a packet and to decapsulate the encapsulated packet. Here, the encapsulation of a packet means is to add the packet to a payload to form a new packet having a new header. The header of the new packet, that is, the header of the encapsulated packet, is a header in the same layer as the layer of the header of the packet included in the payload, or a header of a layer higher than the layer. Specific examples of the encapsulation will be described later.

In encapsulation, the packet included in the payload may be encoded or may not be encoded. The decapsulation is to take out the packet from the payload of the encapsulated packet. When the packet included in the payload is encoded, the decoding operation may be performed at the time of releasing the encapsulation. Specifically, the packet transmitted from the first information processing device 1 to the second information processing device 4 is encapsulated by the first tunnel communication unit 24 and is then transmitted through the path of the P2P communication.

The encapsulated packet transmitted from the second tunnel communication device 5 is decapsulated by the first tunnel communication unit 24 and is transmitted to the first information processing device 1. It is as described above that the order of the address translating process and the encapsulation or decapsulation process does not matter. The first tunnel communication unit 24 may be embodied by hardware, or may be embodied by software such as a driver for driving a communication device such as a modem and a network card.

The first address acquiring unit 25 acquires an address of the second information processing device 4 in the first LAN 200 from the first address assignor 31. When a media access control (hereinafter, referred to as "MAC") address is required to acquire the address, for example, the first address acquiring unit 25 may use an actual MAC address of the second information processing device 4. Alternatively, the first address acquiring unit may use the MAC address secured in advance to acquire an address.

Alternatively, a MAC address randomly generated as the MAC address not used in devices connected to the first LAN 200 may be used. The MAC address of the second information processing device 4 may be received by a first address receiving unit 27 to be described later, or may be acquired by another method. The first address acquiring unit 25 may be embodied by hardware, or may be embodied by software such as a driver for driving a communication device such as a modem and a network card.

The first device address acquiring unit 26 acquires an address of the first information processing device 1 in the first LAN 200. When two or more first information processing devices 1 are present in the first LAN 200, the addresses of the two or more first information processing devices 2 may be acquired. The first device address acquiring unit 26 may acquire the MAC address of the first information processing device 1. The address acquisition will be described later. The first device address acquiring unit 26 may be embodied by hardware, or may be embodied by software such as a driver for driving a communication device such as a modem and a network card.

The first address receiving unit 27 receives all or some of the address of the second information processing device 4 in the second LAN 300, the address of the first information processing device 1 in the second LAN 300, and the MAC address of the second information processing device 4. It depends on the address translation type what address to receive. Details thereof will be described later with reference to a specific example. The first address receiving unit 27 may received the addresses simultaneously or separately.

The first address receiving unit 27 may receive an address transmitted through the path of the P2P communication or may receive an address transmitted by means of another method such as a server relay. In the former, the packet may be encapsulated or may not be encapsulated. The first address receiving unit 27 may be embodied by hardware, or may be embodied by software such as a driver for driving a communication device such as a modem and a network card.

The first address transmitting unit 28 transmits to the second tunnel communication device 5 all or some of the address of the second information processing device 4 acquired by the first address acquiring unit 25, the address of the first information processing device 1 acquired by the first device address acquiring unit 26, and the MAC address of the first information processing device 1. It depends on the address translation type what address to receive. Details thereof will be described later with reference to a specific example. The first address transmitting unit 28 may transmit the addresses simultaneously or separately.

The first address transmitting unit 28 may transmit an address through the path of the P2P communication or may transmit an address by means of another method such as a server relay. In the former, a packet may be encapsulated or may not be encapsulated. The first address transmitting unit 28 may be embodied by hardware, or may be embodied by software such as a driver for driving a communication device such as a modem and a network card.

The first storage unit 29 stores the first address correlating information in the first address correlating information memory unit 21. This storage is performed on all or some of the address acquired by the first address acquiring unit 25, the address received by the first address receiving unit 27, and the address acquired by the first device address acquiring unit 26. It depends on the address translation type what address to store the first address correlating information on the basis of. Details thereof will be described later with reference to a specific example. When the first storage unit 29 stores the first address correlating information, the first storage unit may store the first address correlating information in a bundle, or may store the addresses constituting the first address correlating information plural times. When the addresses are changed, the first storage unit 29 may update the first address correlating information.

The first presence confirming information receiving unit 32 receives presence confirming information. Here, the presence confirming information is information transmitted to confirm the presence of a device. A specific example of the presence confirming information will be described later. The first presence confirming information receiving unit 32 may be embodied by hardware, or may be embodied by software such as a driver for driving a communication device such as a modem and a network card.

The first reply information transmitting unit 33 transmits reply information in response to the presence confirming information instead of the second information processing device 4, when the first presence confirming information receiving unit 32 receives the presence confirming information. That is, the reply information transmitting unit replies by proxy. By allowing the first reply information transmitting unit 33 to transmit the reply information, it is possible to reduce the time from the transmission of the presence confirming information to the reception of the reply information, compared with the case where the second information processing device 4 actually transmits the reply information in response to the presence confirming information. When the reply information includes the address of the transmission source, the address is an address corresponding to the second information processing device 4. The first reply information transmitting unit 33 may be embodied by hardware, or may be embodied by software such as a driver for driving a communication device such as a modem and a network card.

The first I/F 34 is an interface connected to the first LAN 200. The first I/F 34 is hardware for connection to the first LAN 200, an example of which is a network interface card (hereinafter, referred to as "NIC"). The first tunnel communication device 2 makes a tunnel communication with the first information processing device 1 through the first I/F 34. The first tunnel communication unit 24 makes a tunnel communication through the first I/F 34.

The first communication processing device 3 performs communication-related processes of the first information processing device 1 or the first tunnel communication device 2. The first communication processing device 3 performs the communication-related processes between the first information processing device 1 or the first tunnel communication device 2 and the second communication processing device 6 or the P2P communication setup server 7. The first communication processing device 3 may be a device having a network address translation (hereinafter, referred to as "NAT") function of translating an address, a device having a firewall function of packet filtering, or may be a device having both functions.

Here, the NAT function includes an address assigning function or a port assigning function. The packet filtering is to select a received packet based on, for example, receiving filter rule. The receiving filter rule includes, for example, an address sensitive filter that receives packets from only the address of which the port transmits the packets, a port sensitive filter that receives packets from only a port from which the packets are transmitted, and a No filter having no filter.

In this embodiment, as shown in FIG. 2, the first communication processing device 3 includes an address assignor 31. Here, the first address assignor 31 is device for assigning an address to a device connected to the first LAN 200 and is, for example, a dynamic host configuration protocol (hereinafter, referred to as "DHCP) server.

In this embodiment, the first address assignor 31 is the DHCP server. The first communication processing device 3 according to this embodiment is a device called a "router." In this embodiment, it is described that the first communication processing device 3 has the address assignor 31. However, the address assignor 31 may not be provided in the first communication processing device 3, so long as it belongs to the first LAN 200. For example, the address assignor 31 may be independently connected to the first LAN 200.

The second information processing device 4 communicates with the first information processing device 1 through the second tunnel communication device 5 and the second communication processing device 6. The second information processing device 4 may be a PC, an electric home appliance such as an image recording device or a printer, or game machine, and is not limited so long as it can make a communication. The second information processing device 4 can access a server connected to the communication line 100 through the second LAN 300.

Since the second tunnel communication device 5 is connected to the second LAN 300, it can communicate with the second information processing device 4 and makes a tunnel communication with the first tunnel communication device 2. As shown in FIG. 3, the second tunnel communication device 5 includes a second address correlating information memory unit 51, a second address translating unit 52, a second P2P communication setup unit 53, a second tunnel communication unit 54, a second address acquiring unit 55, a second device address acquiring unit 56, a second address receiving unit 57, a second address transmitting unit 58, a second storage unit 59, a second presence confirming information receiving unit 62, a second reply information transmitting unit 63, a second I/F 64, a CPU 302, and a recording medium 306.

The second address correlating information memory unit 51 stores second address correlating information which is information for correlating an address in the second LAN 300 with an address in the first LAN 200. The second address correlating information memory unit 51 is the same as the first address correlating information memory unit 21 and thus detailed description thereof is omitted. The first address correlating information stored in the first address correlating information memory unit 21 and the second address correlating information stored in the second address correlating information memory unit 51 may be equal to or different from each other.

The second address translating unit 52 translates an address of a packet on the basis of the second address correlating information stored in the second address correlating information memory unit 51. The second address translating unit 52 is the same as the first address translating unit 22 and thus detailed description thereof is omitted. The second P2P communication setup unit 53 sets up the P2P communication with the first tunnel communication device 2. The second P2P communication setup unit 53 is the same as the first P2P communication setup unit 23 and thus detailed description thereof is omitted. The second tunnel communication unit 54 makes a tunnel communication through the path of the P2P communication set up by the second P2P communication setup unit 54. The second tunnel communication unit 54 is the same as the first tunnel communication unit 24 and thus detailed description thereof is omitted.

The second address acquiring unit 55 acquires the address of the first information processing device 1 in the second LAN 300 from the second address assignor 61 to be described later. The second address acquiring unit 55 is the same as the first address acquiring unit 25 and thus detailed description thereof is omitted. The second device address acquiring unit 56 acquires the address of the second information processing device 4 in the second LAN 300. The second device address acquiring unit 56 is the same as the first device address acquiring unit 26 and thus detailed description thereof is omitted.

The second address receiving unit 57 receives all or some of the address of the first information processing device 1 in the first LAN 200, the address of the second information processing device 4 in the first LAN 200, and the MAC address of the first information processing device 1. The second address receiving unit 57 is the same as the first address receiving unit 27 and thus detailed description thereof is omitted.

The second address transmitting unit 58 transmits to the first tunnel communication device 2 all or some of the address of the first information processing device 1 acquired by the second address acquiring unit 55, the address of the second information processing device 4 acquired by the second device address acquiring unit 56, and the MAC address of the second information processing device 4. The second address transmitting unit 58 is the same as the first address transmitting unit 28 and thus detailed description thereof is omitted.

The second storage unit 59 stores the second address correlating information in the second address correlating information memory unit 51. The second storage unit 59 is the same as the first storage unit 29 and thus detailed description thereof is omitted. However, as described above, the first address correlating information stored in the first storage unit 29 and the second address correlating information stored in the second storage unit 59 may be equal to or different from each other.

The second presence confirming information receiving unit 62 receives the presence confirming information. The second presence confirming information receiving unit 62 is the same as the first presence confirming information receiving unit 32 and thus detailed description thereof is omitted. The second reply information transmitting unit 63 transmits the reply information in response to the presence confirming information instead of the first information processing device 1, when the second presence confirming information receiving unit 62 receives the presence confirming information. The second reply information transmitting unit 63 is the same as the first reply information transmitting unit 33 and thus detailed description thereof is omitted. The second I/F 64 is an interface connected to the second LAN 300. The second I/F 64 is the same as the first I/F 34 and thus detailed description thereof is omitted.

The second communication processing device 6 performs a communication-related process of the second information processing device 4 or the second tunnel communication device 5. The second communication processing device 6 performs the process related to the communication between the second information processing device 4 or the second tunnel communication device 5 and the first tunnel communication device 3 or the P2P communication setup server 7. The second communication processing device 6 is the same as the first communication processing device 3 and thus detailed description thereof is omitted. In this embodiment, as shown in FIG. 3, the second communication processing device 6 includes the second address assignor 61. The second address assignor 61 is connected to the second LAN 300 and assigns an address to a device connected to the second LAN 30. The second address assignor 61 is the same as the first address assignor 31 and thus detailed description thereof is omitted.

The P2P communication setup server 7 performs a process of setting up a P2P communication. The P2P communication setup server 7 performs processes necessary to set up the P2P communication described in the above-mentioned document and the like. The number of P2P communication setup server 7 is 1 in this embodiment, the number of P2P communication setup servers 7 may be 2 or more.

Next, an operation of the first tunnel communication device 2 according to this embodiment will be described with reference to the flowchart shown in FIG. 4. First, the first P2P communication setup unit 23 sets up a P2P communication with the second tunnel communication device 5 (step (hereinafter, referred to as "S") 101). This specific process is described in the above-mentioned document and the like and thus detailed description thereof is omitted. The first address acquiring unit 25, the first address receiving unit 27, and the like serve to acquire an address or transmit and receive an address (S102). Details of this process will be described later.

The first storage unit 29 stores the first address correlating information in the first address correlating information memory unit 21 (S103). The first tunnel communication unit 24 makes a tunnel communication through the path of the P2P communication set up by the first P2P communication setup unit 23. Details of the tunnel communication will be described later. When the tunnel communication is made through the path of the P2P communication, the first information processing device 1 and the second information processing device 4, which belong to different networks, can communicate with each other as if they are in the same segment.

The first tunnel communication unit 24 determines whether the tunnel communication should be ended (S105). The case where the tunnel communication is ended includes a case where an instruction to end the tunnel communication is received from the first information processing device 1 and a case where the tunnel communication through the path of the P2P communication is not made for a predetermined period of time. When it is determined that the tunnel communication is not ended, the process of step 104 is performed. When it is determined that the tunnel communication is ended, the series of processes are ended. When the tunnel communication is ended, any process of ending the communication may be performed.

Next, an operation of the second tunnel communication device 5 according to this embodiment will be described with reference to the flowchart shown in FIG. 5. In the flowchart shown in FIG. 5, processes until the tunnel communication is ended after the second tunnel communication device 5 starts the tunnel communication are shown. The second P2P communication setup unit 53 sets up the P2P communication with the first tunnel communication device 2 (S201). The specific process is described in the above-mentioned document and detailed description thereof is omitted.

The second address acquiring unit 55 and the second address receiving unit 57 serve to acquire an address or to transmit and receive an address (S202). Details of this process will be described later. The second storage unit 59 stores the second address correlating information in the second address correlating information memory unit 51 (S203). The second tunnel communication unit 54 makes the tunnel communication through the path of the P2P communication set up by the second P2P communication setup unit 53 (S204). Details of the tunnel communication will be described later.

The second tunnel communication unit 54 determines whether the tunnel communication is ended (S205). The case where the tunnel communication is ended includes a case where an instruction to end the tunnel communication is received from the second information processing device 4 and the like and a case where a tunnel communication through the path of the P2P communication is not made for a predetermined time. When the tunnel communication is not ended, the process of step 204 is performed again. When the tunnel communication is ended, the series of processes are ended. When the tunnel communication is ended, any process of ending the communication may be performed.

Here, the address translating operations of the first address translating unit 22 and the second address translating unit 52 are described. By allowing the first address translating unit 22 and the second address translating unit 52 to translate the address of the packet, the first information processing device 1 and the second information processing device 4 communicate with each other as if they belong to the same LAN. Accordingly, when a packet is transmitted from the first information processing device 1 to the second information processing device 4, as shown in FIG. 6, and destination address and an source address are translated from the addresses in the first LAN 200 to the addresses in the second LAN 300.

The address translating method is classified into 4 patterns, depending on what of the first address translating unit 22 and the second address translating unit 52 to use to translate the destination address and the source address. Similarly, when a packet is transmitted from the second information processing device 4 to the first information processing device 1, the address translating method is classified into 4 patterns, depending on what of the first address translating unit 22 and the second address translating unit 52 to use to translate the destination address and the source address. As a result, as shown in FIG. 7, total 16 patterns exist for the address translating method.

However, the 16 patterns are applied when the address in the first LAN 200 is translated directly to the address in the second LAN 300. The translation using other information will be described later. In FIG. 7, "first" indicates the first information processing device 1 and "second" indicates the second information processing device 4. In FIG. 7, the patterns are denoted by signs (A) to (P). Hereinafter, specific examples of patterns (A) to (D) in this embodiment will be described. Pattern (E) will be described in a second embodiment.

Next, an operation of the information processing system according to this embodiment will be described with reference to a specific example. In the below specific example, pattern (A) of FIG. 7 is described in Specific Example 1. Pattern (D) of FIG. 7 is described in Specific Example 2. Pattern (B) of FIG. 7 is described in Specific Example 3. Pattern (C) of FIG. 7 is described in Specific Example 4.

Here, internet protocol (hereinafter, referred to as "IP") addresses of the first information processing device 1, the first tunnel communication device 2, the first communication processing device 3, and the like are as follows. The addresses of the first information processing device 1 and the first tunnel communication device 2 are assigned by the first address assignor 31 of the first communication processing device 3. The addresses of the second information processing device 4 and the second tunnel communication device 5 are assigned by the second address assignor 61 of the second communication processing device 6.

First information processing device 1: 192.168.0.10
First tunnel communication device 2: 192.168.0.2
Local side of first communication processing device 3: 192.168.0.1
Wide side of first communication processing device 3: 202.224.135.10
Second information processing device 4: 192.168.1.10
Second tunnel communication device 5: 192.168.1.2
Local side of second communication processing device 6: 192.168.1.1
Wide side of second communication processing device 6: 155.32.10.10

First, the setup of the P2P communication is described. Here, by turning on the first tunnel communication device 2 and the second tunnel communication device 5, it is assumed that both devices start the process of setting up the P2P communication. The first P2P communication setup unit 23 and the second P2P communication setup unit 53 store the address of the P2P communication setup server 7 in advance and accesses the P2P communication setup server 7 using the address, thereby setting up the P2P communication.

The first P2P communication setup unit 23 and the second P2P communication setup unit 53 have device identification information for identifying the opposite tunnel communication device and set up the P2P communication by identifying the opposite communication device using the device identification information. The process of storing the device identification information of the tunnel communication device in the first tunnel communication device 2 and the second tunnel communication device 5 does not matter. For example, a user may store the device identification information in the first tunnel communication device 2, etc. through an input device or a recording medium 305. Alternatively, the first tunnel communication device 2 and the second tunnel communication device 5 may form a set at the time of shipping and may store the device identification information of the opposite device in advance.

The process of allowing the first P2P communication setup unit 23 of the first tunnel communication device 2 and the second P2P communication setup unit 53 of the second tunnel communication device 5 to set up the P2P communication was known in the past and thus detailed description thereof is omitted. In the process of setting up the P2P communication, it is assumed that the first P2P communication setup unit 23 acquired an IP address "155.32.10.10" and a port number "22222" on the wide side of the second communication processing device 6 used in the P2P communication and delivered them to the first tunnel communication unit 24. Similarly, it is assumed that the second P2P communication setup unit 53 acquired an IP address "202.224.135.10" and a port number "11111" of the wide side of the first communication processing device 3 used in the P2P communication and delivered them to the second tunnel communication unit 54 (S101 and S201).

Specific Example 1 of this embodiment is described now.
Pattern (A) of FIG. 7 is described in this specific example. As can be seen from FIG. 7, in this specific example, when a packet is transmitted from the first information processing device 1 to the second information processing device 4, the destination address and the source address are translated by the first address translating unit 22. When a packet is transmitted from the second information processing device 4 to the first information processing device 1, the destination address and the source address are translated by the second address translating unit 52.

Accordingly, the first address correlating information includes information for correlating the address of the first information processing device 1 in the first LAN 200 with the address of the first information processing device 1 I the second LAN 300. The first address correlating information includes information for correlating the address of the second information processing device 2 in the first LAN 200 with the address of the second information processing device 4 in the second LAN 300.

Accordingly, the second address correlating information includes information for correlating the address of the first information processing device 1 in the first LAN 200 with the address of the first information processing device 1 I the second LAN 300. The second address correlating information includes information for correlating the address of the second information processing device 2 in the first LAN 200 with the address of the second information processing device 4 in the second LAN 300.

The first address translating unit 22 translates the addresses of the destination and the source of the packet transmitted from the first information processing device 1 to the second information processing device 4 on the basis of the first address correlating information. The second address translating unit 52 translates the addresses of the destination and the source of the packet transmitted from the first information processing device 1 to the second information processing device 4 on the basis of the second address correlating information.

FIG. 8 is a flowchart illustrating details of the process of step 104 in the flowchart shown in FIG. 4. In the flowchart, the processes of the first tunnel communication unit 24, the first presence confirming information receiving unit 32, and the first reply information transmitting unit 33 are shown. The same is true in the other flowcharts.

The first tunnel communication unit 24 determines whether a packet is received (S301). When it is determined that a packet is received, the process of step 302 is performed and otherwise, the process of step 308 is performed. Here, the reception of a packet in the first tunnel communication unit 24 is described. The first tunnel communication unit 24 receives the packet transmitted through the path of the P2P communication. The first tunnel communication unit 24 also receives a packet transmitted to the second information processing device 4, that is, a packet of which the destination is the address of the second information processing device 4 in the first LAN 200.

The first tunnel communication unit 24 may receive a packet transmitted, for example, in a broadcast communication manner or in a multicast communication manner and a packet transmitted to unspecified destinations, or may not receive such packets. In the former, the packet transmitted to the unspecified destinations are encapsulated and transmitted. However, the first tunnel communication unit 24 may not receive the presence confirming information received by the first presence confirming information receiving unit 32 described later.

The first tunnel communication unit 24 determines whether the received packet is an encapsulated packet or a non-encapsulated packet (S302). This determination may be performed on the basis of the format of the packet. For example, when a packet of which the destination has the IP address of the port number of the first tunnel communication device 2 which is used in the P2P communication is received, it is determined that the packet is encapsulated. Otherwise, that is, when a packet of which the destination has the address of the second information processing device 4 in the first LAN 200 is received, it may be determined that the packet is not encapsulated. When the encapsulated packet is received, the process of step 303 is performed, and when the non-encapsulated packet is received, the process of step 305 is performed.

When receiving the encapsulated packet, the first tunnel communication unit 24 decapsulates the received packet (S303). The decapsulation process will be described later. The first tunnel communication unit 24 transmits the decapsulated packet (S304). As a result, the decapsulated packet is transmitted to the device set as the destination of the packet in the first LAN 200. Then, the series of processes are ended.

When receiving the non-encapsulated packet, the first tunnel communication unit 24 delivers the received packet to the first address translating unit 22. The first address translating unit 22 translates the address of the packet on the basis of the first address correlating information and delivers the packet of which the address has been translated to the first tunnel communication unit 24 (S305). When the packet to be translated in address is a packet which is transmitted in a broadcast communication type or a multicast communication type, that is, which is transmitted to unspecified destinations, the first address translating unit 22 translates only the network address of the packet. For example, the first address translating unit 22 translates only the network address of the packet of the broadcast communication type to the network address of the second LAN 300.

Then, the first tunnel communication unit 24 encapsulates the received packet (S306). The destination address in the header of the encapsulated packet is a destination address in the path of the P2P communication set up by the first P2P communication setup unit 23. For example, an address on the wide side of the second communication processing device 6 and the port number thereof is set as the destination address in the header of the encapsulated packet.

The source address in the header of the encapsulated packet is the address of the first tunnel communication device 2. However, when the first communication processing device 3 has the NAT function, the source address is translated in the course of transmission. The first tunnel communication unit 24 transmits the encapsulated packet (S307). The packet is transmitted to the first communication processing device 3 through the first wide I/F 34. Then, the series of processes are ended.

When it is determined in step 301 that the packet associated with a tunnel is not received, the first presence confirming information receiving unit 32 determines whether the presence confirming information is received (S308). When it is determined that the presence confirming information is received, the process of step 309 is performed and otherwise, the series of processes are ended. When it is determined in step 308 that the presence confirming information is received, the first reply information transmitting unit 33 transmits the reply information (S309). Then, then series of processes are ended.

FIG. 9 is a flowchart illustrating details of the process of step 204 in the flowchart shown in FIG. 5. The second tunnel communication unit 54 determines whether a packet is received (S401). When it is determined that a packet is received, the process of step 402 is performed and otherwise, the process of step 408 is performed. The reception of a packet in the second tunnel communication unit 54 is described now. The second tunnel communication unit 54 receives the packet transmitted through the path of the P2P communication.

The second tunnel communication unit 54 also receives the packet transmitted to the first information processing device 1, that is, the packet of which the destination has the address of the first information processing device 1 in the second LAN 300. The second tunnel communication unit 54 may receive a packet transmitted, for example, in a broadcast communication manner or in a multicast communication manner and a packet transmitted to unspecified destinations, or may not receive such packets. In the former, the packet transmitted to the unspecified destinations are encapsulated and transmitted. However, the second tunnel communication unit 54 may not receive the presence confirming information received by the second presence confirming information receiving unit 62 described later.

When a packet associated with a tunnel is received in step 401, the second tunnel communication unit 54 determines whether the received packet is an encapsulated packet or a non-encapsulated packet (S402). This determination may be performed on the basis of the format of the packet. For example, when a packet of which the destination has the IP address of the port number of the second tunnel communication device 5 which is used in the P2P communication is received, it is determined that the packet is encapsulated.

Otherwise, that is, when a packet of which the destination has the address of the first information processing device 1 in the second LAN 300 is received, it may be determined that the packet is not encapsulated. When the encapsulated packet is received, the process of step 403 is performed, and when the non-encapsulated packet is received, the process of step 405 is performed.

When receiving the encapsulated packet, the second tunnel communication unit 54 decapsulates the received packet (S403). The decapsulation process will be described later. The second tunnel communication unit 54 transmits the decapsulated packet (S404). As a result, the decapsulated packet is transmitted to the device set as the destination of the packet in the second LAN 300. Then, the series of processes are ended.

When receiving the non-encapsulated packet, the second tunnel communication unit 54 delivers the received packet to the second address translating unit 52. The second address translating unit 52 translates the address of the packet on the basis of the second address correlating information and delivers the packet of which the address has been translated to the second tunnel communication unit 54 (S405). When the packet to be translated in address is a packet which is transmitted in a broadcast communication type or a multicast communication type, that is, which is transmitted to unspecified destinations, the second address translating unit 52 translates only the network address of the packet.

Then, the second tunnel communication unit 54 encapsulates the received packet (S406). The destination address in the header of the encapsulated packet is a destination address in the path of the P2P communication set up by the second P2P communication setup unit 53. For example, an address on the wide side of the first communication processing device 3 and the port number thereof is set as the destination address in the header of the encapsulated packet.

The source address in the header of the encapsulated packet is the address of the second tunnel communication device 5. However, when the second communication processing device 6 has the NAT function, the source address is translated in the course of transmission. The second tunnel communication unit 54 transmits the encapsulated packet. The packet is transmitted to the second communication processing device 6 through the second wide I/F 64 (S407). Then, the series of processes are ended.

When it is determined in step 401 that the packet associated with a tunnel is not received, the second presence confirming information receiving unit 62 determines whether the presence confirming information is received (S408). When it is determined that the presence confirming information is received, the process of step 409 is performed and otherwise, the series of processes are ended. When it is determined that the presence confirming information is received, the second reply information transmitting unit 63 transmits the reply information (S409). Then, then series of processes are ended.

Next, operations of encapsulating and decapsulating a packet in the first tunnel communication unit 24 and the second tunnel communication unit 54 according to this embodiment are described with reference to FIGS. 10 to 12. Here, the before-encapsulation packet is called an original packet. First, it is assumed that the original packet is as shown in FIG. 10. As shown in FIG. 11, the first tunnel communication unit 24, etc. adds an XX header and an XX trailer to the original packet and adds a user datagram protocol (hereinafter, referred to as "UDP") header and an IP header thereto, thereby encapsulating the original packet.

Here, the XX header and the XX trailer include, for example, an IP encapsulating security payload (hereinafter, referred to as "ESP") header, an authentication header (hereinafter, referred to as "AH"), and an ESP trailer and are added to encode the original packet shown in FIG. 10. The XX header and the XX trailer may be omitted. Only one of the XX header and the XX trailer may be added. Two or more of the XX header and the XX trailer may be added.

The address and the port number of the opposite communication processing device in the P2P communication are set in the IP header and the UDP header of the after-encapsulation packet. For example, when the first tunnel communication unit 24 encapsulates the packet, the IP destination address included in the IP header of the encapsulated packet is the IP address "155.32.10.10" of the second communication processing device 6 and the port number of the destination included in the UDP header of the encapsulated packet is the port number "22222" of the second communication processing device 6. The second tunnel communication unit 54 performs the encapsulation operation, similarly.

The original packet may be a packet (which is generally called a "frame", but is called a "packet" in this specification) having an Ethernet (registered trademark) header. In this case, the encapsulated packet is as shown in FIG. 12. The MAC address included in the Ethernet header is the MAC address acquired by an address resolution protocol (hereinafter, referred to as "ARP"). The acquisition of the MAC address in the ARP will be described later.

It has been shown in FIGS. 11 and 12 that the encapsulation is performed by the use of the UDP header. However, when the setup of the path of the P2P communication is made using a transmission control protocol (hereinafter, referred to as "TCP") packet without using the UDP packet, the encapsulation may be performed by the use of the TCP header.

Next, processes (S102, S202) of acquiring an address and transmitting and receiving the address, which are performed by the first tunnel communication device 2 and the second tunnel communication device 5, will be described with reference to FIG. 13. First, the first device address acquiring unit 26 acquires the IP address "192.168.0.10" of the first information processing device 1 in the first LAN 200 and the MAC address "00:11:22:AA:BB:CC" thereof (401). Details of this process will be described later.

The first address transmitting unit 28 constructs a packet including the IP address of the first information processing device 1 acquired by the first device address acquiring unit 26 and the MAC address thereof in the payload and transmits the constructed packet through the path of the P2P communication set up by the first P2P communication setup unit 23 (402). That is, the packet of which the payload includes the addresses is transmitted to the destination having the address and the port number on the wide side of the second communication processing device 6. The packet is translated in address by the second communication processing device 6, is transmitted to the second tunnel communication device 5, and is received by the second address receiving unit 57.

The second device address acquiring unit 56 acquires the IP address "192.168.1.10" of the second information processing device 4 in the second LAN 300 and the MAC address "01:23:45:AA:AA:AA" thereof (403). The second address transmitting unit 58 constructs a packet including the IP address of the second information processing device 4 acquired by the second device address acquiring unit 56 and the MAC address thereof in the payload and transmits the constructed packet through the path of the P2P communication set up by the second P2P communication setup unit 53 (404). That is, the packet of which the payload includes the addresses is transmitted to the destination having the address and the port number on the wide side of the first communication processing device 3. The packet is translated in address by the first communication processing device 3, is transmitted to the first tunnel communication device 2, and is received by the first address receiving unit 27.

The first address acquiring unit 25 transmits a packet of a broadcast communication type requiring an IP address. The IP destination address of the packet is "192.168.0.255" and the IP source address is "0.0.0.0." The MAC destination address is "FF:FF:FF:FF:FF:FF" and the MAC source address is the MAC address "01:23:45:AA:AA:AA" of the second information processing device 4. In this way, the first address acquiring unit 25 transmits a packet requiring an IP address as if it is the second information processing device 4.

The first address assignor 31 which is a DHCP server may assign an IP address to be correlated with the MAC source address. Accordingly, when it is assumed that the MAC address of the first tunnel communication device 2 is the MAC source address, the IP address "192.168.0.2" of the first tunnel communication device 2 may be assigned. However, by using the MAC address of the second information processing device 4, a new IP address "192.168.0.20" is assigned.

The IP address "192.168.0.20" assigned by the first address assignor 31 is transmitted to the first tunnel communication device 2 by the use of a packet of the broadcast communication type, and the packet is received by the first address acquiring unit 25. In this way, the IP address of the second information processing device 4 in the first LAN 200 is acquired (405). Here, when the first address receiving unit 27 receives two or more sets of an IP address and a MAC address, the first address acquiring unit 25 acquires the IP addresses corresponding to the number of sets.

As described above, in order to allow the DHCP server to assign a new IP address, a packet requesting for an IP address can be transmitted using the MAC address not used in the first LAN 200. Accordingly, a packet requesting for the IP address may be transmitted using a MAC address other than the MAC address of the second information processing device 4. For example, since it is considered that the possibility that a MAC address randomly generated is equal to the MAC address used in the first LAN 200 is very low, the MAC address randomly generated may be used. Alternatively, a network I/F having a predetermined MAC address assigned thereto in advance is secured not to be used in the devices.

The MAC address (the number of MAC addresses is preferably plural) is stored in the first address acquiring unit 25. The packet requesting for the IP address may be transmitted using the MAC address. In this case, since the MAV address used in the request for the IP address is not used in any device, the DHCP server assigns a new IP address. The IP address may be acquired by the use of other methods. In this way, when the MAC address of the second information processing device 4 is not used to acquire the IP address, the acquisition of the MAC address in the second device address acquiring unit 56 and the transmission of the MAC address from the second address transmitting unit 58 are not necessary.

The first address transmitting unit 28 transmits the IP address "192.168.0.20" of the second information processing device 4 in the first LAN 200 acquired by the first address acquiring unit 25 to the second tunnel communication device 5 (406), in the same way as 402. The address is received by the second address receiving unit 57 of the second tunnel communication device 5.

Similarly to the first address acquiring unit 25, the second address acquiring unit 55 acquires the IP address of the first information processing device 1 in the second LAN 200 by the use of the MAC address "00:11:22:AA:BB:CC" received by the second address receiving unit 57 (407). In this case, the IP address assigned by the second address assignor 61 is "192.168.1.20." As described above, the address acquisition may be performed using a MAC address other than the MAC address of the first information processing device 1.

The second address transmitting unit 58 transmits the IP address "192.168.1.20" of the first information processing device 1 in the second LAN 300 acquired by the second address acquiring unit 55 to the first tunnel communication device 2 (408), in the same way as 404. The address is received by the first address receiving unit 27 of the first tunnel communication device 2.

The process order in FIG. 13 has some voluntariness. For example, 401 and 402 may be reverse to 403 and 404 in order. That is, the processes may be performed in the order of 403, 404, 401, and 402. 407 may be performed after 403 and then 404 and 408 may be performed as one process to transmit the address.

Next, the first storage unit 29 stores information for correlating the IP address "192.168.0.10" of the first information processing device 1 in the first LAN 200, which is acquired by the first device address acquiring unit 26, with the IP address "192.168.1.20" of the first information processing device 1 in the second LAN 300, which is received by the first address receiving unit 27.

The first storage unit 29 stores information for correlating the IP address "192.168.0.20" of the second information processing device 4 in the first LAN 200, which is acquired by the first address acquiring unit 25, with the IP address "192.168.1.10" of the second information processing device 4 in the second LAN 300, which is received by the first address receiving unit 27. In this way, the first address correlating information is stored (S103). FIG. 14 is a diagram illustrating an example of the first address correlating information stored in the first storage unit 29 according to this embodiment.

The second storage unit 59 stores information for correlating the IP address "192.168.0.10" of the first information processing device 1 in the first LAN 200, which is received by the second address receiving unit 57, with the IP address "192.168.1.20" of the first information processing device 1 in the second LAN 300, which is acquired by the second address acquiring unit 55.

The second storage unit 59 stores information for correlating the IP address "192.168.0.20" of the second information processing device 4 in the first LAN 200, which is received by the second address receiving unit 57, with the IP address "192.168.1.10" of the second information processing device 4 in the second LAN 300, which is acquired by the second device address acquiring unit 56. In this way, the second address correlating information is stored (S203). The second address correlating information stored in the second storage unit 59 is as shown in FIG. 14.

The first tunnel communication unit 24 stores the IP address "192.168.0.20" of the second information processing device 4 in the first LAN 200 which is acquired by the first address acquiring unit 25, receives and encapsulates the packet of which the destination has the IP address, and transmits the encapsulated packet. Similarly, the second tunnel communication unit 54 stores the IP address "192.168.1.20" of the first information processing device 1 in the second LAN 300 which is acquired by the second address acquiring unit 55, receives and encapsulates the packet of which the destination has the IP address, and transmits the encapsulated packet.

The first tunnel communication device 2 receives the packet of which the destination has the MAC address of the second information processing device 4 and which is used for the first address acquiring unit 25 acquiring the address, as well as the packet of which the destination has the MAC address of the first tunnel communication device 2. The second tunnel communication device 5 receives the packet of which the destination has the MAC address of the first information processing device 1 and which is used for the second address acquiring unit 55 acquiring the address, as well as the packet of which the destination has the MAC address of the second tunnel communication device 5. When all transmitted packets are received and it is then determined whether the tunnel communication should be made, the packets may be received in a promiscuous mode.

Next, a method of allowing the first information processing device 1 to acquire the IP address of the second information processing device 4 will be described. Here, it will be described that a simple service discover protocol (hereinafter, referred to as "SSDP") of a universal plug and play (hereinafter, referred to as "UPnP")-audio visual (hereinafter, referred to as "AV") standard is used. However, it is assumed that the first tunnel communication device 2 responses by proxy to an SSDP inquiry packet instead of the second information processing device 4.

Specifically, the first information processing device 1 first transmits a device inquiring packet to unspecified destinations. This packet is an SSDP inquiry packet of the UPnP-AV standard. This packet is transmitted in the IP multicast communication manner. This packet is received by the first presence confirming information receiving unit 32 (S308) and the fact of receiving the presence confirming information is notified to the first reply information transmitting unit 33. Then, the first reply information transmitting unit 33 acquires the IP address of the second information processing device 4 connected to the second LAN 300 from the first tunnel communication unit 24. A packet of the reply information is transmitted using the IP address as a source in the unicast communication manner.

When IP addresses of two or more second information processing devices 4 are present, the packets of the reply information corresponding to the number of addresses are transmitted. The packets are received by the first information processing device 1. Accordingly, the first information processing device 1 can know the IP address of the second information processing device 4. It is assumed that the replay packet in response to the SSDP inquiry packet for confirming the presence of the first tunnel communication device 2 is transmitted from an element not shown. Although the process of allowing the first information processing device 1 to acquire the address of the second information processing device 4 has been described in this embodiment, the second information processing device 4 can also acquire the address of the first information processing device 1, similarly.

Although it has been described that the first presence confirming information receiving unit 32 receives the SSDP inquiry packet as the presence confirming information, the first presence confirming information receiving unit 32 may receive other packets as the presence confirming information. For example, a connection test (hereinafter, referred to as "ping") packet transmitted in the broadcast communication manner may be received as the presence confirming information by the first presence confirming information receiving unit 32. The first reply information transmitting unit 33 may be allowed to transmit the reply information instead of the second information processing device 4 in response to the reception of the packet.

Before describing the communication between the first information processing device 1 and the second information processing device 4, a process of acquiring the MAC address using the ARP will be described. Here, two cases of (A) a case in which an ARP request packet and an ARP response packet are encapsulated and (B) a case in which the ARP request packet and the ARP response packet are not encapsulated but the tunnel communication device replies by proxy will be described.

(A) The case where the ARP packet is encapsulated will be first described.

The first information processing device 1 transmits the ARP request packet to the IP address of the second information processing device 4 in the broadcast communication manner. Then, the first tunnel communication unit 24 encapsulates the ARP request packet and transmits the encapsulated packet to the second tunnel communication device 5. In this case, the IP address of the second tunnel communication device 5 included in the ARP request packet is translated by the address translating unit for translating the destination address.

In this specific example, since the destination address is translated by the transmission-side tunnel communication device, it is assumed that the IP address of the second tunnel communication device 5 included in the ARP request packet transmitted from the first information processing device 1 is translated by the first address translating unit 22. The encapsulated packet transmitted from the first tunnel communication device 2 is decapsulated by the second tunnel communication device 5. The second information processing device 4 responds to the ART request packet. That is, the ART response packet transmitted from the second information processing device 4 is encapsulated by the second tunnel communication device 5 and is transmitted to the first tunnel communication device 2.

It is assumed that the ARP response packet is translated in address by the second address translating unit 52 of the second tunnel communication device 5. The first tunnel communication device 2 decapsulates the received packet and transmits the ARP response packet to the first information processing device 1. In this way, the first information processing device 1 can know the MAC address of the second information processing device 4 and can use the MAC address as the MAC destination address to transmit the packet to the second information processing device 4.

The first tunnel communication unit 24 may encapsulate the received packet every Ethernet header (see FIG. 10) or may decapsulate the Ethernet header and then encapsulate the received packet (see FIG. 9). In the former, the second tunnel communication unit 54 performs the decapsulation and then transmits the resultant packet and the second information processing device 4 receives the packet.

On the other hand, in the latter, the second tunnel communication unit 54 first performs the decapsulation and then acquires the MAC address corresponding to the IP destination address, that is, the IP address of the second information processing device 4, using the ARP. The packet having the Ethernet header including the acquired MAC address is transmitted and is received by the second information processing device 4. The translation of an address is performed as described above.

When the ARP packet is encapsulated, the first tunnel communication unit 24 can acquire the MAC address or the IP address of the second information processing device 4 connected to the second tunnel communication device 5 by acquiring the MAC address or the IP address included in the ARP response packet. The acquired address is stored, whereby it can be determined whether the destination of the packet transmitted from the first information processing device 1 is the second information processing device 4. Alternatively, in the process of storing the address correlating information as describe above, the first tunnel communication unit 24 may acquire the MAC address or the IP address of the second information processing device 4.

(B) Next, a case where the tunnel communication unit replies by proxy.

(B1) A case where the first tunnel communication device 2 knows the correlation between the MAC address and the IP address of the second information processing device 4 will be first described. In this case, the first information processing device 1 transmits the ARP request packet to the IP address of the second information processing device 4 in the broadcast communication manner. Then, the first tunnel communication device 2 can know from the ARP request packet that the IP address in inquiry is the address of the second information processing device 4.

The ARP request packet is received and the ARP response packet having the MAC address corresponding to the IP address included in the ARP request packet is transmitted to the first information processing device 1. As a result, the first information processing device 1 can know the actual MAC address of the second information processing device 4. Thereafter, the packet transmitted from the first information processing device 1 to the second information processing device 4 may be received and encapsulated every Ethernet header by the first tunnel communication unit 24 or the packet may be encapsulated by decapsulating the Ethernet header, similarly to the description in (A).

(B2) Next, a case where the first tunnel communication device 2 returns an address other than the actual MAC address of the second information processing device 4 as the MAC address of the second information processing device 4 will be described. Here, it is assumed that the first tunnel communication device 2 knows the IP address of the second information processing device 4. The first information processing device 1 transmits the ARP request packet to the IP address of the second information processing device 4 in the broadcast communication manner.

The first tunnel communication device 2 can know from the ARP request packet that the IP address in inquiry is the address of the second information processing device 4. The ARP request packet is received and the ARP response packet thereto is transmitted to the first information processing device 1. The MAC address included in the ARP response packet may be the MAC address used by the first tunnel communication device 2 or may be another MAC address (but is not the MAC address which can be acquired by the first information processing device 1 using the ARP).

In this case, the first tunnel communication unit 24 stores the MAC address which the first tunnel communication unit 24 has transmitted along with the ARP response packet. When a packet of which the destination address is set to the stored MAC address is transmitted, the packet may be received as the packet of the destination address is the second information processing device 4 (S201). In this case, the first tunnel communication unit 24 may determine whether the destination is the second information processing device 4 on the basis of the IP destination address of the packet.

The first tunnel communication unit 24 may encapsulate the received packet every Ethernet header (see FIG. 10), or may encapsulate the received packet by decapsulating the Ethernet header (see FIG. 9). In the former, when the first tunnel communication unit 24 knows the actual MAC address of the second information processing device 4, the MAC destination address included in the Ethernet header may be changed to the actual MAC address of the second information processing device 4. Alternatively, the MAC destination address included in the Ethernet header may be changed to the actual MAC address of the second information processing device 2 by the second tunnel communication device 5.

On the other hand, in the latter, the second tunnel communication unit 54 performs the decapsulation, then acquires the MAC address corresponding to the IP destination address, that is, the IP address of the second information processing device 4, by the use of the ARP. By transmitting the packet having the Ethernet header including the acquired MAC address, the packet is received by the second information processing device 4. Although it has been described in the above-mentioned embodiment that the first information processing device 1 performs the process of ARP, the same is true when the second information processing device 4 performs the process of ARP.

A method of allowing the second tunnel communication device 5 to know the correlation between the MAC address and the IP address of the second information processing device 4 or a method of allowing the second tunnel communication device 5 to know the IP address of the second information processing device 4 will be described.

(1) First, a method using a broadcast packet will be described.

The second tunnel communication device 5 can know the IP address or the MAC address of a device connected thereto by transmitting a packet to a device connected to the second LAN 300 in a broadcast communication manner or a multicast communication manner and receiving the reply packet in response to the transmitted packet. For example, a ping packet may be transmitted to a broadcast address, the SSDP inquiry packet may be transmitted, the ARP request packet, that is, the packet of a broadcast communication type, is may be transmitted, or other methods may be used.

When the ARP request packet is transmitted and the network address of the second LAN 300 is "192.168.1", the second tunnel communication device 5 transmits the ARP request packets of which the address is from "192.168.1.1" to "192.168.1.254" and can know the IP address or the MAC address of a device connected to the second LAN 300 depending on the address from which the reply packet is received.

(2) Next, a method using packet of a unicast communication type will be described.

The second tunnel communication device 5 can know the IP address or the MAC address of a device connected thereto by transmitting a packet to the second LAN 300 in a unicast communication manner and receiving the reply packet in response to the transmitted packet. For example, when the local network address of the second LAN 300 is "192.168.1", the second tunnel communication device 5 transmits ping packets of which the destination address is from "192.168.1.1" to "192.168.1.254."

In addition, the second tunnel communication device 5 can know the IP address or the MAC address of a device connected to the second LAN 300 depending on the address from which the reply packet is received. The IP address, etc. may be known by the use of a packet other than the ping packets, whether the reply packet in response to the packet is received, or another method may be used. The address acquiring process may be performed on all the devices connected to the second LAN 300 or may be performed on a specific device. For example, the first information processing device 1 may acquire the address of a PC when the second information processing device 4 is the PC.

For example, when the first information processing device 1 and the second information processing device 4 are game machines, the address acquisition may be performed on only the game machines. Although the process in the second LAN 300 has been described in the above-mentioned embodiment, the same is true of the first LAN 200. The first device address acquiring unit 26 or the second device address acquiring unit 56 can acquire the IP address or the MAC address of the information processing device using the above-mentioned method.

As described above, the first tunnel communication unit 24 and the like can acquire the address of the second information processing device 4 in the first LAN 200 in the process of storing the first address correlating information. Even when the first tunnel communication unit 24 and the like cannot acquire the address of the second information processing device 4 in the first LAN 200, the first tunnel communication unit 24 and the like can acquire the address of the second information processing device 4 in the first LAN 200 by referring to the first address correlating information, or by requesting the second tunnel communication device 5 to transmit the second address correlating information and referring to the received second address correlating information. The same is true of the second tunnel communication unit 54.

Next, the communication between the first information processing device 1 and the second information processing device 4 will be described with reference to FIG. 15. The detailed description of the process of acquiring the MAC destination address using the ARP is omitted. First, the first information processing device 1 constructs a packet having the IP address "192.168.0.20" of the second information processing device 4 as the destination address and transmits the constructed packet (421). As described above, the MAC destination address of the packet may be the actual MAC address of the second information processing device 4 or may be another MAC address.

The first tunnel communication unit 24 determines whether the destination of the packet is the second information processing device 4, on the basis of the address (which may be the IP address or the MAC address) of the packet transmitted from the first information processing device 1. When it is determined that the destination of the packet is the second information processing device 4, the first tunnel communication unit receives the packet (S301). The first address translating unit 22 translates the IP address "192.168.0.20" of the destination to the IP address "192.168.1.10" in the second LAN 300 with reference to the first address correlating information (422).

The first address translating unit 22 translates the IP address "192.168.0.10" of the source to the correlated IP address "192.168.1.20" in the second LAN 300. The first tunnel communication unit 24 encapsulates the packet of which the address is translated (423). The encapsulated packet is transmitted to the second tunnel communication device 5 through the path of the P2P communication (424). When receiving the packet, the second tunnel communication unit 54 of the second tunnel communication device 5 decapsulates the encapsulated packet (425). The second tunnel communication unit 54 transmits the decapsulated packet to the second LAN 300 (426). The packet is received by the second information processing device 4.

Next, the transmission of a packet from the second information processing device 4 to the first information processing device will be described. The second information processing device 4 constructs a packet having the IP address "192.168.1.20" of the first information processing device 1 as the destination address and transmits the constructed packet (427). The MAC destination address may be the actual MAC address of the first information processing device 1 or another MAC address, similarly to the transmission of a packet from the first information processing device 1 to the second information processing device 4.

The transmitted packet is received by the second tunnel communication unit 54 (S401). The second address translating unit 52 translates the IP address "192.168.1.20" of the destination to the correlated IP address "192.168.0.10" in the first LAN 200 with reference to the second address correlating information. The second address translating unit 52 translates the IP address "192.168.1.10" of the source to the correlated IP address "192.168.0.20" in the first LAN 200 (428).

The second tunnel communication unit 54 encapsulates the packet of which the address has been translated (429). The encapsulated packet is transmitted to the first tunnel communication device 2 through the path of the P2P communication (430). When receiving the encapsulated packet, the first tunnel communication unit 24 of the first tunnel communication device 2 decapsulates the received packet (431). The first tunnel communication unit 24 transmits the decapsulated packet to the first LAN 200 (432). The packet is received by the first information processing device 1.

Here, a case where the first information processing device 1 transmits a packet to a device connected to the first LAN 200 or a server or the like connected to the communication line 100 will be described. In this case, since the destination of the packet is not the second information processing device 4, the first tunnel communication device 2 does not receive the packet. The first information processing device 1 can make a normal communication. The same is true of the second information processing device 4.

In the above-mentioned embodiment, it has been described that the first presence confirming information receiving unit 32 receives the SSDP inquiry packet and the first reply information transmitting unit 33 transmits a packet of reply information instead of the second information processing device 4. However, the invention is not limited to the configuration, but the first presence confirming information receiving unit 32 may receive another presence confirming information. For example, a packet of ping, etc. transmitted in the broadcast communication manner is received by the first presence confirming information receiving unit 32.

On the contrary, the first reply information transmitting unit 33 may transmit the reply information instead of the second information processing device 4. The address of the second information processing device 4 is used as the address of the source at the time of transmitting the packet of replay information from the first reply information transmitting unit 33. In this case, it is assumed that the first tunnel communication unit 24 does not make a tunnel communication to transmit the presence confirming information received by the first presence confirming information receiving unit 32.

As described above, the first presence confirming information receiving unit 32 receives the presence confirming information and the first reply information transmitting unit 33 transmits the reply information instead of the second information processing device 4. Accordingly, it is possible to reduce the time from the transmission of the presence confirming information to the reception of the reply information, compared with the conventional configuration described below. The conventional configuration is as follows. The presence confirming information is transmitted from a certain device the presence confirming information is transmitted in the tunnel communication. The second information processing device 4 transmits the reply information in response to the presence confirming information. The reply information is transmitted to the device as a source of the presence confirming information through the first tunnel communication device in the tunnel communication.

Accordingly, for example, it is determined whether the device having transmitted the reply information is present within a predetermined network or in a predetermined building, depending on the result whether the time from the transmission of the presence confirming information from a certain device to the reception of the reply information is greater than a predetermined threshold value. On the contrary, according to the invention, the second information processing device 4 can seem to be present within the same network as the first information processing device 1 or within the same building as the first information processing device 1. The same is true of the second presence confirming information receiving unit 62 and the second reply information transmitting unit 63.

It has been described in the above specific example that when the first tunnel communication device 2 acquires the address of the second information processing device 4, first, the second tunnel communication device 5 acquires the address and transmits the acquired address is transmitted from the second tunnel communication device 5 to the first tunnel communication device 2. The invention is not limited to it, but the first tunnel communication device 2 may directly acquire the address of the second information processing device 4. In one method, for example, the first tunnel communication device 2 constructs a ping packet or the ARP request packet sent to the broadcast address. The first tunnel communication device encapsulates the packet and transmits the encapsulated packet to the second tunnel communication device 5. By receiving the reply packet in response to the packet via a tunnel, the first tunnel communication device 2 directly acquires the address of the second information processing device 4.

In this case, the address of the packet transmitted from the first tunnel communication device 2 is properly translated by the first tunnel communication device 2 and/or the second tunnel communication device 5. When the second tunnel communication device 5 acquires the address of the first information processing device 1, the same is also true. The acquisition of an address can be applied to the below description.

It has been described in this specific example that the network address in the first LAN 200 is different from the network address in the second LAN 300. The invention is not limited to it, but both addresses may be equal to each other. In this case, the first information processing device 1 and the second information processing device 4 can communicate with each other as if they belong to the same network.

For example, a case where the address of the first information processing device 1 is "192.168.0.10" and the address of the second information processing device 4 is "192.168.0.10" will be described. In this case, similarly to the above description, the information for correlating the address "192.168.0.10" of the first information processing device 1 in the first LAN 200 with the address "192.168.0.20" of the first information processing device 1 in the second LAN 300 and the information for correlating the address "192.168.0.20" of the second information processing device 4 in the first LAN 200 with the address "192.168.0.10" of the second information processing device 4 in the second LAN 300 are included in the address correlating information. By translating the address using the address correlating information, the first information processing device 1 and the second information processing device 4 can be seen as if they belong to the same network.

Hereinafter, Specific Example 2 of this embodiment will be described.

In this specific example, pattern (D) of FIG. 7 is described. As can be seen from FIG. 7, in this specific example, when a packet is transmitted from the first information processing device 1 to the second information processing device 4, the destination address and the source address are translated by the second address translating unit 52. When a packet is transmitted from the second information processing device 4 to the first information processing device 1, the destination address and the source address are translated by the first address translating unit 22. Accordingly, the first address correlating information and the second address correlating information have the same information as Specific Example 1.

The first address translating unit 22 translates the addresses of the destination and the source of the packet transmitted from the second information processing device 4 to the first information processing device 1 on the basis of the first address correlating information. The second address translating unit 52 translates the addresses of the destination and the source of the packet transmitted from the first information processing device 1 to the second information processing device 4 on the basis of the second address correlating information.

FIG. 16 is a flowchart illustrating details of the process of step 104 in the flowchart of FIG. 4. In FIG. 16, the same steps as the flowchart of FIG. 8 are denoted by the same reference signs and description thereof is omitted. In FIG. 16, the encapsulation process of step 306 is performed on the packet of which the address has not been translated in step 305. The packet of which the address has been translated in step 501 is transmitted in step 304 after the decapsulation is performed.

In step 501, the first tunnel communication unit 24 delivers the decapsulated packet to the first address translating unit 22. The first address translating unit 22 translates the address of the packet on the basis of the first address correlating information and delivers to the first tunnel communication unit 24 the packet of which the address has been translated. When the packet to be translated in address is the packet transmitted to unspecified destinations, the first address translating unit 22 translates only the network address of the packet. The packet transmitted to unspecified destinations is, for example, a packet transmitted in a broadcast communication manner or in a multicast communication manner.

FIG. 17 is a flowchart illustrating details of the process of step 204 in the flowchart of FIG. 5. In FIG. 17, the same steps as the flowchart of FIG. 9 are denoted by the same reference signs and description thereof is omitted. In FIG. 17, the encapsulation process of step 406 is performed on the packet of which the address has not been translated in step 405. The packet of which the address has been translated in step 601 is transmitted in step 404 after the decapsulation is performed.

In step 601, the second tunnel communication unit 54 delivers the decapsulated packet to the second address translating unit 52. The second address translating unit 52 translates the address of the packet on the basis of the second address correlating information and delivers to the second tunnel communication unit 54 the packet of which the address has been translated. When the packet to be translated in address is the packet transmitted to unspecified destinations, the second address translating unit 52 translates only the network address of the packet.

The packet transmitted to unspecified destinations is, for example, a packet transmitted in a broadcast communication manner or in a multicast communication manner. The processes (S102, S202) of acquiring an address and transmitting and receiving the address, which are performed by the first tunnel communication device 2 and the second tunnel communication device 5, are the same as the processes shown in FIG. 13 according to Specific Example 1 and thus description thereof is omitted. The first address correlating information and the second address correlating information are the same as shown in FIG. 14 according to Specific Example 1.

Next, the communication between the first information processing device 1 and the second information processing device 4 will be described with reference to FIG. 18. The process associated with the address translation is the same as described in Specific Example 1 and thus detailed description thereof is omitted. First, the first information processing device 1 constructs a packet having the IP address "192.168.0.20" of the second information processing device 4 as the destination address and transmits the constructed packet (451). The first tunnel communication unit 24 receives the packet. The first tunnel communication unit 24 encapsulates the received packet (452).

The encapsulated packet is transmitted to the second tunnel communication device 5 through the path of the P2P communication (453). When receiving the packet, the second tunnel communication unit 54 of the second tunnel communication device 5 decapsulates the received packet (454). The second address translating unit 52 translates the destination address and the source address with reference to the second address correlating information (455). The second tunnel communication unit 54 transmits to the second LAN 300 the decapsulated packet of which the address has been translated (456). The packet is received by the second information processing device 4.

Next, the communication between the second information processing device 4 and the first information processing device 1 will be described with reference to First, the second information processing device 4 constructs a packet having the IP address "192.168.1.20" of the first information processing device 1 as the destination address and transmits the constructed packet (457). The second tunnel communication unit 54 receives the packet. The second tunnel communication unit 54 encapsulates the received packet (458).

The encapsulated packet is transmitted to the first tunnel communication device 2 through the path of the P2P communication (459). When receiving the packet, the first tunnel communication unit 24 of the first tunnel communication device 2 decapsulates the received packet (460). The first address translating unit 22 translates the destination address and the source address with reference to the second address correlating information (461). The first tunnel communication unit 24 transmits to the first LAN 200 the decapsulated packet of which the address has been translated (462). The packet is received by the first information processing device 1.

As described in Specific Examples 1 and 2, when the first address correlating information stored in the first tunnel communication device 2 and the second address correlating information stored in the second tunnel communication device 5 are equal to each other, one tunnel communication device may construct the address correlating information shown in FIG. 14. The address transmitting unit may transmit the address correlating information and the address correlating information may be stored in the opposite tunnel communication device.

Specific Example 3 of this embodiment is described now. In this specific example, pattern (B) of FIG. 7 is described. As can be seen from FIG. 7, in this specific example, when a packet is transmitted from the first information processing device 1 to the second information processing device 4, the source address is translated by the first address translating unit 22. The destination address is translated by the second address translating unit 52. When a packet is transmitted from the second information processing device 4 to the first information processing device 1, the source address is translated by the first address translating unit 22. The destination address is translated by the second address translating unit 52.

Accordingly, the first address correlating information includes the information for correlating the address of the first information processing device 1 in the first LAN 200 with the address of the first information processing device 1 in the second LAN 300. The second address correlating information includes the information for correlating the address of the second information processing device 4 in the first LAN 200 with the address of the second information processing device 4 in the second LAN 300.

The first address translating unit 22 translates the source address of the packet transmitted from the first information processing device 1 to the second information processing device 4 on the basis of the first address correlating information. The first address translating unit translates the destination address of the packet from the second information processing device 4 to the first information processing device 1 on the basis of the first address correlating information. The second address translating unit 52 translates the destination address of the packet transmitted from the first information processing device 1 to the second information processing device 4 on the basis of the second address correlating information. The second address translating unit translates the destination address of the packet from the second information processing device 4 to the first information processing device 1 on the basis of the second address correlating information.

FIG. 19 is a flowchart illustrating details of the process of step 104 in the flowchart of FIG. 4 according to this specific example. The processes of steps in the flowchart are the same as the flowchart of FIG. 8 or 16 and thus description thereof is omitted. FIG. 20 is a flowchart illustrating details of the process of step 204 in the flowchart of FIG. 5 according to this specific example. The processes of steps in the flowchart are the same as the flowchart of FIG. 9 or 17 and thus description thereof is omitted.

Next, the processes (S102, S202) of acquiring an address and transmitting and receiving the address, which are performed by the first tunnel communication device 2 and the second tunnel communication device 5, will be described with reference to FIG. 21. First, The first device address acquiring unit 26 acquires the IP address "192.168.0.10" of the first information processing device 1 in the first LAN 200 and the MAC address "00:11:22:AA:BB:CC" thereof (481). The first address transmitting unit 28 constructs a packet including the MAC address of the first information processing device 1 acquired by the first device address acquiring unit 26 in the payload and transmits the constructed packet through the path of the P2P communication set up by the first P2P communication setup unit 23 (482). The packet is translated in address by the second communication processing device 6, is transmitted to the second tunnel communication device 5, and is received by the second address receiving unit 57.

The second address acquiring unit 56 acquires the IP address "192.168.1.10" of the second information processing device 4 in the first LAN 200 and the MAC address "01:23:45:AA:AA:AA" thereof (483). The second address transmitting unit 58 constructs a packet including the MAC address of the second information processing device 4 acquired by the second device address acquiring unit 56 in the payload and transmits the constructed packet through the path of the P2P communication set up by the second P2P communication setup unit 53 (484). The packet is translated in address by the first communication processing device 3, is transmitted to the first tunnel communication device 2, and is received by the first address receiving unit 27.

The first address acquiring unit 25 transmits a packet of a broadcast communication type requesting for the IP address by the use of the MAC address of the second information processing device 4. The IP address "192.168.0.20" assigned by the first address assignor 31 is transmitted to the first tunnel communication device 2 by the use of the packet of the broadcast communication type. The first address acquiring unit 25 receives the packet (485). The first address transmitting unit 28 transmits the IP address "192.168.0.20" of the second information processing device 4 in the first LAN 200, which is acquired by the first address acquiring unit 25, to the second tunnel communication device 5 (486). The address is received by the second address receiving unit 57 of the second tunnel communication device 5.

The second address acquiring unit 55 acquires the IP address of the first information processing device 1 in the second LAN 300 by the use of the MAC address of the first information processing device 1, similarly to the first address acquiring unit 25 (487). In this case, it is assumed that the IP address assigned by the second address assignor 61 is "192.168.1.20." The second address transmitting unit 58 transmits the IP address "192.168.1.20" of the first information processing device 1 in the second LAN 300, which is acquired by the second address acquiring unit 55, to the first tunnel communication device 2 (488). The address is received by the first address receiving unit 27 of the first tunnel communication device 2.

The process order in FIG. 21 has some voluntariness, similarly to FIG. 13. For example, 481 and 482 may be reverse to 483 and 484 in order. 487 may be performed after 483 and then 484 and 488 may be performed as one process to transmit the address.

Next, the first storage unit 29 stores the information for correlating the IP address "192.168.0.10" of the first information processing device 1 in the first LAN 200, which is acquired by the first device address acquiring unit 26, with the IP address "192.168.1.20" of the first information processing device 1 in the second LAN 300, which is received by the first address receiving unit 27. In this way, the first address correlating information is stored (S103). FIG. 22 is a diagram illustrating an example of the first address correlating information stored in the first storage unit 29 according to this embodiment.

Next, the second storage unit 59 stores the information for correlating the IP address "192.168.0.20" of the second information processing device 4 in the first LAN 200, which is received by the second address receiving unit 57, with the IP address "192.168.1.10" of the second information processing device 4 in the second LAN 300, which is received by the second device address acquiring unit 56. In this way, the second address correlating information is stored (S203).

FIG. 23 is a diagram illustrating an example of the second address correlating information stored in the second storage unit 59 according to this embodiment. In the process of storing the address correlating information, the tunnel communication unit and the like may store the address or the MAC address of the opposite information processing device, similarly to Specific Example 1. The method of allowing one information processing device to acquire an address of the opposite information processing device is the same as described in Specific Example 1 and thus description thereof is omitted.

Next, the communication between the first information processing device 1 and the second information processing device 4 will be described with reference to FIG. 24. The process of translating an address is the same as described in Specific Example 1 and thus description thereof is omitted. First, the first information processing device 1 constructs a packet having the IP address "192.168.0.20" of the second information processing device 4 as the destination address and transmits the constructed packet (501). The first tunnel communication unit 24 receives the packet.

The first address translating unit 22 translates the IP address "192.168.0.10" of the source to the correlated IP address "192.168.1.20" in the second LAN 300 with reference to the first address correlating information (502). The first tunnel communication unit 24 encapsulates the packet of which the address has been translated (503). The encapsulated packet is transmitted to the second tunnel communication device 5 through the path of the P2P communication (504).

The second tunnel communication unit 54 of the second tunnel communication device 5 receives and decapsulates the packet (505). The second address translating unit 52 translates the IP address "192.168.0.20" of the destination to the correlated IP address "192.168.1.10" in the second LAN 300 with reference to the second address correlating information (506). The tunnel communication unit 54 transmits to the second LAN 300 the decapsulated packet of which the address has been translated (507). The packet is received by the second information processing device 4.

Next, the transmission of a packet from the second information processing device 4 to the first information processing device 1 will be described. The second information processing device 4 constructs a packet having the IP address "192.168.1.20" of the first information processing device 1 as the destination address and transmits the constructed packet (508). The second tunnel communication unit 54 receives the packet. The second address translating unit 52 translates the IP address "192.168.1.10" of the destination to the correlated IP address "192.168.0.20" in the first LAN 200 with reference to the second address correlating information (509).

The second tunnel communication unit 54 encapsulates the packet of which the address has been translated (510). The encapsulated packet is transmitted to the first tunnel communication device 2 through the path of the P2P communication (511). When receiving the packet, the first tunnel communication unit 24 of the first tunnel communication device 2 decapsulates the received packet (512). The first address translating unit 22 translates the IP address "192.168.1.20" of the destination to the correlated IP address "192.168.0.10" in the first LAN 200 with reference to the first address correlating information (513). The first tunnel communication unit 24 transmits the decapsulated packet of which the address has been translated to the first LAN 200 (514). The packet is received by the first information processing device 1.

Hereinafter, Specific Example 4 of this embodiment will be described. In this specific example, pattern (C) of FIG. 7 is described. As can be seen from FIG. 7, in this specific example, when a packet is transmitted from the first information processing device 1 to the second information processing device 4, the destination address is translated by the first address translating unit 22. The source address is translated by the second address translating unit 52. When a packet is transmitted from the second information processing device 4 to the first information processing device 1, the source address is translated by the first address translating unit 22. The destination address is translated by the second address translating unit 52.

Accordingly, the first address correlating information includes the information for correlating the address of the second information processing device 4 in the first LAN 200 with the address of the second information processing device 4 in the second LAN 300. The second address correlating information includes the information for correlating the address of the first information processing device 1 in the first LAN 200 with the address of the first information processing device 1 in the second LAN 300.

The first address translating unit 22 translates the destination address of the packet transmitted from the first information processing device 1 to the second information processing device 4 on the basis of the first address correlating information. The first address translating unit translates the source address of the packet transmitted from the second information processing device 4 to the first information processing device 1 on the basis of the first address correlating information. The second address translating unit 52 translates the source address of the packet transmitted from the first information processing device 1 to the second information processing device 4 on the basis of the second address correlating information.

The second address translating unit translates the destination address of the packet transmitted from the second information processing device 4 to the first information processing device 1 on the basis of the second address correlating information. In this specific example, the flowchart illustrating details of the process of step 104 in the flowchart of FIG. 4 is the same as the flowchart shown in FIG. 19 and thus description thereof is omitted. In this specific example, the flowchart illustrating details of the process of step 204 in the flowchart of FIG. 5 is the same as the flowchart shown in FIG. 20 and thus description thereof is omitted.

Next, the processes (S102, S202) of acquiring an address and transmitting and receiving the address, which are performed by the first tunnel communication device 2 and the second tunnel communication device 5, will be described with reference to FIG. 25. First, the first device address acquiring unit 26 acquires the IP address "192.168.0.10" of the first information processing device 1 in the first LAN 200 and the MAC address "00:11:22:AA:BB:CC" thereof (531).

The first address transmitting unit 28 constructs a packet having the IP address of the first information processing device 1 acquired by the first device address acquired unit 26 and the MAC address thereof in the payload and transmits the constructed packet through the path of the P2P communication set up by the first P2P communication setup unit 23 (532). The packet is translated by the second communication processing device 6, is transmitted to the second tunnel communication device 5, and received by the second address receiving unit 57.

The second device address acquiring unit 56 acquires the IP address "192.168.1.10" of the second information processing device 4 in the second LAN 300 and the MAC address "01:23:45:AA:AA:AA" thereof (533). The second address transmitting unit 58 constructs a packet having the IP address of the second information processing device 4 acquired by the second device address acquired unit 56 and the MAC address thereof in the payload and transmits the constructed packet through the path of the P2P communication set up by the second P2P communication setup unit 53 (534). The packet is translated by the first communication processing device 3, is transmitted to the first tunnel communication device 2, and received by the first address receiving unit 27.

The first address acquiring unit 25 transmits the packet of a broadcast communication type requesting for an IP address by the use of the MAC address of the second information processing device 4. The IP address "192.168.0.20" assigned by the first address assignor 31 is transmitted to the first tunnel communication device along with the packet of the broadcast communication type. The packet is received by the first address acquiring unit 25 (535). The second address acquiring unit 55 acquires the IP address of the first information processing device 1 in the second LAN 300 by the use of the MAC address of the first information processing device 1, similarly to the first address acquiring unit 25 (536). In this case, it is assumed that the IP address assigned by the second address assigning device 61 is "192.168.1.20."

The process order in FIG. 25 has some voluntariness, similarly to FIG. 13. For example, 531 and 532 may be reverse to 533 and 534 in order. 535 and 536 may be reverse in order.

Next, the first storage unit 29 stores the information for correlating the IP address "192.168.0.20", which is acquired by the first address acquiring unit 25, of the second information processing device 4 in the first LAN 200 with the IP address "192.168.1.10", which is received by the first address receiving unit 27, of the second information processing device 4 in the second LAN 300. In this way, the first address correlating information is stored (S103). FIG. 23 is a diagram illustrating an example of the first address correlating information stored in the first storage unit 29 in this embodiment.

The second storage unit 59 stores the information for correlating the IP address "192.168.1.10", which is received by the second address receiving unit 57, of the first information processing device 1 in the first LAN 300 with the IP address "192.168.1.20", which is acquired by the second address acquiring unit 55, of the first information processing device 1 in the second LAN 300. In this way, the second address correlating information is stored (S203). FIG. 22 is a diagram illustrating an example of the second address correlating information stored in the second storage unit 59 in this embodiment.

In the process of storing the address correlating information, the tunnel communication unit and the like may store the address or the MAC address of the opposite information processing device, similarly to Specific Example 1. The method of allowing one information processing device to acquire an address of the opposite information processing device is the same as described in Specific Example 1 and thus description thereof is omitted.

Next, the communication between the first information processing device 1 and the second information processing device 4 will be described with reference to FIG. 24, similarly to Specific Example 3. The process of translating an address is the same as described in Specific Example 1 and thus detailed description thereof is omitted. First, the first information processing device 1 constructs a packet having the IP address "192.168.0.20" of the second information processing device 4 as the destination address and transmits the constructed packet (501). The first tunnel communication unit 24 receives the packet. The first address translating unit 22 translates the IP address "192.168.0.20" of the destination to the correlated IP address "192.168.1.10" in the second LAN 300 with reference to the first address correlating information (502). The first tunnel communication unit 24 encapsulates the packet of which the address has been translated (503).

The encapsulated packet is transmitted to the second tunnel communication device 5 through the path of the P2P communication (504). When receiving the packet, the second tunnel communication unit 54 of the second tunnel communication device 5 decapsulates the received packet (505). The second address translating unit 52 translates the IP address "192.168.0.10" of the source to the correlated IP address "192.168.1.20" in the second LAN 300 with reference to the second address correlating information (506). The second tunnel communication unit 54 transmits to the second LAN 300 the decapsulated packet of which the address has been translated (507). The packet is received by the second information processing device 4.

Next, the transmission of a packet from the second information processing device 4 to the first information processing device 1 will be described. The second information processing device 4 constructs a packet having the IP address "192.168.1.20" of the first information processing device 1 as the destination address and transmits the constructed packet (508). The second tunnel communication unit 54 receives the packet. The second address translating unit 52 translates the IP address "192.168.1.20" of the destination to the correlated IP address "192.168.0.10" in the first LAN 200 with reference to the second address correlating information (509). The second tunnel communication unit 54 encapsulates the packet of which the address has been translated (510).

The encapsulated packet is transmitted to the first tunnel communication device 2 through the path of the P2P communication (511). When receiving the packet, the first tunnel communication unit 24 of the first tunnel communication device 2 decapsulates the received packet (512). The first address translating unit 22 translates the IP address "192.168.1.10" of the source to the correlated IP address "192.168.0.20" in the first LAN 200 with reference to the first address correlating information (513). The first tunnel communication unit 24 transmits to the first LAN 200 the decapsulated packet of which the address has been translated (514). The packet is received by the first information processing device 1.

Although patterns (A) to (D) of FIG. 7 have been described in the above-mentioned specific examples, patterns (G) to (P) of FIG. 7 can be implemented in the same way as the specific examples. For example, pattern (G) can be embodied by performing the transmission of a packet from the first information processing device 1 to the second information processing device 4 in the same way as described in Specific Example 1 and performing the transmission of a packet from the second information processing device 4 to the first information processing device 1 in the same way as described in Specific Example 3. Pattern (I) can be embodied by performing the transmission of a packet from the first information processing device 1 to the second information processing device 4 in the same way as described in Specific Example 3 and performing the transmission of a packet from the second information processing device 4 to the first information processing device 1 in the same way as described in Specific Example 4. The same is true of the other patterns.

Although it has not been described in detail in the above-mentioned specific examples, a packet transmitted to unspecified destinations may be encapsulated for a tunnel communication and may be translated in address by the tunnel communication device as the source. In this case, the address correlating information stored in the tunnel communication device may include information on a network address or a net mask of the LAN to which the tunnel communication device as the destination is connected. Then, it is possible to translate the address of the packet of the broadcast communication type by the use of the information on the network address or the net mask.

For example, when it is assumed in Specific Example 1 that the address correlating information includes the net mask "255.255.255.0" of the second LAN 300, the first address translating unit 22 can know that the network address of the second LAN 300 is "192.168.1." Accordingly, the first address translating unit 22 translates the address of the packet of the broadcast communication type of which the destination address is "192.168.0.255" to the address of the broadcast communication type "192.168.1.255" in the second LAN 300.

As described above, in the information processing system according to this embodiment, the first tunnel communication device 2 and the second tunnel communication device 5 translate the address and make the tunnel communication through the path of the P2P communication. Accordingly, the first information processing device 1 and the second information processing device 4 which belong to different LANs can be made to act as if they belong to the same network. In the first LAN 200, the first tunnel communication device 2 acts as if it is the second information processing device 4, thereby embodying such a function.

In the second LAN 300, the second tunnel communication device 5 acts as if it is the first information processing device 1, thereby embodying such a function. As a result, the first information processing device 1 and the second information processing device 4 can perform a process which can be performed by devices belonging to the same network, such as the sharing of a file and an interactive game. The communication therebetween is performed through the communication line 100 such as Internet and the packet via the communication line 100 is encapsulated. Accordingly, when a packet is encoded by the encapsulation, the communication details between the first information processing device 1 and the second information processing device 4 are not leaked from the communication line 100, thereby enhancing the safety.

Since the process of allowing the first information processing device 1 and the second information processing device 4 to seem to belong to the same network is performed by the first tunnel communication device 2 and the second tunnel communication device 5, the first information processing device 1 and the second information processing device 4 do not perform the process. Accordingly, the first information processing device 1 and the like may not be a device for performing particular processes such as the setup of a communication, but may be a conventional PC or a game machine for making a communication through a network. As a result, by connecting the first tunnel communication device 2 and the like to a LAN to which the conventional PC and the like are connected, it is possible to allow plural devices, which do not actually belong to the same network, to communicated with each other as if they belong to the same network, without a user, making a complex setup, thereby enhancing the user's convenience.

Second Embodiment

Figure 26:
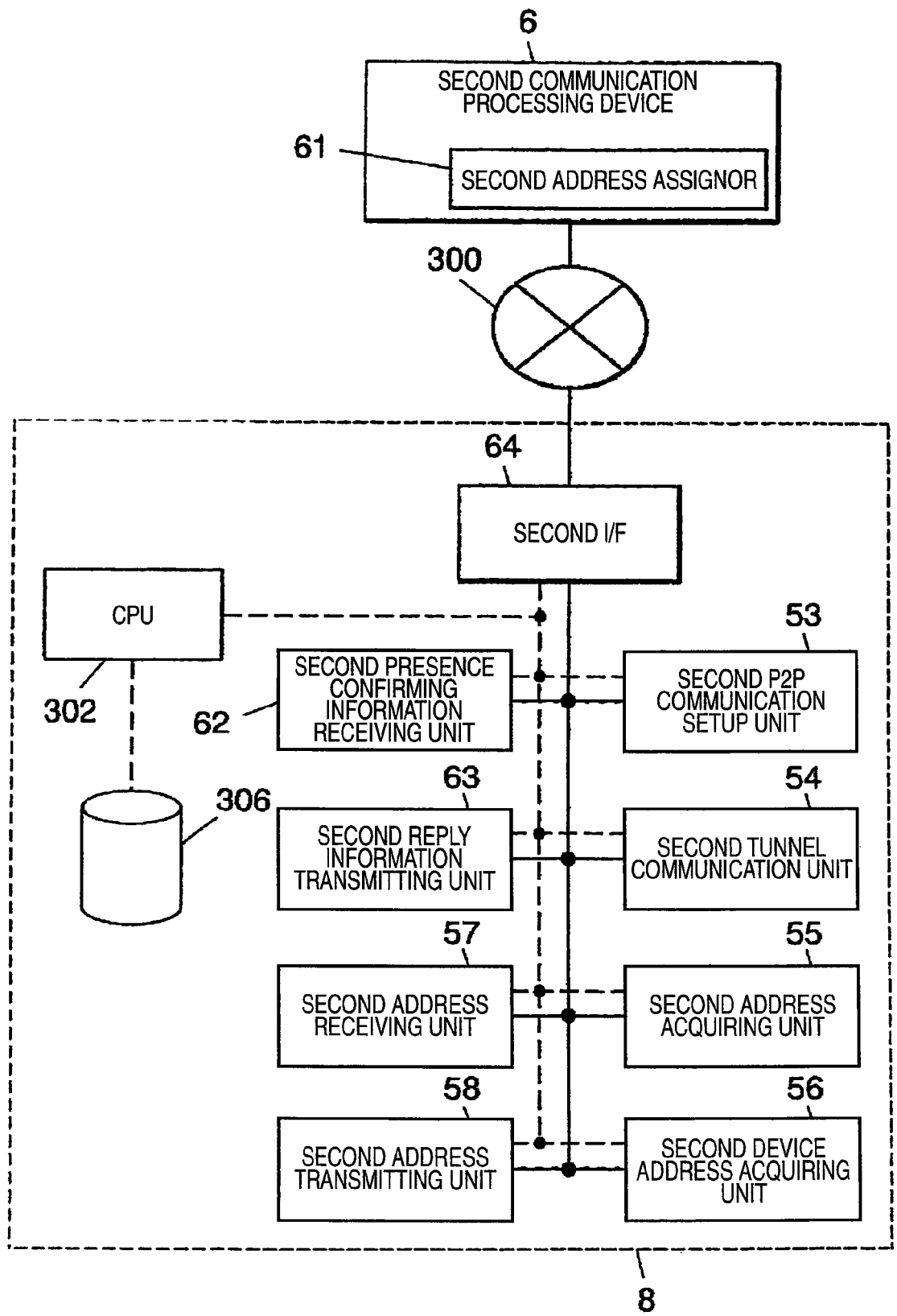
FIG. 26 is a diagram illustrating a part of a configuration of an information processing system, which includes a block diagram illustrating a second tunnel communication device according to a second embodiment.
Figure 27:
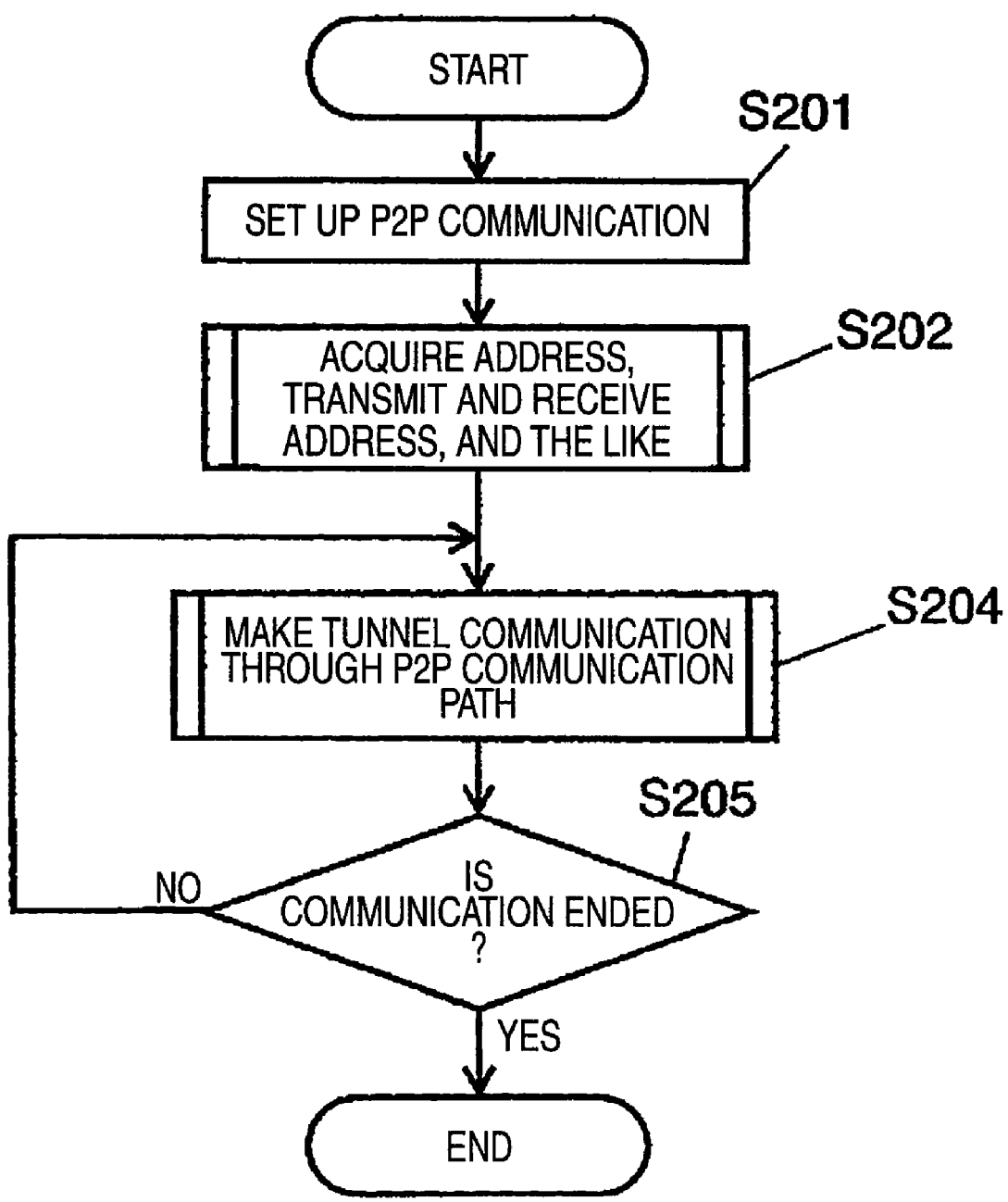
FIG. 27 is a flowchart illustrating another operation of the second tunnel communication device according to the second embodiment.
Figure 28:
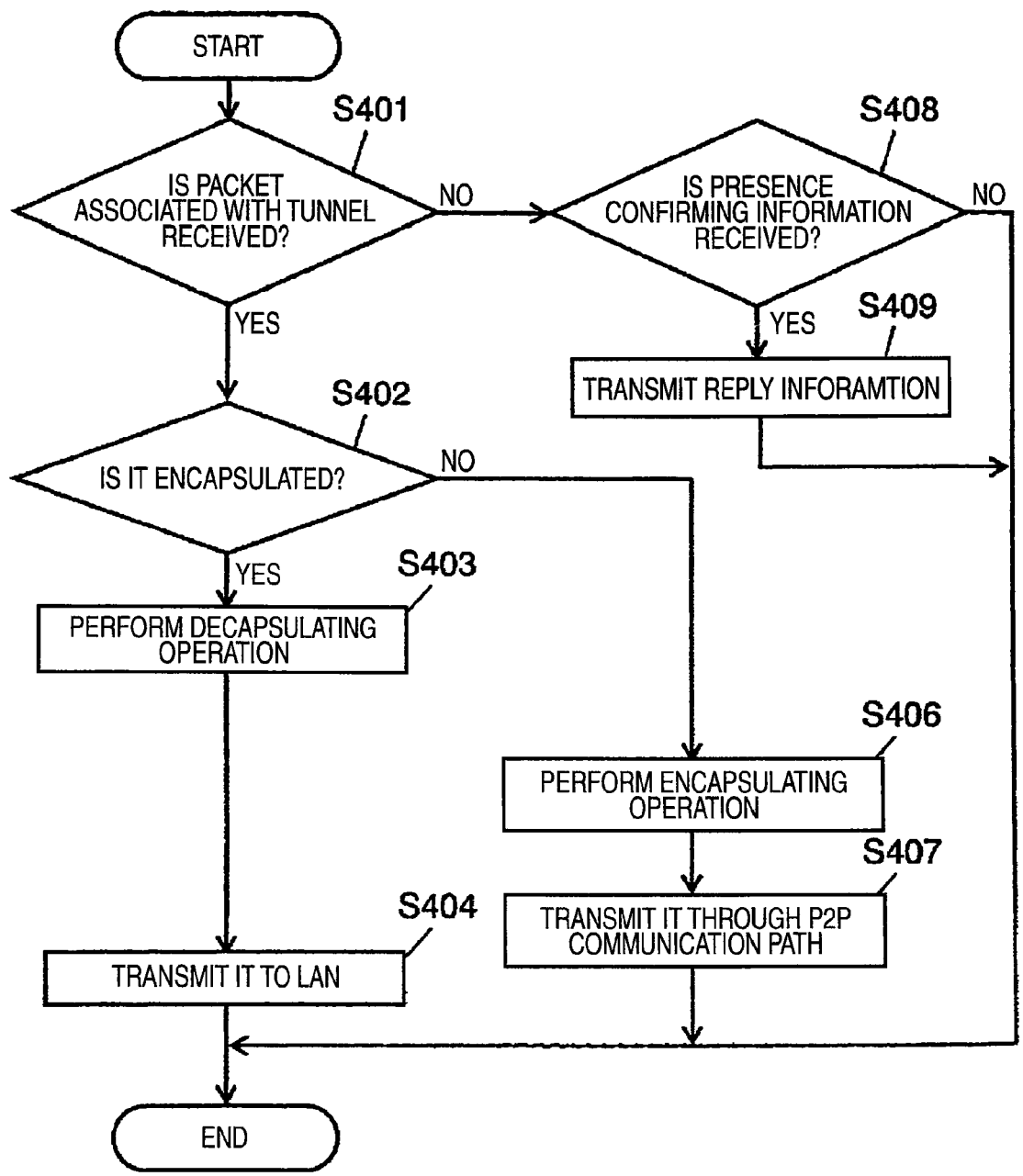
FIG. 28 is a flowchart illustrating another operation of the second tunnel communication device according to the second embodiment.
Figure 29:
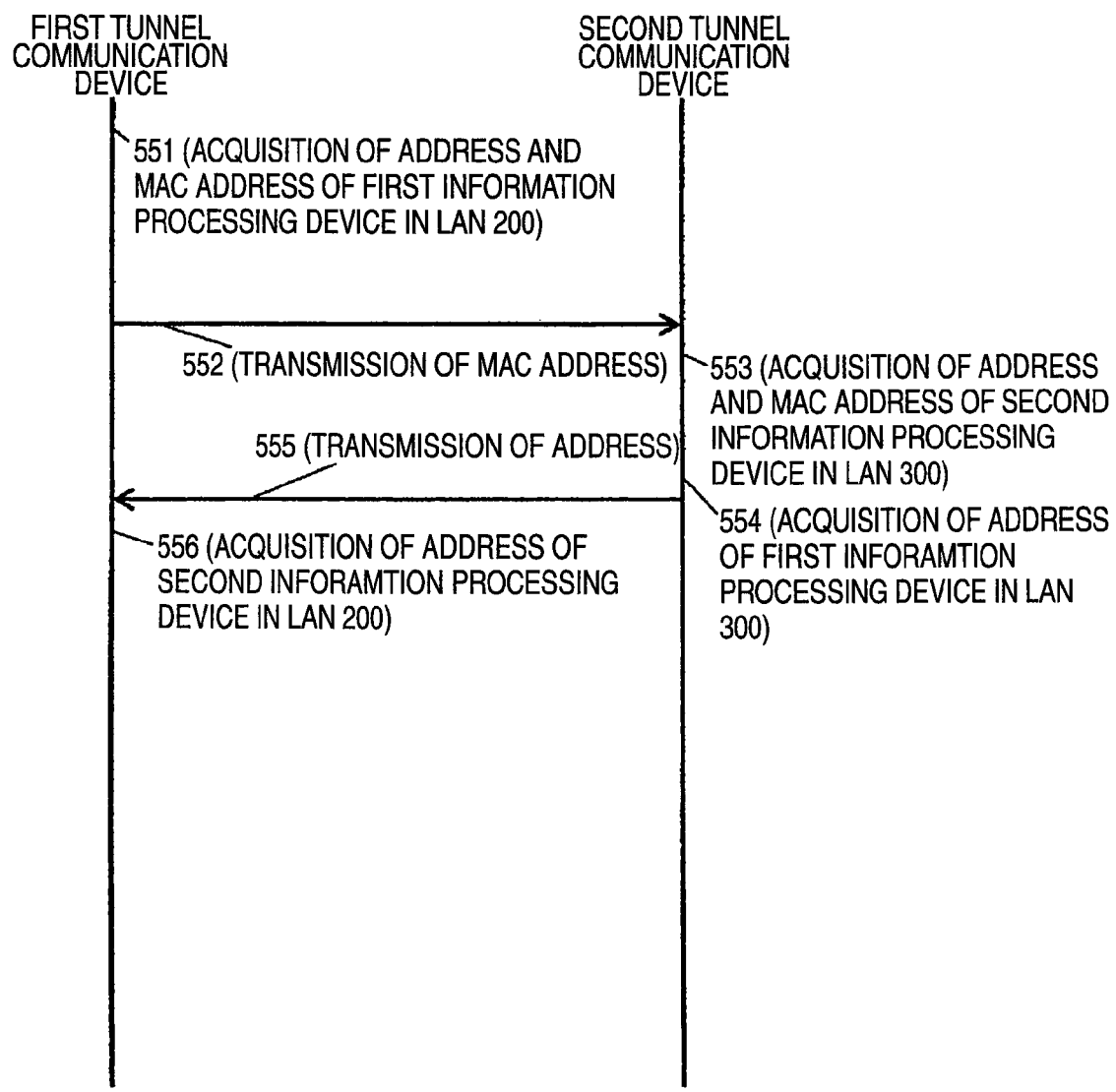
FIG. 29 is a diagram illustrating an address acquiring operation and an inter-device communicating operation of the information processing system according to the second embodiment.
Figure 30:
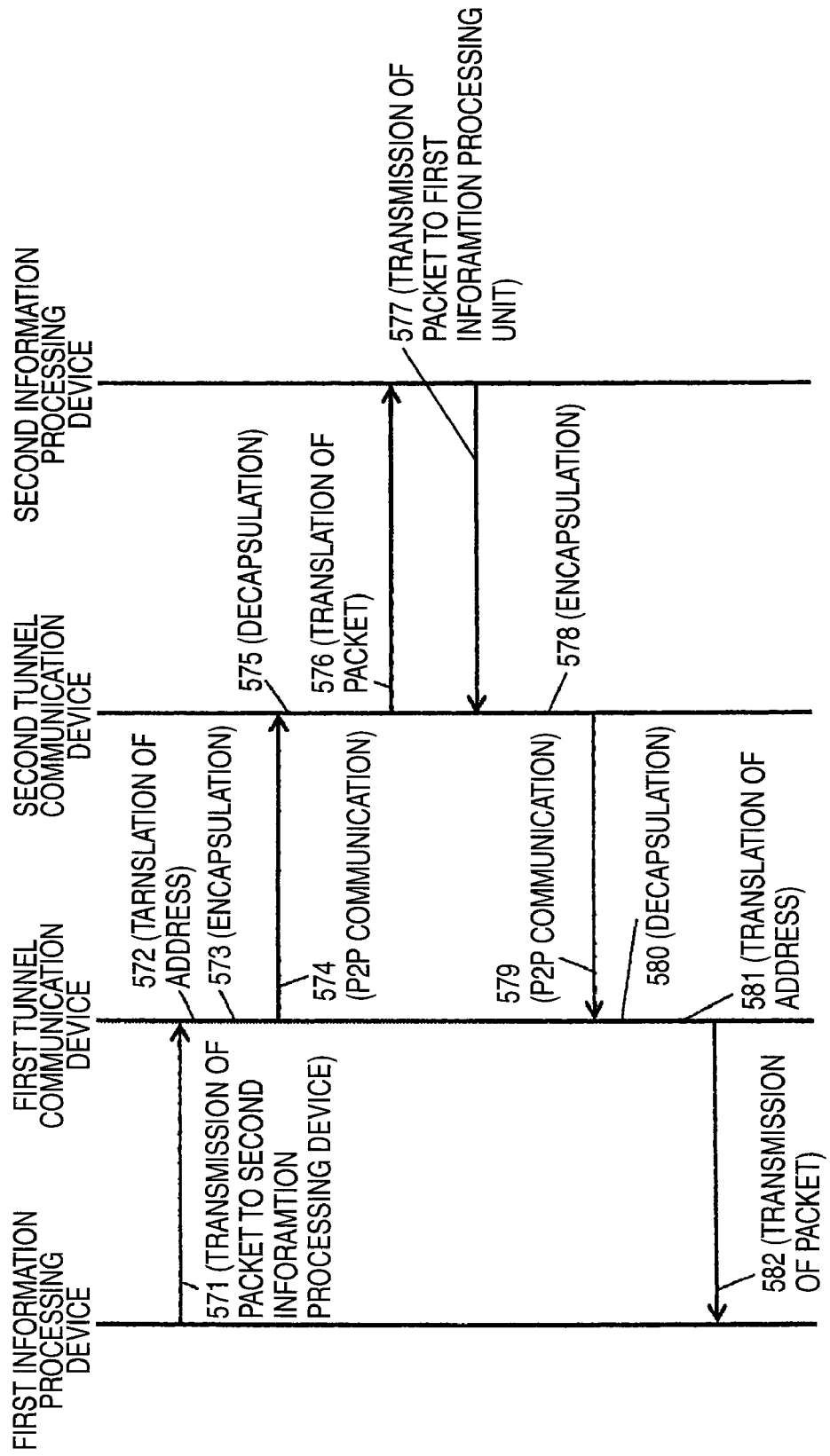
FIG. 30 is a diagram illustrating the inter-device communicating operation of the information processing system according to the second embodiment.

FIG. 26 is a diagram illustrating a part of a configuration of an information processing system according to a second embodiment of the invention, which includes a block diagram illustrating a second tunnel communication device. FIG. 27 is a flowchart illustrating another operation of the second tunnel communication device according to the second embodiment. FIG. 28 is a flowchart illustrating another operation of the second tunnel communication device according to the second embodiment. FIG. 29 is a diagram illustrating an address acquiring operation and an inter-device communicating operation of the information processing system according to the second embodiment. FIG. 30 is a diagram illustrating the inter-device communicating operation of the information processing system according to the second embodiment. In the information processing system according to this embodiment, only the first tunnel communication device performs an address translating process and the second tunnel communication device does not perform an address translating process.

The configuration of the information processing system according to this embodiment is equal to that of the first embodiment shown in FIG. 1, except that the second tunnel communication device 5 is replaced with a second tunnel communication device 8 shown in FIG. 26, and thus description thereof is omitted. In FIG. 26, the information processing system includes a second tunnel communication device 8, a second communication processing device 6, and a second LAN 300. The second tunnel communication device 8 includes a second P2P communication setup unit 53, a second tunnel communication unit 54, a second address acquiring unit 55, a second device address acquiring unit 56, a second address receiving unit 57, a second address transmitting unit 58, a second presence confirming information receiving unit 62, a second reply information transmitting unit 63, a second I/F 64, a CPU 302, and a recording medium 306. The elements are the same as described in the first embodiment, except that the address translating process is not performed, and thus description thereof is omitted.

Next, an operation of the second tunnel communication device 8 according to this embodiment will be described with reference to the flowchart of FIG. 27. The flowchart of FIG. 27 is the same as the flowchart of FIG. 5 according to the first embodiment, except that the process of step 203 is not performed, and thus description thereof is omitted. An operation of the information processing system according to this embodiment will be described with reference to a specific example. Addresses of the first information processing device 1 and the like are the same as the specific examples of the first embodiment.

In the specific example of this embodiment, as described above, pattern (E) of FIG. 7 is described. As can be seen from FIG. 7, in this specific example, both when a packet is transmitted from the first information processing device 1 to the second information processing device 4 and when a packet is transmitted from the second information processing device 4 to the first information processing device 1, the first address translating unit 22 translates an destination address and an source address.

Accordingly, the first address correlating information includes information for correlating the address of the first information processing device 1 in the first LAN 200 with the address of the first information processing device 1 in the second LAN 300. The first address correlating information includes information for correlating the address of the second information processing device 4 in the first LAN 200 with the address of the second information processing device 4 in the second LAN 300. The second tunnel communication device 8 does not store the second address correlating information.

The first address translating unit 22 translates the addresses of the destination and the source of a packet transmitted from the first information processing device 1 to the second information processing device 4 on the basis of the first address correlating information. The first address translating unit 22 translates the addresses of the destination and the source of a packet transmitted from the second information processing device 4 to the first information processing device 1 on the basis of the first address correlating information. In this specific example, the flowchart illustrating details of the process of step 104 in the flowchart of FIG. 4 is the same as shown in FIG. 19 and thus description thereof is omitted. FIG. 28 is a flowchart illustrating details of the process of step 204 in the flowchart of FIG. 27. The processes are the same as shown in the flowchart of FIGS. 9 and 17 and thus description thereof is omitted.

Next, the processes (S102, S202) of acquiring an address and transmitting and receiving the address, which are performed by the first tunnel communication unit 2 and the second tunnel communication unit 8, will be described with reference to FIG. 29. First, the first device address acquiring unit 26 acquires the IP address "192.168.0.10" of the first information processing device 1 in the first LAN 200 and the MAC address "00:11:22:AA:BB:CC" thereof (551). The first address transmitting unit 28 constructs a packet including the MAC address of the first information processing device 1, which is acquired by the first device address acquiring unit 26, in the payload and transmits the constructed packet through the path of the P2P communication set up by the first P2P communication setup unit 23 (552). The packet is translated in address by the second communication processing device 6, is transmitted to the second tunnel communication device 5, and is received by the second address receiving unit 57.

The second device address acquiring unit 56 acquires the IP address "192.168.1.10" of the second information processing device 4 in the second LAN 300 and the MAC address "01:23:45:AA:AA:AA" thereof (553). The second address acquiring unit 55 acquires the IP address of the first information processing device 1 in the second LAN 300 by the use of the MAC address of the first information processing device 1 (554). In this case, it is assumed that the IP address assigned by the second address assignor 61 is "192.168.1.20."

The second address transmitting unit 58 constructs a packet including in the payload the IP address of the second information processing device 4, which is acquired by the second device address acquiring unit 56, the MAC address thereof, and the IP address of the first information processing device 1, which is acquired by the second address acquiring unit 55, and transmits the constructed packet through the path of the P2P communication set up by the second P2P communication setup unit 53 (555). The packet is translated in address by the first communication processing device 3, is transmitted to the first tunnel communication device 2, and is received by the first address receiving unit 27.

The first address acquiring unit 25 acquires the IP address of the second information processing device 4 in the first LAN 200 by the use of the MAC address of the second information processing device 4 (556). In this case, it is assumed that the IP address assigned by the first address assignor 31 is "192.168.0.20." The process order in FIG. 29 has some voluntariness. For example, 553 may be reverse to 554 in order. The address acquired in 553 may be transmitted after 553 and the address acquired in 554 may be transmitted after 554.

Next, the first storage unit 29 stores information for correlating the IP address "192.168.0.10" of the first information processing device 1 in the first LAN 200, which is acquired by the first device address acquiring unit 26, with the IP address "192.168.1.20" of the first information processing device 1 in the second LAN 300, which is acquired by the first address receiving unit 27. The first storage unit 29 stores information for correlating the IP address "192.168.0.20" of the second information processing device 4 in the first LAN 200, which is acquired by the first address acquiring unit 25, with the IP address "192.168.1.10" of the second information processing device 4 in the second LAN 300, which is acquired by the first address receiving unit 27. In this way, the first address correlating information is stored (S103).

The first address correlating information stored in the first storage unit 29 is, for example, as shown in FIG. 14. In the process of storing the address correlating information, the tunnel communication unit and the like may store the address or the MAC address of the opposite information processing device, similarly to Specific Example 1. The method of allowing one information processing device to acquire an address of the opposite information processing device is the same as described in Specific Example 1 and thus description thereof is omitted.

Next, the transmission between the first information processing device 1 and the second information processing device 4 will be described with reference to FIG. 30. The details of the process of acquiring the MAC destination address using the ARP are not described. First, the first information processing device 1 constructs a packet having the IP address "192.168.0.20" of the second information processing device 4 as the destination address and transmits the constructed packet (571). The first tunnel communication unit 24 receives the packet. The first address translating unit 22 translates the IP address "192.168.0.10" of the source to the correlated IP address "192.168.1.20" in the second LAN 300 with reference to the first address correlating information.

The first address translating unit 22 translates the IP address "192.168.0.20" of the destination to the correlated IP address "192.168.1.10" in the second LAN 300 (572). The first tunnel communication unit 24 encapsulates the packet of which the address has been translated (573). The encapsulated packet is transmitted to the second tunnel communication device 5 through the path of the P2P communication (574). When receiving the packet, the second tunnel communication unit 54 of the second tunnel communication device 5 decapsulates the received packet (575). Then, the second tunnel communication unit 54 transmits the decapsulated packet to the second LAN 300 (576). The packet is received by the second information processing device 4.

Next, the transmission of a packet from the second information processing device 4 to the first information processing device 1 will be described. The second information processing device 4 constructs a packet having the IP address "192.168.1.20" of the first information processing device 1 as the destination address and transmits the constructed packet (577). The second tunnel communication unit 54 receives the packet. The second tunnel communication unit 54 encapsulates the packet (578). The encapsulated packet is transmitted to the first tunnel communication device 2 through the path of the P2P communication (579). When receiving the packet, the first tunnel communication unit 24 of the first tunnel communication device 2 decapsulates the received packet (580).

The first address translating unit 22 translates the IP address "192.168.1.10" of the source to the correlated IP address "192.168.0.20" in the first LAN 200 with reference to the first address correlating information. The first address translating unit 22 translates the IP address "192.168.1.20" of the destination to the correlated IP address "192.168.0.10" in the first LAN 200 (581). The first tunnel communication unit 24 transmits to the first LAN 200 the decapsulated packet of which the address has been translated (582). The packet is received by the first information processing device 1. Although pattern (E) of FIG. 7 has been described in the specific example, pattern (F) of FIG. 7 can be embodied in the same as described in the above-mentioned specific example.

As described above, in the information processing system according to this embodiment, the address translating process is performed by the first tunnel communication device 2. The tunnel communication through the path of the P2P communication is made between the first tunnel communication device 2 and the second tunnel communication device 8. Accordingly, two devices belonging to different LANs can be allowed to seem to belong to the same network, similarly to the first embodiment. In this embodiment, when the address acquiring unit of the tunnel communication device does not acquire the address using the MAC address of the opposite information processing device, the first tunnel communication device 2 may not have the first address transmitting unit 28 and the second tunnel communication device 8 may not include the second address receiving unit 57.

Third Embodiment

Figure 31:
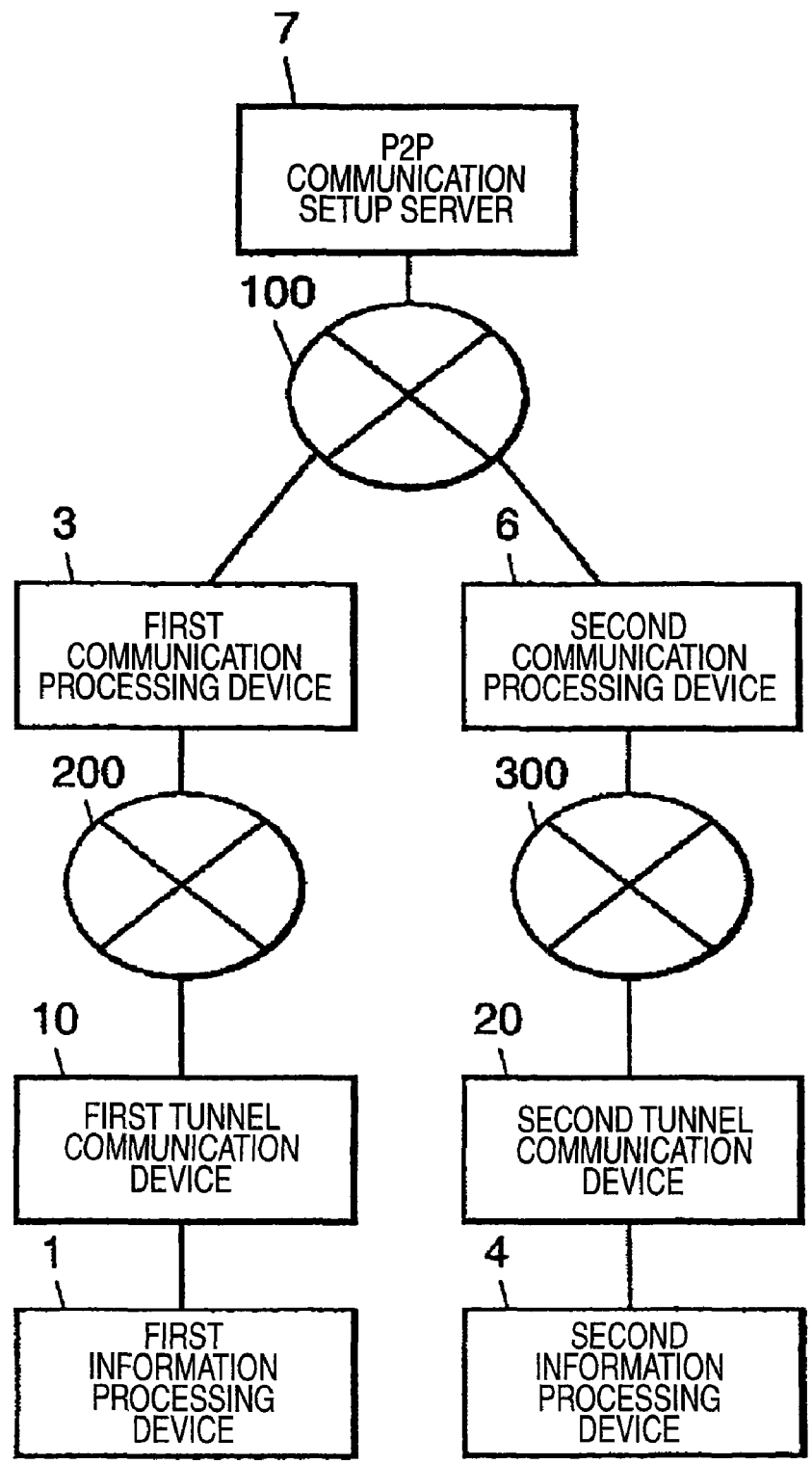
FIG. 31 is a block diagram illustrating a configuration of an information processing system according to a third embodiment of the invention.
Figure 32:
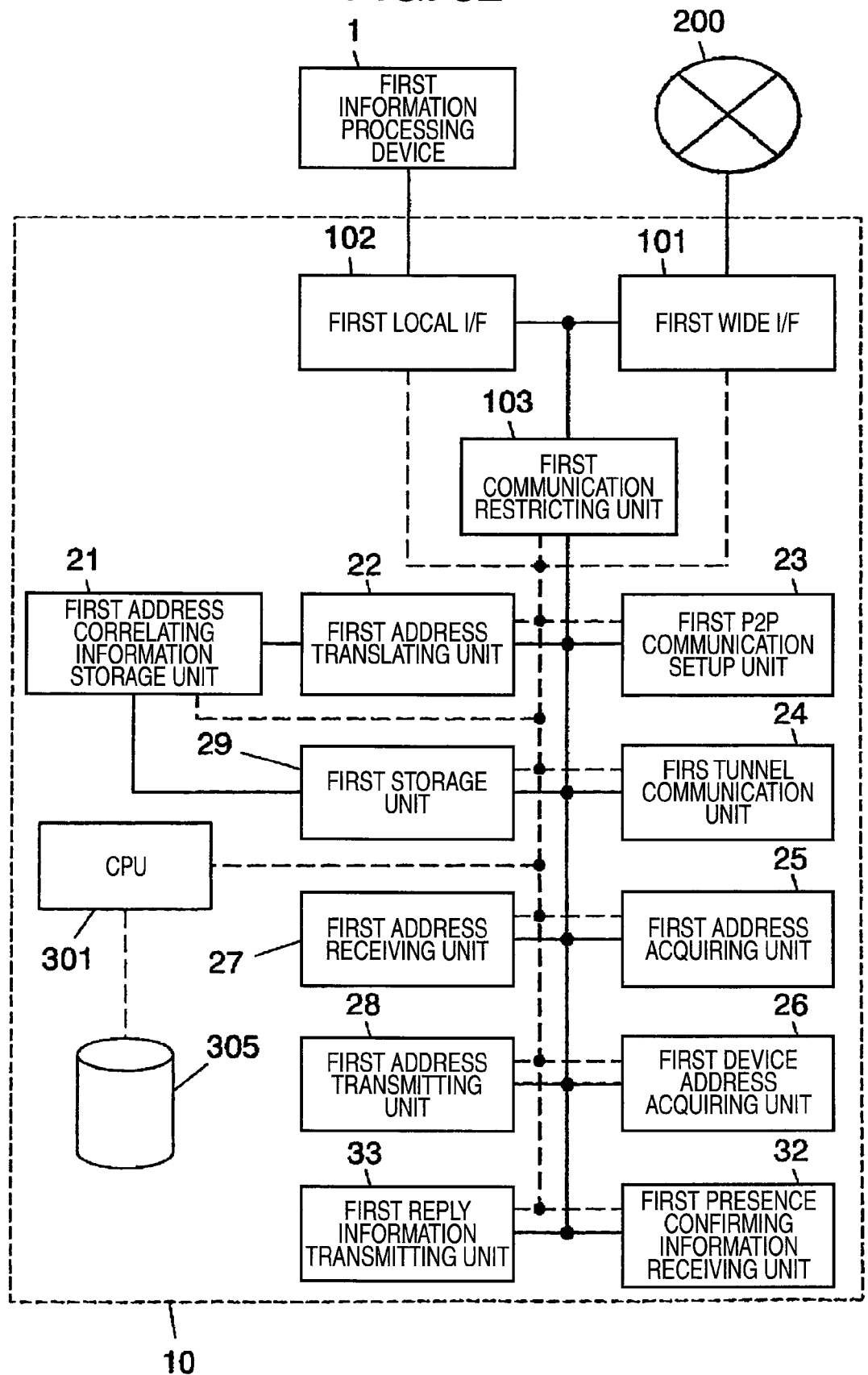
FIG. 32 is a diagram illustrating a part of the configuration of the information processing system, which includes a block diagram illustrating a first tunnel communication device according to the third embodiment.
Figure 33:
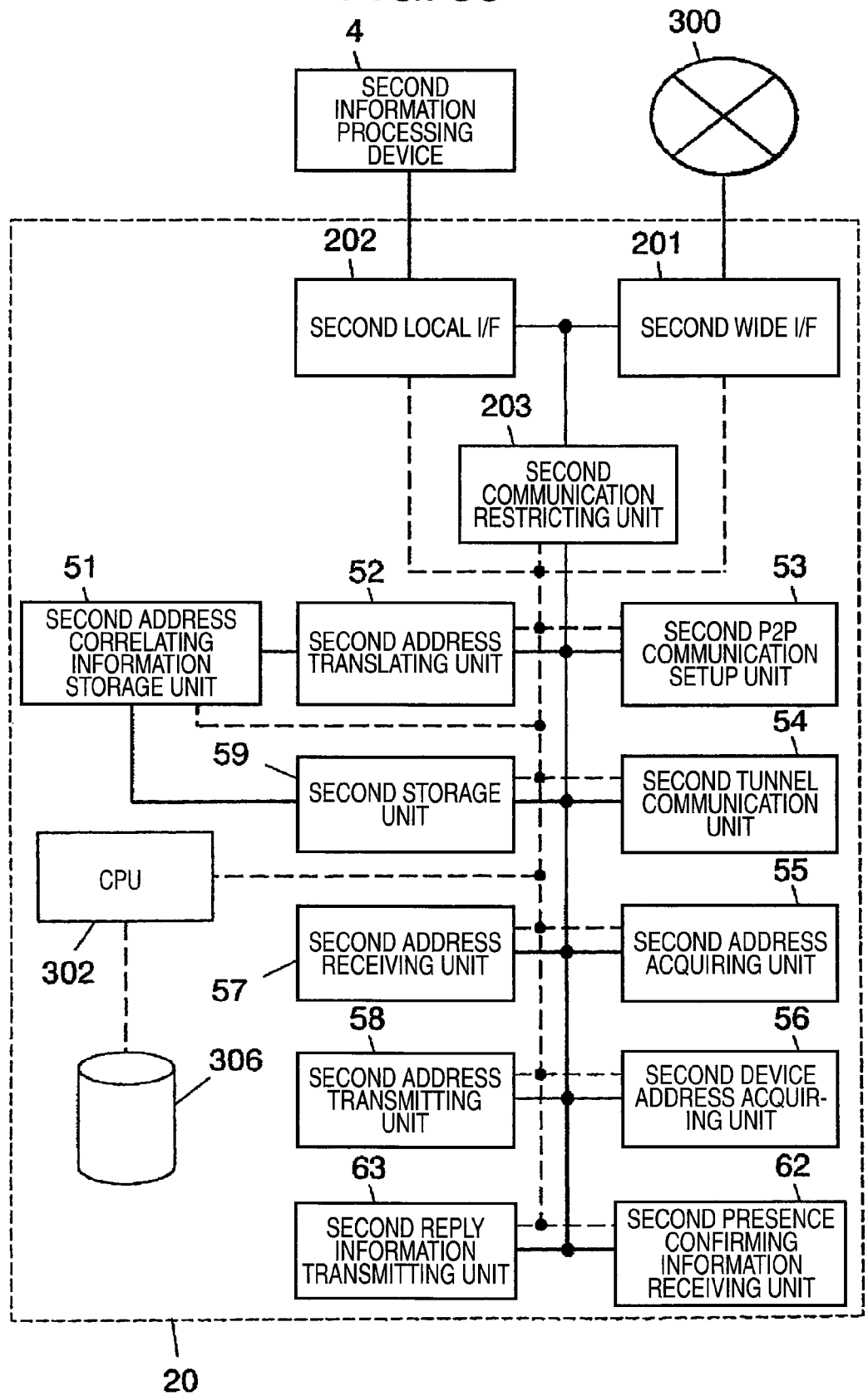
FIG. 33 is a diagram illustrating a part of the configuration of the information processing system, which includes a block diagram illustrating a second tunnel communication device according to the third embodiment.

FIG. 31 is a block diagram illustrating a configuration of an information processing system according to a third embodiment of the invention. FIG. 32 is a diagram illustrating a part of the configuration of the information processing system, which includes a block diagram illustrating a first tunnel communication device according to the third embodiment. FIG. 33 is a diagram illustrating a part of the configuration of the information processing system, which includes a block diagram illustrating a second tunnel communication device according to the third embodiment. In the information processing system according to this embodiment, the first tunnel communication device and the second tunnel communication device include a wide I/F and a local I/F, respectively. The communication with the information processing device is made through the local I/F and the tunnel communication is made through the wide I/F.

In FIG. 31, the same elements as shown in FIG. 1 are denoted by the same reference numerals and description thereof is omitted. In FIG. 31, the information processing system according to this embodiment includes a first information processing device 1, a communication processing device 3, a second information processing device 4, a second communication processing device 6, a P2P communication setup server 7, a first tunnel communication device 10, a second tunnel communication device 20, a first LAN 200, and a second LAN 300. In this embodiment, the first information processing device 1 is connected to the first communication processing device 3 through the first tunnel communication device 10. The second information processing device 4 is connected to the second communication processing device 6 through the second tunnel communication device 20.

In this embodiment, the wide side and the local side of the first tunnel communication device 10 are the same network. The same is true of the second tunnel communication device 20. Accordingly, in this embodiment, the first information processing device 1 is connected to the first LAN 200 and the second information processing device 4 is connected to the second LAN 300. Although it is shown in FIG. 31 that the wide side of the first tunnel communication device 10 is the first LAN 200, the local side of the first tunnel communication device 10 is also called the first LAN 200. The same is true of the second LAN 300.

Although it is shown in FIG. 31 for the purpose of convenient explanation that only one first information processing device 1 is connected to the first tunnel communication device 10, the invention is not limited to the configuration, but two or more first information processing devices 1 may be connected thereto. Similarly, although it is shown in FIG. 31 for the purpose of convenient explanation that only one second information processing device 4 is connected to the second tunnel communication device 20, two or more second information processing devices 4 may be connected thereto. In FIG. 31, one or more different devices may be connected to the local side of the first communication processing device 3 and the wide side of the first tunnel communication device 10. Similarly, one or more different devices may be connected to the local side of the second communication processing device 6 and the wide side of the second tunnel communication device 20.

FIG. 32 is a block diagram illustrating a partial configuration of the information processing system including the first tunnel communication device 10 according to this embodiment. As shown in FIG. 32, the information processing system according to this embodiment includes the first tunnel communication device 10, the first information processing device 1, and the first LAN 200. The first tunnel communication device 10 includes a first address correlating information memory unit 21, a first address translating unit 22, a first P2P communication setup unit 23, a first tunnel communication unit 24, a first address acquiring unit 25, a first device address acquiring unit 26, a first address receiving unit 27, a first address transmitting unit 28, a first storage unit 29, a first presence confirming information receiving unit 32, a first reply information transmitting unit 33, a first wide I/F 101, a first local I/F 102, a first communication restricting unit 103, a CPU 301, and a recording medium 305. The configurations and operations of the elements other than the first wide I/F 101, the first local I/F 102, and the first communication restricting unit 103 are the same as described in the first embodiment and thus description thereof is omitted.

The first wide I/F 101 is an interface on the wide network side. The first wide I/F 101 is hardware for connection to the first LAN 200 on the wide side and may be an NIC. The first tunnel communication unit 24 makes a tunnel communication through the first wide I/F 101. The first local I/F 102 is an interface on the local network side. The first local I/F 102 is hardware for connection to the first LAN 200 on the local side and may be an NIC. The first tunnel communication unit 24 communicates with the first information processing device 1 through the first local I/F 102.

The first communication restricting unit 103 restricts the packet transmitted from a device connected to the first LAN 200 and connected to the first wide I/F 101 so as not to pass through the path of the P2P communication. The first communication restricting unit 103 may be a device having a firewall function of performing a packet filtering, or may be a filter for passing only the packet transmitted from the wide side to a predetermined port (port used in the P2P communication) and passing both the packet from the local side and the packet from the inside (from the first tunnel communication unit 24 and the like).

The case where a communication is made by the first tunnel communication device 10 without using the first communication restricting unit 103 is a case where the communication is made between the first wide I/F 101 and the first local I/F 102. In this case, the first tunnel communication device 10 may operate like a bridge.

FIG. 33 is a block diagram illustrating a part of the configuration of the information processing system, which includes a second tunnel communication device 20 according to this embodiment. In FIG. 33, the information processing system includes a second tunnel communication device 20, a second information processing device 4, and a second LAN 300. The second tunnel communication device 20 includes a second address correlating information memory unit 51, a second address translating unit 52, a second P2P communication setup unit 53, a second tunnel communication unit 54, a second address acquiring unit 55, a second device address acquiring unit 56, a second address receiving unit 57, a second address transmitting unit 58, a second storage unit 59, a second presence confirming information receiving unit 62, a second reply information transmitting unit 63, a second wide I/F 201, a second local I/F 202, a second communication restricting unit 203, a CPU 302, and a recording medium 306. The configurations and operations of elements other than the second wide I/F 201, the second local I/F 202, and the second communication restricting unit 203 are the same as the first embodiment and thus description thereof is omitted.

The second wide I/F 201 and the second local I/F 202 are the same as the first wide I/F 101 and the first local I/F 102, respectively, and thus description thereof is omitted. The second communication restricting unit 203 restricts the packet transmitted from a device connected to the second LAN 300 and connected to the second wide I/F 201 so as not to pass through the path of the P2P communication. The second communication restricting unit 203 is the same as the first communication restricting unit 103 and thus description thereof is omitted. The operation of the information processing system according to this embodiment is substantially the same as described in the first embodiment, except that the tunnel communication device includes two interfaces and the communication restricting unit restricts a predetermined communication, and thus description thereof is omitted.

As described above, the information processing system according to this embodiment can provide the same advantages as the first embodiment, even when the tunnel communication device includes two interfaces. By providing the first communication restricting unit 103 and the second communication restricting unit 203 so as to restrict a predetermined communication, it is possible to prevent a tunnel communication from being made with an undesired device, thereby enhancing the safety.

Although it has been described in this embodiment that the tunnel communication device according to the first embodiment includes two interfaces, the tunnel communication device according to the second embodiment may include two interfaces. Although it has been described in this embodiment that the tunnel communication device includes the communication restricting unit, the tunnel communication device may not include the communication restricting unit. In this case, a device connected to the first LAN 200 on the wide side of the first tunnel communication device 10 or a device connected to the second LAN 300 on the wide side of the second tunnel communication device 20 can make a tunnel communication as a calling party.

In this embodiment, the packet transmitted from the information processing device is transmitted through the tunnel communication device. Accordingly, the tunnel communication device may not acquire the IP address and the like of the information processing device by using a broadcast packet or a unicast packet, as described above. The tunnel communication device may acquire the IP address and the like of the information processing device by monitoring packets. For example, the second tunnel communication device 20 can know the IP address or the MAC address of a device connected thereto by acquiring an address from the header of a packet transmitted from a local side device.

In general, since the second tunnel communication device 20 stores the MAC addresses of the devices connected to the ports, the second tunnel communication device can know the MAC address of a local side device. Accordingly, the second tunnel communication device 20 acquires the IP address corresponding to the MAC address by monitoring packets. Therefore, it is possible to know the IP address of a device connected to the local side of the second tunnel communication device 20 or the correlation between the IP address and the MAC address thereof. The second tunnel communication device 20 may know the information using an ARP table. Alternatively, the second tunnel communication device may know the information by monitoring a request packet to the DHCP server or a reply packet from the DHCP server. Alternatively, other methods may be used.

The first tunnel communication device 10 according to this embodiment receives the encapsulated packet from the wide side and receives the non-encapsulated packet from the local side. Accordingly, it may be determined that the packet received from the wide side is encapsulated and that the packet received from the local side is not encapsulated.

In the above-mentioned embodiments, it has been described that both the first tunnel communication device and the second tunnel communication device have a single I/F (first embodiment and second embodiment) and that both have two I/F (third embodiment). The invention is not limited to the configurations, but one tunnel communication device may have one I/F and the other tunnel communication device two I/Fs. In this case, as described in the above-mentioned embodiments, the first information processing device and the second information processing device can communicate with each other as if they belong to the same network.

In the specific examples of the embodiments, it has been described that the tunnel communication unit receives the encapsulated packet and then the address translating unit translates the address. The invention is not limited to the configuration, but the address translating unit may receive the packet when the address is translated before the encapsulation. Similarly, when the packet is decapsulated and then is translated in address, the address translating unit may transmit the decapsulated packet.

It has been described in the above-mentioned embodiments that the address translated by the address translating unit is an IP address, but it is only an example. In the invention, the MAC address may be translated along with the IP address. Alternatively, when the destination is expressed by a host name, the host name may be translated. In this way, the address is not limited to the IP address, so long as it can allow a packet in communication to be transmitted to a desired device.

The address may be other information, so long as it is correlated with the IP address and the like. For example, the address may be a uniform resource locator (hereinafter, referred to as "URL") or other identification information. For example, the address of the second information processing device 4 in the first LAN 200 is transmitted to predetermined identification information by the first address translating unit 22 of the first tunnel communication device. The identification information may be translated to the address of the second information processing device 4 in the second LAN 300 by the second address translating unit 52 of the second tunnel communication device. In this way, the address of the information processing device in the network to which one tunnel communication device belongs may not be known to the network to which the other tunnel communication device belongs.

In this case, the destination address and the source address are translated by the first tunnel communication device and the second tunnel communication device. In this way, even when the IP address in the first LAN 200 and the predetermined identification information are correlated with each other in the first address correlating information, it is possible to translate the predetermined identification information to the IP address in the second LAN 300. Accordingly, the first address correlating information for correlating the IP address in the first LAN 200 with the predetermined identification information may be said to be information for correlating the address in the first LAN 200 with the address in the second LAN 300. The same is true of the second address correlating information.

Here, the address correlating information in which the IP address and the identification information are correlated with each other will be described in more details. In this case, the first address correlating information includes the information for correlating the address of the first information processing device 1 in the first LAN 200 with the identification information of the first information processing device 1. The first address correlating information includes the information for correlating the address of the second information processing device 4 in the first LAN 200 with the identification information of the second information processing device 4.

The second address correlating information includes the information for correlating the identification information of the first information processing device 1 with the address of the first information processing device 1 in the second LAN 300. The second address correlating information includes the information for correlating the identification information of the second information processing device 4 with the address of the second information processing device 4 in the second LAN 300. The first address translating unit 22 translates the addresses of the destination and the source of the packet transmitted from the first information processing device 1 to the second information processing device 4 on the basis of the first address correlating information.

The first address translating unit 22 translates the addresses of the destination and the source of the packet transmitted from the second information processing device 4 to the first information processing device 1 on the basis of the first address correlating information. The second address translating unit 52 translates the addresses of the destination and the source of the packet transmitted from the second information processing device 4 to the first information processing device 1 on the basis of the second address correlating information. The second address translating unit 52 translates the addresses of the destination and the source of the packet transmitted from the first information processing device 1 to the second information processing device 4 on the basis of the second address correlating information. The processes are the same as shown in the flowchart of FIGS. 19 and 20.

Figures 34, 35, 36:
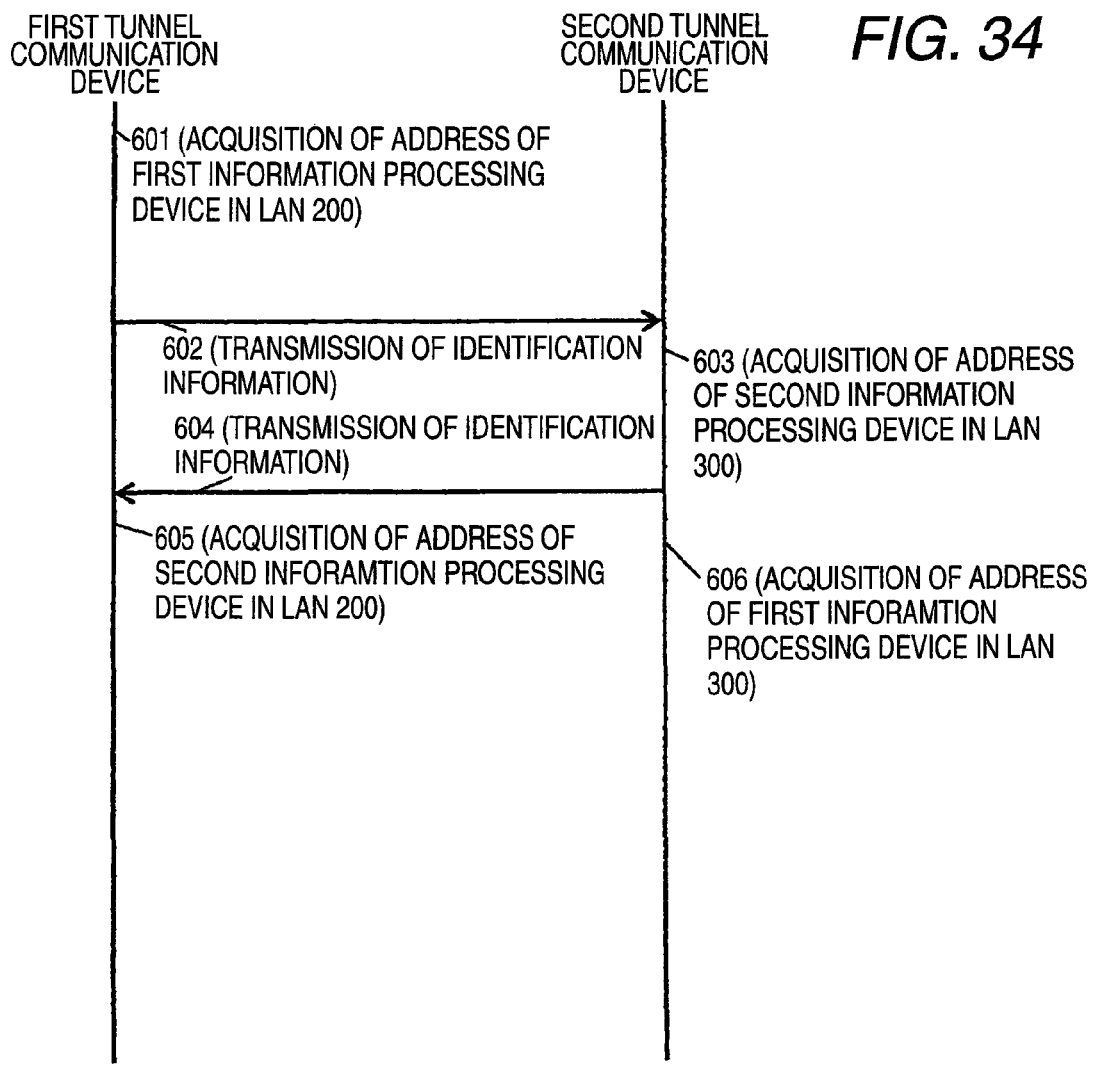
FIG. 34 is a diagram illustrating an address acquiring operation of an information processing system according to another embodiment of the invention.
FIG. 35 is a diagram illustrating an example of address correlating information of an information processing system according to another embodiment of the invention.
FIG. 36 is a diagram illustrating an example of address correlating information of an information processing system according to another embodiment of the invention.

Next, the process of acquiring an address and the like will be described with reference to FIG. 34. FIG. 34 is a diagram illustrating an address acquiring operation of an information processing system according to another embodiment. First, the first device address acquiring unit 26 acquires the IP address "192.168.0.10" of the first information processing device 1 in the first LAN 200 (601). The first address transmitting unit 28 constructs a packet including the identification information "AAA" correlated with the IP address of the first information processing device 1, which is acquired by the first device address acquiring unit 26, in the payload and transmits the constructed packet through the path of the P2P communication or a server relay (602).

When the first device address acquiring unit 26 acquires two or more addresses, two or more pieces of identification information are transmitted. The identification information may be set in advance by the first address transmitting unit 28. The packet is translated in address by the second communication processing device 6, is transmitted to the second tunnel communication device 5, and is received by the second address receiving unit 57.

The second device address acquiring unit 56 acquires the IP address "192.168.1.10" of the second information processing device 4 in the second LAN 300 (603). The second address transmitting unit 58 constructs a packet including the identification information "XXX" correlated with the IP address of the second information processing device 4, which is acquired by the second device address acquiring unit 56, in the payload and transmits the constructed packet through the path of the P2P communication or a server relay.

When the second device address acquiring unit 56 acquires two or more addresses, two or more pieces of identification information are transmitted. The identification information may be set in advance by the second address transmitting unit 58. The packet is translated in address by the first communication processing device 3 and is transmitted to the first tunnel communication device 2 (604). The transmitted packet is received by the first address receiving unit 27.

The first address acquiring unit 25 transmits a broadcast packet requesting for an IP address. It is assumed that the first address assignor 31 assigns the IP address "192.168.0.20" (605). The second address acquiring unit 55 transmits a broadcast packet requesting for an IP address. It is assumed that the second address assignor 61 assigns the IP address "192.168.1.20" (606).

Here, the acquisition of the IP address is performed using the MAC address as described above. The MAC address may be a MAC address secured in advance for acquiring an address or a MAC address randomly generated. Although it has been described that the MAC address is not transmitted, the MAC address may be transmitted to acquire an address using the MAC address.

Next, the first storage unit 29 stores the first address correlating information on the basis of the address acquired by the first address acquiring unit 25, the address acquired by the first device address acquiring unit 26, the identification information transmitted by the second address transmitting unit 58, and the identification information received by the first address receiving unit 27. Specifically, the first storage unit 29 stores the information for correlating the address acquired by the first address acquiring unit 25 with the identification information received by the first address receiving unit 27. The first storage unit 29 stores the information for correlating the address acquired by the first device address acquiring unit 26 with the identification information transmitted by the first address transmitting unit 28.

Here, "the identification information transmitted by the first address transmitting unit 28" means identification information transmitted from the first address transmitting unit 28. At the time of storage, the identification information may be transmitted in advance by the first address transmitting unit 28 or may not be transmitted. FIG. 35 is a diagram illustrating an example of the address correlating information of the information processing system according to another embodiment and shows an example of the first address correlating information stored in the first storage unit 29.

Similarly, the second storage unit 59 stores the second address correlating information on the basis of the address acquired by the second address acquiring unit 55, the address acquired by the second device address acquiring unit 56, the identification information transmitted by the second address transmitting unit 58, and the identification information received by the second address receiving unit 57. Specifically, the second storage unit stores the information for correlating the address acquired by the second address acquiring unit 55 with the identification information received by the second address receiving unit 57. The second storage unit 59 stores the information for correlating the address acquired by the second device address acquiring unit 56 with the identification information transmitted by the second address transmitting unit 58. FIG. 36 is a diagram illustrating an example of the address correlating information of the information processing system according to another embodiment and shows an example of the first address correlating information stored in the second storage unit 59.

As a result, the address "192.168.0.20" of the destination of the packet transmitted from the first information processing device 1 to the second information processing device 4 is translated to the identification information "XXX" by the first address translating unit 22. The address "192.168.0.10" of the source is translated to the identification information "AAA" by the first address translating unit 22 and is transmitted in the tunnel communication. The identification information "XXX" as the destination address of the packet is translated to the address "192.168.1.10" by the second address translating unit 52.

The identification information "AAA" as the source address is translated to the address "192.168.1.20" by the second address translating unit 52. The same is true when a packet is transmitted from the second information processing device 4 to the first information processing device 1. In this way, the address is translated using the identification information. Although it has been described that the identification information is transmitted between the first tunnel communication device 2 and the second tunnel communication device 5, the transmission may not be performed.

For example, the storage unit may have predetermined identification information in advance and may store information for correlating the identification information with an address. In this case, the address acquiring unit may acquire a predetermined number of (for example, 1, 10, etc.) addresses, may correlate the addresses with the identification information, may store the resultant information. Alternatively, only the number of information processing device may be transmitted from one tunnel communication device to the other tunnel communication device. In this case, the addresses corresponding to the number can be acquired by the address acquiring unit.

The identification information correlated with the address of the first information processing device 1 and the identification information correlated with the address of the second information processing device 4 may overlap with each other. This is because the address translating unit can determine whether it is the address of the first information processing device or the address of the second information processing device, depending on which of the destination address and the source address it is. When the identification is not transmitted between the tunnel communication devices, the tunnel communication device may not include the address transmitting unit or the address receiving unit.

In the above-mentioned embodiments, the MAC address of the first information processing device 1 connected to the first LAN 200 is transmitted from the first tunnel communication device to the second tunnel communication device. Then, the second tunnel communication device acquires the address of the first information processing device 1 in the second LAN 300 using the MAC address. The invention is not limited to the configuration, but the MAC address may not be transmitted. However, when the IP address of the first information processing device 1 connected to the first LAN is transmitted from the first tunnel communication device to the second tunnel communication device, the second tunnel communication device can acquire the addresses corresponding to the number of IP addresses transmitted.

On the other hand, when the IP address is not transmitted, the second tunnel communication device may receive the number of first information processing devices 1 from the first tunnel communication device and may acquire the addresses corresponding to the received number. Alternatively, the second tunnel communication device may acquire a predetermined number of (for example, 1, 10, etc.) addresses and may transmit the addresses to the first tunnel communication device. It is assumed that the first tunnel communication device uses only necessary addresses of the transmitted addresses.

In the above-mentioned embodiments, it has been described that the first tunnel communication device includes the first presence confirming information receiving unit and the first reply information transmitting unit. However, in the invention, the first tunnel communication device may not include the first presence confirming information receiving unit and the first reply information transmitting unit. When the first tunnel communication device does not include the first presence confirming information receiving unit and the reply information transmitting unit, the first tunnel communication unit 24 may encapsulate the presence confirming information and transmit the encapsulated information through the path of the P2P communication. In this case, it is assumed that the first address translating unit 22 translates only the necessary addresses. As described above, the second tunnel communication device may not include the second presence confirming information receiving unit and the second reply information transmitting unit.

In the above-mentioned embodiments, it has been described that the addresses are translated in the patterns shown in FIG. 7. The invention is not limited to the patterns, but the address translating method does not matter, so long as the first information processing device 1 and the second information processing device 4 can make a communication so as to seem to belong to the same network by translating the addresses. As described in the specific examples of the above-mentioned embodiments, the details of the address correlating information vary depending on the address translating method.

Although it has been described in the above-mentioned embodiments that the address assignor is a DHCP server, the address assignor may assign an address by the use of a method other than the DHCP. For example, the Auto IP, the IP control protocol (hereinafter, referred to as "IPCP"), or the automatic private IP address assignment (hereinafter, referred to as "APIPA") may be used to assign an address.

In the above-mentioned embodiments, it has been described that the storage unit stores the address correlating information in the address correlating information memory unit on the basis of the addresses acquired or received by the address acquiring unit or the address receiving unit. However, in the invention, the address correlating information may be stored on the basis of the addresses acquired by means of other methods. Alternatively, the address correlating information memory unit storing the address correlating information may be provided in the tunnel communication device in advance. In this case, the tunnel communication device may not include all or some of the address acquiring unit, the address receiving unit, the device address acquiring unit, the address transmitting unit, and the storage unit. When the address assignor does not assign an address, the information processing system may not include the address assignor.

In the above-mentioned embodiments, it has been described that the first P2P communication setup unit 23 and the second P2P communication setup unit 53 set up the P2P communication using the communication processing device by transmitting and receiving packets. The invention is not limited to the configuration, the first P2P communication setup unit 23 and the like may set up the path of the P2P communication using the UPnP function. Specifically, the first P2P communication setup unit 23 and the second P2P communication setup unit 53 assign ports to the first communication processing device 3 and the second communication processing device 6 using the UPnP function.

The packet transmitted to a predetermined port on the wide side of the communication processing device can be received by the first tunnel communication device 2 or the second tunnel communication device 5. The assigned port number or the address of the communication processing device are transmitted between the first P2P communication setup unit 23 and the second P2P communication setup unit 53 through the P2P communication setup server 7. Then, the P2P communication can be made therebetween.

Although it has been described in the above-mentioned embodiments that the information processing system includes the P2P communication setup server 7, the information processing system may not include the P2P communication setup server 7. For example, a user inputs an address and a port number of the wide side of the second communication processing device 6 to the first tunnel communication device 2. Accordingly, the first P2P communication setup unit 23 can know the address and the port number of the wide side of the second communication processing device 6 and thus can set up the P2P communication with the second tunnel communication device 5.

In the above-mentioned embodiments, when a new information processing device is connected to the LAN, the address correlating information of the information processing device may be stored. In this case, the address of the information processing device may be transmitted between the tunnel communication devices. In the above-mentioned embodiments, the first information processing device and the first tunnel communication device may be embodied monolithically by one body. That is, the first tunnel communication device may include the first information processing device. Similarly, the second information processing device and the second tunnel communication device may be embodied monolithically by one body. That is, the second tunnel communication device may include the second information processing device.

In the above-mentioned embodiments, even when the information processing system does not include the communication processing device, the first information processing device and the second information processing device may be allowed to make a tunnel communication through the path of the P2P communication in the same sequence. This is because the tunnel communication device could not know simply whether a communication processing device is present on the wide side, but can allow the first information processing device and the second information processing device to make a tunnel communication through the path of the P2P communication by executing the sequence of the embodiment regardless of the presence of the communication processing device.

Although it has been described in the above-mentioned embodiments that a communication is made using the IP, other protocols may be used to make a communication. Although it has been described in the above-mentioned embodiments that the physical addresses of the information processing device and the like are the MAC addresses, other physical addresses may be used instead of the MAC addresses. An example of the physical addresses other than the MAC addresses includes addresses in accordance with IEEE1394 standard established by the Institute of Electrical and Electronics Engineers, Inc.

In the above-mentioned embodiments, the address correlating information may be updated. For example, the second tunnel communication device repeatedly (for example, periodically) performs the process of acquiring an address. When it is detected that a new second information processing device 4 is connected to the second LAN 300, the address of the new second information processing device 4 is acquired and transmitted. Accordingly, the first address correlating information and the second address correlating information may be updated. This process is the same as described in storing the address correlating information and thus description thereof is omitted. The same is true of the first tunnel communication device.

In the above-mentioned embodiments, it has been described that the tunnel communication device includes the presence confirming information receiving unit and the reply information transmitting unit. The invention is not limited to the configuration, but a device other than the tunnel communication device, that is, a device for making a communication using a server relay, may include both units. The device may transmit the reply information instead of the opposite information processing device. In this case, the configuration is not changed, except that the tunnel communication described in the above-mentioned embodiments is made using the server relay. A proxy response device for responding by proxy instead of the information processing device in response to the presence confirming information may be particularly provided.

Figure 37:
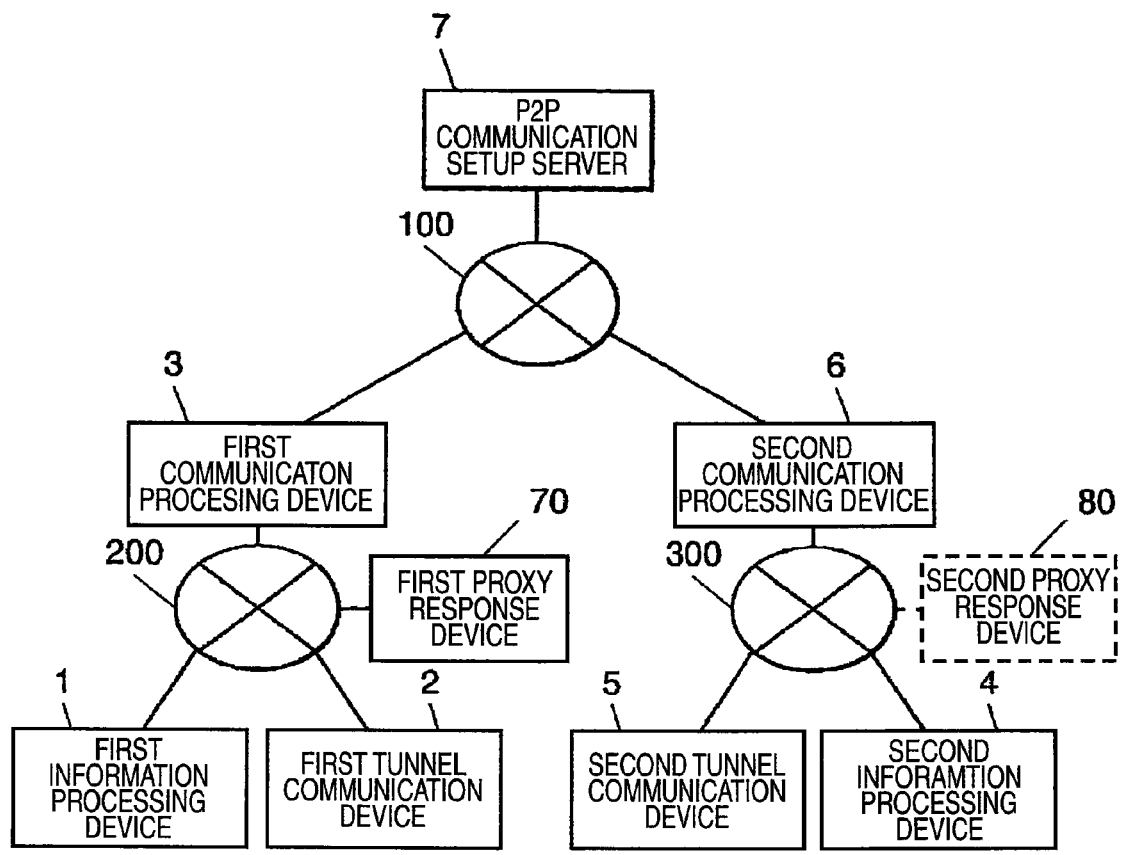
FIG. 37 is a block diagram illustrating a configuration of an information processing system according to another embodiment of the invention.
Figure 38:
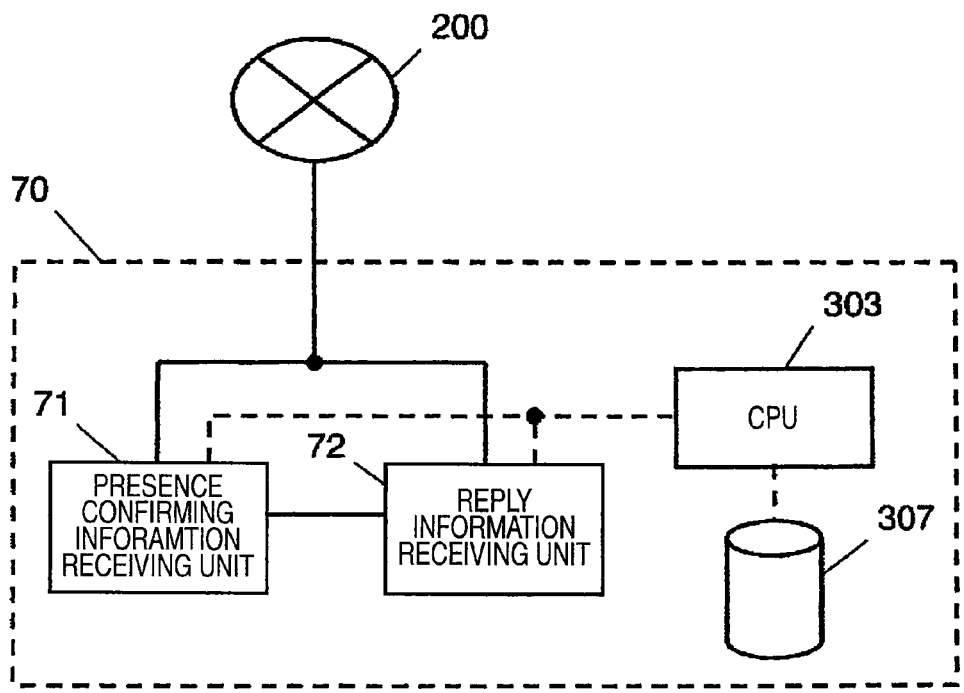
FIG. 38 is a diagram illustrating a part of the configuration of the information processing system, which includes a block diagram illustrating a first proxy response device according to the embodiment.
Figure 39:
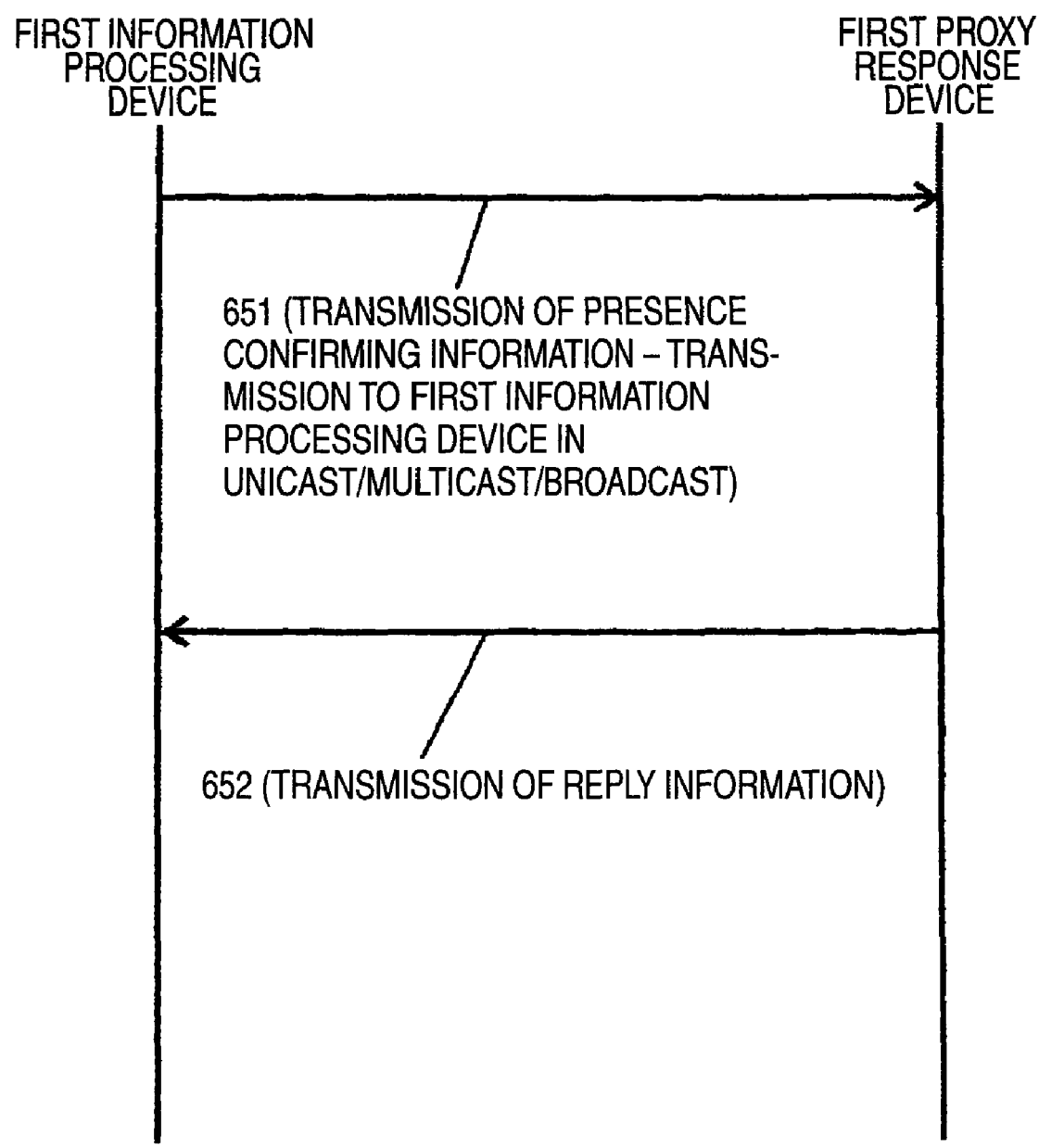
FIG. 39 is a diagram illustrating an inter-device communicating operation of the information processing system according to the embodiment.

FIG. 37 is a block diagram illustrating a configuration of an information processing system according to another embodiment of the invention. FIG. 38 is a diagram illustrating a part of the configuration of the information processing system, which includes a block diagram illustrating a first proxy response device according to the embodiment. FIG. 39 is a diagram illustrating an inter-device communicating operation of the information processing system according to the embodiment. In FIG. 37, a proxy response device 70 is connected to the first LAN 200 and the second information processing device 4 is connected to the second LAN 300, similarly to the above-mentioned embodiments. In this way, the first proxy response device 70 and the second information processing device 4 are connected to different LANs, respectively.

In FIG. 38, the first proxy response device includes a presence confirming information receiving unit 71, a reply information transmitting unit 72, a CPU 303, and a recording medium 307. As shown in FIG. 39, the first information processing device transmits the presence confirming information (651). When the presence confirming information receiving unit receives the presence confirming information, the first proxy response device 70 may transmit the reply information instead of the second information processing device 4 (652). In this way, it is possible to transmit the reply information by proxy as if the second information processing device 4 is connected to the first LAN 200.

In this case, it is assumed that the reply information transmitting unit 72 knows the address of the second information processing device 4 in the first LAN 200 and transmits the reply information having the address as a source address. In this case, the presence confirming information receiving unit 71 may receive the presence confirming information of a broadcast communication type such as a broadcast packet or a multicast packet. Alternatively, the presence confirming information receiving unit may receive the presence confirming information having the address of the second information processing device 4 as a destination address. In the latter, the presence confirming information receiving unit 71 may know the address of the second information processing device 4 in the first LAN 200. Similarly, the second proxy response device 80 may transmit the reply information to the second information processing device 4, instead of the first information processing device 1.

The communication protocol in the above-mentioned embodiments may be, for example, IP version (hereinafter, referred to as "v") 4 (Internet Protocol version 4) or IPv6 (Internet Protocol version 6). The processes or the functions may be intensively performed by a single device or a single system, or may be extensively performed by plural devices or plural systems.

In the above-mentioned embodiments, the elements may be embodied by exclusive hardware, or the elements which can be embodied by software may be embodied by executing programs. For example, software programs recorded in a recording medium such as a hard disc or a semiconductor memory can be read out and executed by a program executing unit such as a central processing unit (hereinafter, referred to as CPU) as a computer, thereby implementing the elements.

The software implementing the tunnel communication device in the above-mentioned embodiments is the following program. That is, the program is a program for allowing a computer to execute the process of the tunnel communication device connected to the first LAN to which one or more information processing devices are connected. This program is to perform an address translating step, a P2P communication setup step, and a tunnel communication step.

The address translating step is to translate an address of a packet on the basis of the address correlating information which is information for correlating an address in the first LAN stored in the address correlating information memory unit with an address in the second LAN to which a device as a destination is connected. The P2P communication setup step is to set up the P2P communication with the device as a destination. The tunnel communication step is to make a tunnel communication through the path of the P2P communication set up in the P2P communication setup step.

A packet transmitted from an information processing device to a device connected to the second LAN 300 is encapsulated in the tunnel communication step and then is transmitted through the path of the P2P communication. The encapsulated packet transmitted from the device connected to the second LAN through the path of the P2P communication is decapsulated and transmitted to the information processing device in the tunnel communication step. At least one packet of the packet transmitted from the information processing device to the device connected to the second LAN and the packet transmitted from the device connected to the second LAN through the path of the P2P communication is translated in address in the address translating step.

The software implementing the proxy response device in the embodiment is the following program. That is, the program is a program for allowing the CPU 303 which is a computer to execute the process of the proxy response device for replying by proxy instead of the information processing device. This program is to perform a presence confirming information receiving step and a reply information transmitting step.

In the presence confirming information receiving step, the information processing device and the proxy response device are connected to different local area networks, respectively, and the presence confirming information which is information transmitted to confirm presence of a device is received. In the reply information transmitting step, when the presence confirming information is received in the presence confirming information receiving step, the reply information in response to the presence confirming information is transmitted instead of the information processing device. The program does not include the processes performed by a modem or an interface card and the processes performed by only the hardware in the communication step.

The program may be downloaded from a server or the like for execution, or a program recorded in a predetermined recording medium 307 such as an optical disc of CD-ROM, a magnetic disc, or a semiconductor memory may be read out for execution. The number of computers for executing the program may be single or plural. That is, the program may be intensively executed or extensively executed.

The invention is not limited to the above-mentioned embodiments, but can be modified in various forms without departing from the scope of the invention.

INDUSTRIAL APPLICABILITY

As described above, since the information processing system and the like according to the invention can make a communication between plural information processing devices belonging to different LANs without a user's making a complex setup, they are useful for information processing systems for making a communication between information processing devices.

The invention claimed is:

1. An information processing system comprising:
a first tunnel communication device that is connected to a first local area network;
one or more first information processing device that is connected to the first local area network;
a second tunnel communication device that is connected to a second local area network connected to the first local area network through a communication line; and
one or more second information processing device that is connected to the second local area network,
wherein the first tunnel communication device includes:
a first address correlating information storage unit that stores first address correlating information which is information for correlating an address of the second information processing device in the first local area network with an address of the second information processing device in the second local area network;
a first address translating unit that translates an address of a packet on the basis of the first address correlating information;
a first peer-to-peer communication setup unit that sets up a peer-to-peer communication with the second tunnel communication device; and
a first tunnel communication unit that makes a tunnel communication through a path of the peer-to-peer communication set up by the first peer-to-peer communication setup unit,
wherein a packet transmitted from the first information processing device to the second information processing device is encapsulated by the first tunnel communication device and is transmitted through the path of the peer-to-peer communication,
wherein an encapsulated packet transmitted from the second tunnel communication device through the path of the peer-to-peer communication is decapsulated by the first tunnel communication device and is transmitted to the first information processing device,
wherein at least one of the packet transmitted from the first information processing device to the second information processing device and the packet transmitted from the second tunnel communication device through the path of the peer-to-peer communication is translated in address by the first address translating unit,
wherein the second tunnel communication device includes:
a second address correlating information storage unit that stores second address correlating information which is information for correlating an address of the first information processing device in the second local area network with an address of the first information processing device in the first local area network;
a second address translating unit that translates an address of a packet on the basis of the second address correlating information;
a second peer-to-peer communication setup unit that sets up a peer-to-peer communication with the first tunnel communication device; and
a second tunnel communication unit that makes a tunnel communication through a path of the peer-to-peer communication set up by the second peer-to-peer communication setup unit,
wherein a packet transmitted from the second information processing device to the first information processing device is encapsulated by the second tunnel communication device and is transmitted through the path of the peer-to-peer communication,
wherein an encapsulated packet transmitted from the first tunnel communication device through the path of the peer-to-peer communication is decapsulated by the second tunnel communication device and is transmitted to the second information processing device, and
wherein at least one of the packet transmitted from the second information processing device to the first information processing device and the packet transmitted from the first tunnel communication device through the path of the peer-to-peer communication is translated in address by the second address translating unit.

2. The information processing system according to claim 1, wherein the first address correlating information includes:
information for correlating an address of the first information processing device in the first local area network with an address of the first information processing device in the second local area network; and
information for correlating an address of the second information processing device in the first local area network with an address of the second information processing device in the second local area network, and
wherein the second address correlating information includes:
information for correlating an address of the first information processing device in the first local area network with an address of the first information processing device in the second local area network; and
information for correlating an address of the second information processing device in the first local area network with an address of the second information processing device in the second local area network.

3. The information processing system according to claim 1, wherein the first address correlating information includes information for correlating an address of the first information processing device in the first local area network with an address of the first information processing device in the second local area network,
wherein the second address correlating information includes information for correlating an address of the second information processing device in the first local area network with an address of the second information processing device in the second local area network,
wherein the first address translating unit translates an source address of a packet transmitted from the first information processing device to the second information processing device on the basis of the first address correlating information and translates an destination address of a packet transmitted from the second information processing device to the first information processing device on the basis of the first address correlating information, and
wherein the second address translating unit translates an destination address of a packet transmitted from the first information processing device to the second information processing device on the basis of the second address correlating information and translates an source address of a packet transmitted from the second information processing device to the first information processing device on the basis of the second address correlating information.

4. The information processing system according to claim 1, wherein the first address correlating information includes information for correlating an address of the second information processing device in the first local area network with an address of the second information processing device in the second local area network,
- wherein the second address correlating information includes information for correlating an address of the first information processing device in the first local area network with an address of the first information processing device in the second local area network,
- wherein the first address translating unit translates an destination address of a packet transmitted from the first information processing device to the second information processing device on the basis of the first address correlating information and translates an source address of a packet transmitted from the second information processing device to the first information processing device on the basis of the first address correlating information, and
- wherein the second address translating unit translates an source address of a packet transmitted from the first information processing device to the second information processing device on the basis of the second address correlating information and translates an destination address of a packet transmitted from the second information processing device to the first information processing device on the basis of the second address correlating information.

5. The information processing system according to claim 1, wherein the first address correlating information includes information for correlating an address of the first information processing device in the first local area network with identification information of the first information processing device and information for correlating an address of the second information processing device in the first local area network with identification information of the second information processing device,
- wherein the second address correlating information includes information for correlating an address of the first information processing device in the second local area network with the identification information of the first information processing device and information for correlating an address of the second information processing device in the second local area network with the identification information of the second information processing device,
- wherein the first address translating unit translates addresses of a destination and a source of a packet transmitted from the first information processing device to the second information processing device and addresses of a destination of a source of a packet transmitted from the second information processing device to the first information processing device on the basis of the first address correlating information, and
- wherein the second address translating unit translates addresses of a destination and a source of a packet transmitted from the second information processing device to the first information processing device and addresses of a destination of a source of a packet transmitted from the first information processing device to the second information processing device on the basis of the second address correlating information.

6. The information processing system according to claim 1, wherein the first tunnel communication device includes:
- a first presence confirming information receiving unit that receives presence confirming information which is information transmitted to confirm presence of a device; and
- a first reply information transmitting unit that transmits reply information which is information in response to the presence confirming information, instead of the second information processing device, when the first presence confirming information receiving unit receives the presence confirming information.

7. The information processing system according to claim 1, wherein the second tunnel communication device includes:
- a second presence confirming information receiving unit that receives presence confirming information which is information transmitted to confirm presence of a device; and
- a second reply information transmitting unit that transmits reply information which is information in response to the presence confirming information, instead of the first information processing device, when the second presence confirming information receiving unit receives the presence confirming information.

8. The information processing system according to claim 1, wherein the first tunnel communication device includes a first interface that is connected to the first local area network,
- wherein the first tunnel communication device communicates with the first information processing device through the first interface, and
- wherein the first tunnel communication unit makes a tunnel communication through the first interface.

9. The information processing system according to claim 1, wherein the first tunnel communication device includes a first wide interface on a wide network side and a first local interface on a local network side,
- wherein the first tunnel communication device communicates with the first information processing device through the first local interface, and
- wherein the first tunnel communication unit makes a tunnel communication through the first wide interface.

10. The information processing system according to claim 1, wherein the second tunnel communication device includes a second interface that is connected to the second local area network,
- wherein the second tunnel communication device communicates with the second information processing device through the second interface, and
- wherein the second tunnel communication unit makes a tunnel communication through the second interface.

11. The information processing system according to claim 1, wherein the second tunnel communication device includes a second wide interface on a wide network side and a second local interface on a local network side,
- wherein the second tunnel communication device communicates with the second information processing device through the second local interface, and
- wherein the second tunnel communication unit makes a tunnel communication through the second wide interface.

12. The information processing system according to claim 2, wherein the first address translating unit translates addresses of a source and a destination of a packet transmitted from the first information processing device to the second information processing device on the basis of the first address correlating information, and
- wherein the second address translating unit translates addresses of a source and a destination of a packet transmitted from the second information processing device to the first information processing device on the basis of the second address correlating information.

13. The information processing system according to claim 2, wherein the first address translating unit translates addresses of a source and a destination of a packet transmitted from the second information processing device to the first information processing device on the basis of the first address correlating information, and
wherein the second address translating unit translates addresses of a source and a destination of a packet transmitted from the first information processing device to the second information processing device on the basis of the second address correlating information.

14. The information processing system according to claim 2, further comprising:
a first address assignor that is connected to the first local area network and that assigns an address to a device connected to the first local area network; and
a second address assignor that is connected to the second local area network and that assigns an address to a device connected to the second local area network,
wherein the first tunnel communication device includes:
a first address acquiring unit that acquires an address of the second information processing device in the first local area network from the first address assignor;
a first address receiving unit that receives an address of the second information processing device in the second local area network and an address of the first information processing device in the second local area network;
a first device address acquiring unit that acquires an address of the first information processing device in the first local area network;
a first storage unit that stores the first address correlating information in the first address correlating information storage unit on the basis of the address acquired by the first address acquiring unit, the address received by the first address receiving unit, and the address acquired by the first device address acquiring unit; and
a first address transmitting unit that transmits the address of the second information processing device acquired by the first address acquiring unit and the address of the first information processing device acquired by the first device address acquiring unit to the second tunnel communication device, and
wherein the second tunnel communication device includes:
a second address acquiring unit that acquires an address of the first information processing device in the second local area network from the second address assignor;
a second address receiving unit that receives an address of the first information processing device in the first local area network and an address of the second information processing device in the first local area network;
a second device address acquiring unit that acquires an address of the second information processing device in the second local area network;
a second storage unit that stores the second address correlating information in the second address correlating information storage unit on the basis of the address acquired by the second address acquiring unit, the address received by the second address receiving unit, and the address acquired by the second device address acquiring unit; and
a second address transmitting unit that transmits the address of the first information processing device acquired by the second address acquiring unit and the address of the second information processing device acquired by the second device address acquiring unit to the first tunnel communication device.

15. The information processing system according to claim 3, further comprising:
a first address assignor that is connected to the first local area network and that assigns an address to a device connected to the first local area network; and
a second address assignor that is connected to the second local area network and that assigns an address to a device connected to the second local area network,
wherein the first tunnel communication device includes:
a first address acquiring unit that acquires an address of the second information processing device in the first local area network from the first address assignor;
a first address receiving unit that receives an address of the first information processing device in the second local area network;
a first device address acquiring unit that acquires an address of the first information processing device in the first local area network;
a first storage unit that stores the first address correlating information in the first address correlating information storage unit on the basis of the address acquired by the first address acquiring unit and the address acquired by the first device address acquiring unit; and
a first address transmitting unit that transmits the address of the second information processing device acquired by the first address acquiring unit to the second tunnel communication device, and
wherein the second tunnel communication device includes:
a second address acquiring unit that acquires an address of the first information processing device in the second local area network from the second address assignor;
a second address receiving unit that receives an address of the second information processing device in the first local area network;
a second device address acquiring unit that acquires an address of the second information processing device in the second local area network;
a second storage unit that stores the second address correlating information in the second address correlating information storage unit on the basis of the address received by the second address receiving unit and the address acquired by the second device address acquiring unit; and
a second address transmitting unit that transmits the address of the first information processing device acquired by the second address acquiring unit to the second tunnel communication device.

16. The information processing system according to claim 4, further comprising:
a first address assignor that is connected to the first local area network and that assigns an address to a device connected to the first local area network; and
a second address assignor that is connected to the second local area network and that assigns an address to a device connected to the second local area network,
wherein the first tunnel communication device includes:
a first address acquiring unit that acquires an address of the second information processing device in the first local area network from the first address assignor;
a first address receiving unit that receives an address of the second information processing device in the second local area network;
a first device address acquiring unit that acquires an address of the first information processing device in the first local area network;

a first storage unit that stores the first address correlating information in the first address correlating information storage unit on the basis of the address acquired by the first device address acquiring unit and the address received by the first address receiving unit; and a first address transmitting unit that transmits the address of the first information processing device acquired by the first device address acquiring unit to the second tunnel communication device, and wherein the second tunnel communication device includes:

a second address acquiring unit that acquires an address of the first information processing device in the second local area network from the second address assignor;

a second address receiving unit that receives an address of the first information processing device in the first local area network;

a second device address acquiring unit that acquires an address of the second information processing device in the second local area network;

a second storage unit that stores the second address correlating information in the second address correlating information storage unit on the basis of the address acquired by the second device address acquiring unit and the address received by the second address receiving unit; and a second address transmitting unit that transmits the address of the second information processing device acquired by the second address acquiring unit to the second tunnel communication device.

17. The information processing system according to claim 5, further comprising:

a first address assignor that is connected to the first local area network and that assigns an address to a device connected to the first local area network; and a second address assignor that is connected to the second local area network and that assigns an address to a device connected to the second local area network, wherein the first tunnel communication device includes:

a first address acquiring unit that acquires an address of the second information processing device in the first local area network from the first address assignor;

a first device address acquiring unit that acquires an address of the first information processing device in the first local area network; and a first storage unit that stores the first address correlating information in the first address correlating information storage unit on the basis of the address acquired by the first address acquiring unit and the address acquired by the first device address acquiring unit, and wherein the second tunnel communication device includes:

a second address acquiring unit that acquires an address of the first information processing device in the second local area network from the second address assignor;

a second device address acquiring unit that acquires an address of the second information processing device in the second local area network; and a second storage unit that stores the second address correlating information in the second address correlating information storage unit on the basis of the address acquired by the second address acquiring unit and the address acquired by the second device address acquiring unit.

18. The information processing system according to claim 9, wherein the first tunnel communication device further includes a first communication restricting unit that restricts a communication so as not to transmit a packet transmitted from a device connected to the first local area network and connected to the first wide interface through the path of the peer-to-peer communication.

19. The information processing system according to claim 11, wherein the second tunnel communication device further includes a second communication restricting unit that restricts a communication so as not to transmit a packet transmitted from a device connected to the second local area network and connected to the second wide interface through the path of the peer-to-peer communication.

20. The information processing system according to claim 14, wherein the first device address acquiring unit acquires an address of the first information processing device in the first local area network and a physical address of the first information processing device, wherein the second device address acquiring unit acquires an address of the second information processing device in the second local area network and a physical address of the second information processing device, wherein the first address transmitting unit transmits the address of the second information processing device acquired by the first address acquiring unit, the address of the first information processing device acquired by the first device address acquiring unit, and the physical address of the first information processing device, wherein the second address transmitting unit transmits the address of the first information processing device acquired by the second address acquiring unit, the address of the second information processing device acquired by the second device address acquiring unit, and the physical address of the second information processing device, wherein the first address receiving unit receives the address of the second information processing device in the second local area network, the address of the first information processing device in the second local area network, and the physical address of the second information processing device, wherein the second address receiving unit receives the address of the first information processing device in the first local area network, the address of the second information processing device in the first local area network, and the physical address of the first information processing device, wherein the first address acquiring unit acquires the address of the second information processing device in the first local area network by the use of the physical address of the second information processing device received by the first address receiving unit, and wherein the second address acquiring unit acquires the address of the first information processing device in the second local area network by the use of the physical address of the first information processing device received by the second address receiving unit.

21. The information processing system according to claim 15, wherein the first device address acquiring unit acquires an address of the first information processing device in the first local area network and a physical address of the first information processing device, wherein the second device address acquiring unit acquires an address of the second information processing device in the second local area network and a physical address of the second information processing device, wherein the first address transmitting unit transmits the address of the second information processing device acquired by the first address acquiring unit and the physical address of the first information processing device, wherein the second address transmitting unit transmits the address of the first information processing device acquired by the second address acquiring unit and the physical address of the second information processing device, wherein the first address receiving unit receives the address of the first information processing device in the second local area network and the physical address of the second information processing device, wherein the second address receiving unit receives the address of the second information processing device in the first local area network and the physical address of the first information processing device, wherein the first address acquiring unit acquires the address of the second information processing device in the first local area network by the use of the physical address of the second information processing device received by the first address receiving unit, and wherein the second address acquiring unit acquires the address of the first information processing device in the second local area network by the use of the physical address of the first information processing device received by the second address receiving unit.

22. The information processing system according to claim 16, wherein the first device address acquiring unit acquires an address of the first information processing device in the first local area network and a physical address of the first information processing device, wherein the second device address acquiring unit acquires an address of the second information processing device in the second local area network and a physical address of the second information processing device, wherein the first address transmitting unit transmits the address of the first information processing device acquired by the first device address acquiring unit and the physical address of the first information processing device, wherein the second address transmitting unit transmits the address of the second information processing device acquired by the second device address acquiring unit and the physical address of the second information processing device, wherein the first address receiving unit receives the address of the second information processing device in the second local area network and the physical address of the second information processing device, wherein the second address receiving unit receives the address of the first information processing device in the first local area network and the physical address of the first information processing device, wherein the first address acquiring unit acquires the address of the second information processing device in the first local area network by the use of the physical address of the second information processing device received by the first address receiving unit, and wherein the second address acquiring unit acquires the address of the first information processing device in the second local area network by the use of the physical address of the first information processing device received by the second address receiving unit.

23. The information processing system according to claim 17, wherein the first tunnel communication device includes:
a first address transmitting unit that transmits identification information corresponding to the address of the first information processing device; and
a first address receiving unit that receives identification information corresponding to the address of the second information processing device,
wherein the first storage unit stores the first address correlating information on the basis of the address acquired by the first address acquiring unit, the address acquired by the first device address acquiring unit, the identification information transmitted from the first address transmitting unit, and the identification information received by the first address receiving unit,
wherein the second tunnel communication device includes:
a second address transmitting unit that transmits identification information corresponding to the address of the second information processing device; and
a second address receiving unit that receives identification information corresponding to the address of the first information processing device, and
wherein the second storage unit stores the second address correlating information on the basis of the address acquired by the second address acquiring unit, the address acquired by the second device address acquiring unit, the identification information transmitted from the second address transmitting unit, and the identification information received by the second address receiving unit.

24. An information processing system comprising:
a first tunnel communication device that is connected to a first local area network;
one or more first information processing devices that are connected to the first local area network;
a second tunnel communication device that is connected to a second local area network connected to the first local area network through a communication line; and
one or more second information processing devices that are connected to the second local area network,
wherein the first tunnel communication device includes:
an address correlating information storage unit that stores address correlating information which is information for correlating an address of the second information processing device in the first local area network with an address of the second information processing device in the second local area network;
an address translating unit that translates an address of a packet on the basis of the address correlating information stored in the address correlating information storage unit;
a first peer-to-peer communication setup unit that sets up a peer-to-peer communication with the second tunnel communication device; and
a first tunnel communication unit that makes a tunnel communication through a path of the peer-to-peer communication set up by the first peer-to-peer communication setup unit,
wherein a packet transmitted from the first information processing device to the second information processing device is encapsulated by the first tunnel communication device and is transmitted through the path of the peer-to-peer communication,
wherein an encapsulated packet transmitted from the second tunnel communication device through the path of the peer-to-peer communication is decapsulated by the first tunnel communication device and is transmitted to the first information processing device, wherein at least one of the packet transmitted from the first information processing device to the second information processing device and the packet transmitted from the second tunnel communication device through the path of the peer-to-peer communication is translated in address by the address translating unit, wherein the second tunnel communication device includes:

a second peer-to-peer communication setup unit that sets up a peer-to-peer communication with the first tunnel communication device; and a second tunnel communication unit that makes a tunnel communication through a path of the peer-to-peer communication set up by the second peer-to-peer communication setup unit, wherein a packet transmitted from the second information processing device to the first information processing device is encapsulated by the second tunnel communication device and is transmitted through the path of the peer-to-peer communication, and wherein an encapsulated packet transmitted from the first tunnel communication device through the path of the peer-to-peer communication is decapsulated by the second tunnel communication device and is transmitted to the second information processing device.

25. The information processing system according to claim 24, wherein the address correlating information includes:

information for correlating an address of the first information processing device in the first local area network with an address of the first information processing device in the second local area network; and information for correlating an address of the second information processing device in the first local area network with an address of the second information processing device in the second local area network, wherein the address translating unit translates addresses of a source and a destination of a packet transmitted from the first information processing device to the second information processing device on the basis of the address correlating information, and translates addresses of a source and a destination of a packet transmitted from the second information processing device to the first information processing device on the basis of the address correlating information.

26. The information processing system according to claim 24, wherein the first tunnel communication device includes:

a first presence confirming information receiving unit that receives presence confirming information which is information transmitted to confirm presence of a device; and a first reply information transmitting unit that transmits reply information which is information in response to the presence confirming information, instead of the second information processing device, when the first presence confirming information receiving unit receives the presence confirming information.

27. The information processing system according to claim 24, wherein the first tunnel communication device includes a first interface that is connected to the first local area network, wherein the first tunnel communication device communicates with the first information processing device through the first interface, and wherein the first tunnel communication unit makes a tunnel communication through the first interface.

28. The information processing system according to claim 24, wherein the second tunnel communication device includes a second interface that is connected to the second local area network, wherein the second tunnel communication device communicates with the second information processing device through the second interface, and wherein the second tunnel communication unit makes a tunnel communication through the second interface.

29. A first tunnel communication device constituting the information processing system according to claim 1 or 24.

30. A second tunnel communication device constituting the information processing system according to claim 1 or 24.

31. The information processing system according to claim 25, further comprising:

a first address assignor that is connected to the first local area network and that assigns an address to a device connected to the first local area network; and a second address assignor that is connected to the second local area network and that assigns an address to a device connected to the second local area network, wherein the first tunnel communication device includes:

a first address acquiring unit that acquires an address of the second information processing device in the first local area network from the first address assignor;

a first address receiving unit that receives an address of the second information processing device in the second local area network and an address of the first information processing device in the second local area network;

a first device address acquiring unit that acquires an address of the first information processing device in the first local area network; and a storage unit that stores the first address correlating information in the first address correlating information storage unit on the basis of the address acquired by the first address acquiring unit, the address received by the first address receiving unit, and the address acquired by the first device address acquiring unit, wherein the second tunnel communication device includes:

a second address acquiring unit that acquires an address of the first information processing device in the second local area network from the second address assignor;

a second device address acquiring unit that acquires an address of the second information processing device in the second local area network; and a second address transmitting unit that transmits the address of the first information processing device acquired by the second address acquiring unit and the address of the second information processing device acquired by the second device address acquiring unit to the first tunnel communication device.

32. The information processing system according to claim 31, wherein the first device address acquiring unit acquires an address of the first information processing device in the first local area network and a physical address of the first information processing device, wherein the second device address acquiring unit acquires an address of the second information processing device in the second local area network and a physical address of the second information processing device, wherein the first tunnel communication device further includes a first address transmitting unit that transmits a physical address of the first information processing device acquired by the first device address acquiring unit, wherein the second tunnel communication device further includes a second address receiving unit that receives the physical address of the first information processing device, wherein the second address transmitting unit transmits the address of the first information processing device acquired by the second address acquiring unit, the address of the second information processing device acquired by the second device address acquiring unit, and the physical address of the second information processing device, wherein the first address receiving unit receives the address of the second information processing device in the second local area network, the address of the first information processing device in the second local area network, and the physical address of the second information processing device, wherein the first address acquiring unit acquires the address of the second information processing device in the first local area network by the use of the physical address of the second information processing device received by the first address receiving unit, and wherein the second address acquiring unit acquires the address of the first information processing device in the second local area network by the use of the physical address of the first information processing device received by the second address receiving unit.

33. A tunnel communication device connected to a first local area network to which one or more information processing devices are connected, the tunnel communication device comprising:

an address correlating information storage unit that stores address correlating information which is information for correlating an address of a device as a destination in the first local area network with an address of the device as a destination of a second local area network to which the device as a destination is connected;

an address translating unit that translates an address of a packet on the basis of the address correlating information stored in the address correlating information storage unit;

a peer-to-peer communication setup unit that sets up a peer-to-peer communication with the device as a destination; and a tunnel communication unit that makes a tunnel communication through the path of the peer-to-peer communication set up by the peer-to-peer communication setup unit, wherein a packet transmitted from the information processing device to a device connected to the second local area network is encapsulated by the tunnel communication device and is transmitted through the path of the peer-to-peer communication, wherein an encapsulated packet transmitted from the device connected to the second local area network through the path of the peer-to-peer communication is decapsulated by the tunnel communication device and is then transmitted to the information processing device, and wherein at least one of the packet transmitted from the information processing device to the device connected to the second local area network and the packet transmitted from the device connected to the second local area network through the path of the peer-to-peer communication is translated in address by the address translating unit.

34. The tunnel communication device according to claim 33, comprising:

a presence confirming information receiving unit that receives presence confirming information which is information transmitted to confirm presence of a device; and a reply information transmitting unit that transmits reply information in response to the presence confirming information instead of the information processing device when the presence confirming information receiving unit receives the presence confirming information.

35. A tunnel communication method used in a tunnel communication device connected to a first local area network to which one or more information processing devices are connected, the tunnel communication method comprising:

an address translating step of translating an address of a packet on the basis of address correlating information which is stored in an address correlating information storage unit and which is information for correlating an address of a device as a destination in the first local area network with an address of the device as a destination in a second local area network to which the device as a destination is connected;

a peer-to-peer communication setup step of setting up a peer-to-peer communication with the device as a destination; and a tunnel communication step of making a tunnel communication through the path of the peer-to-peer communication set up in the peer-to-peer communication setup step, wherein a packet transmitted from the information processing device to a device connected to the second local area network is encapsulated in the tunnel communication step and is transmitted through the path of the peer-to-peer communication, wherein an encapsulated packet transmitted from the device connected to the second local area network through the path of the peer-to-peer communication is decapsulated in the tunnel communication step and is then transmitted to the information processing device, and wherein at least one of the packet transmitted from the information processing device to the device connected to the second local area network and the packet transmitted from the device connected to the second local area network through the path of the peer-to-peer communication is translated in address in the address translating step.

36. The tunnel communication method according to claim 35, comprising:

a presence confirming information receiving step of receiving presence confirming information which is information transmitted to confirm presence of a device; and a reply information transmitting step of transmitting reply information in response to the presence confirming information instead of the information processing device when the presence confirming information is received in the presence confirming information receiving step.

37. A computer program product embodied on a non-transitory computer readable medium which, when executed by a computer, cause the computer to execute a process of a tunnel communication device connected to a first local area network to which one or more information processing devices are connected, the process comprising:

an address translating step of translating an address of a packet on the basis of address correlating information which is stored in an address correlating information storage unit and which is information for correlating an address of a device as a destination in the first local area network with an address of the device as a destination in a second local area network to which the device as a destination is connected;

a peer-to-peer communication setup step of setting up a peer-to-peer communication with the device as a destination; and a tunnel communication step of making a tunnel communication through the path of the peer-to-peer communication set up in the peer-to-peer communication setup step, wherein a packet transmitted from the information processing device to a device connected to the second local area network is encapsulated in the tunnel communication step and is transmitted through the path of the peer-to-peer communication, wherein an encapsulated packet transmitted from the device connected to the second local area network through the path of the peer-to-peer communication is decapsulated in the tunnel communication step and is then transmitted to the information processing device, and wherein at least one of the packet transmitted from the information processing device to the device connected to the second local area network and the packet transmitted from the device connected to the second local area network through the path of the peer-to-peer communication is translated in address in the address translating step.

38. The computer program product according to claim 37, the process comprising:

a presence confirming information receiving step of receiving presence confirming information which is information transmitted to confirm presence of a device; and a reply information transmitting step of transmitting reply information in response to the presence confirming information instead of the information processing device when the presence confirming information is received in the presence confirming information receiving step.

* * * * *